US007908126B2

(12) United States Patent
Bahel et al.

(10) Patent No.: US 7,908,126 B2
(45) Date of Patent: Mar. 15, 2011

(54) COOLING SYSTEM DESIGN SIMULATOR

(75) Inventors: Vijay Bahel, Sidney, OH (US); Peter F. Dexter, Sidney, OH (US); Altaf Hossain, Fairborn, OH (US); Thomas E. Crone, Tipp City, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 1122 days.

(21) Appl. No.: 11/414,745

(22) Filed: Apr. 28, 2006

(65) Prior Publication Data
US 2006/0259285 A1 Nov. 16, 2006

Related U.S. Application Data

(60) Provisional application No. 60/675,729, filed on Apr. 28, 2005.

(51) Int. Cl.
G05B 13/00 (2006.01)
G05B 15/00 (2006.01)
G05D 23/00 (2006.01)

(52) U.S. Cl. .................. 703/6; 703/7; 700/276; 700/300

(58) Field of Classification Search .................. 703/7
See application file for complete search history.

(56) References Cited

U.S. PATENT DOCUMENTS

| 3,082,951 | A | * | 3/1963 | Kayan | 703/9 |
| 3,350,928 | A | | 11/1967 | Fedde | |
| 4,965,743 | A | * | 10/1990 | Malin et al. | 706/45 |
| 5,748,943 | A | | 5/1998 | Kaepp et al. | |
| 5,860,285 | A | | 1/1999 | Tulpule | |
| 6,209,794 | B1 | | 4/2001 | Webster et al. | |
| 6,272,868 | B1 | | 8/2001 | Grabon et al. | |
| 6,330,525 | B1 | | 12/2001 | Hays et al. | |
| 6,477,518 | B1 | | 11/2002 | Li et al. | |
| 6,487,525 | B1 | | 11/2002 | Hall et al. | |
| 6,505,475 | B1 | | 1/2003 | Zugibe et al. | |
| 6,591,620 | B2 | | 7/2003 | Kikuchi et al. | |
| 6,629,008 | B2 | * | 9/2003 | Shiiba et al. | 700/100 |
| 6,651,037 | B1 | | 11/2003 | Hall et al. | |
| 6,662,583 | B2 | * | 12/2003 | Pham et al. | 62/228.3 |
| 6,675,591 | B2 | | 1/2004 | Singh et al. | |
| 6,684,178 | B2 | | 1/2004 | DeRose et al. | |
| 6,698,663 | B2 | | 3/2004 | Wang et al. | |
| 6,775,995 | B1 | | 8/2004 | Bahel et al. | |

(Continued)

FOREIGN PATENT DOCUMENTS
EP 1 211 617 A 5/2002
(Continued)

OTHER PUBLICATIONS

Certified copy of Japanese Patent Application Number 2003-100700, Apr. 3, 2003.*

(Continued)

Primary Examiner — Dwin M Craig
(74) Attorney, Agent, or Firm — Harness, Dickey & Pierce, P.L.C.

(57) ABSTRACT

A method of computer-based simulation of a cooling system includes receiving configuration data for a heat exchanger of the cooling system, customizing the configuration data for the heat exchanger; simulating cooling system performance by processing the customized configuration data through a model of the cooling system, and generating simulated cooling system performance data, based on the simulating, for evaluating operation of the cooling system.

27 Claims, 86 Drawing Sheets

U.S. PATENT DOCUMENTS

| | | | |
|---|---|---|---|
| 6,892,546 | B2 | 5/2005 | Singh et al. |
| 6,928,389 | B2 | 8/2005 | Saunders |
| 6,973,410 | B2 * | 12/2005 | Seigel ............................ 702/182 |
| 7,010,926 | B2 * | 3/2006 | Bahel et al. ...................... 62/127 |
| 7,171,346 | B1 * | 1/2007 | Recker et al. .................... 703/14 |
| 7,209,870 | B2 * | 4/2007 | Simmons et al. ................. 703/1 |
| 2002/0161776 | A1 | 10/2002 | Lanfredi et al. |
| 2003/0019221 | A1 * | 1/2003 | Rossi et al. ...................... 62/127 |
| 2003/0208341 | A9 | 11/2003 | Simmons et al. |
| 2004/0016252 | A1 | 1/2004 | Singh et al. |
| 2004/0199371 | A1 * | 10/2004 | Sasano et al. ................... 703/22 |
| 2005/0165591 | A1 | 7/2005 | Bahel et al. |

FOREIGN PATENT DOCUMENTS

| | | |
|---|---|---|
| EP | 1 229 479 A | 7/2002 |
| EP | 1 406 014 A2 | 4/2004 |
| JP | H9-257319 | 10/1997 |
| WO | WO 99/17178 | 8/1999 |

OTHER PUBLICATIONS

Sven Erik Mattsson, "On Modeling of Heat Exchangers in Modelica" Proceedings of the 9th European Simulation Symposium, ESS'97, Oct. 19-23, 1997, Passau, Germany, pp. 1-7.*

Adrian Bejan, "General Criterion for Rating Heat-Exchanger Performance" Department of Mechanical Engineering, University of California Berkley, CA 94720, Int. J. Heat Transfer. vol. 21, 1978, pp. 655-658.* rs+ program Version 1.0; Author and Date not available.
Blue World Newletter; Date: Aug. 1998; Author not available.
Screen shots; Author and Date not available.
rs+ program Version 2.0; Author and Date not available.
rs+ Version 2 Testen und gewinnen mit Danfoss; Author and Date not available.
Danfoss Zertifikat; Author and Date not available.
Letter from Ulrike Sieger-Koser to Herr Ridder dated Apr. 2, 2002.
Fax from Sabine Dorsam to Hotel Steigenberger dated Apr. 12, 2002.
Performer Scroll Compressors; Author and date not available.
Adap-Kool; Date: Apr. 1989; Author not available.
System Software type AKM; Date: May 1992; Author not available.
Notice of Opposition to European Patent Application No. 03252757.4, dated Sep. 26, 2006.
Response to Notice of Opposition to European Patent Application No. 03252757.4, dated May 24, 2007.
European Search Report for Application No. EP 03 25, 2757, dated Mar. 11, 2004; 2 pages.
Emma May Sadler, Design Analysis of a Finned-Tube Condenser for a Residential Air-Conditioner Using R-22, Apr. 2000, 147 pages.

* cited by examiner

Outputs: Flow Control Devices

| Device | Property | Value |
|---|---|---|
| Thermal Expansion Valve (TXV) | | |
| | Rated Capacity of Thermal Expansion Valve (ton) | 1.8 |
| | Static Superheat Setting of TXV (°F) | 6.0 |
| | Superheat at Rated Condition (°F) | 11.0 |
| | Maximum Effective Operating Superheat (°F) | 13.0 |
| | Bypass or Bleed Factor | 1.15 |
| Capillary Tube | | |
| | Number of Capillary Tubes in Parallel | 1 |
| | Inside Diameter of Capillary Tube (in) | 0.113 |
| | Length of Capillary Tube (in) | 80.0 |
| Orifice | | |
| | Number of Short Tube Orifices in Parallel | 1 |
| | Inside Diameter of Short Tube Orifice (in) | 0.072 |
| | Length of Short Tube Orifice (in) | 0.50 |

Refrigeration Condenser In Use At Emerson Condensing Unit Division

| Condenser Part Number | Finned Length (in) | Finned Height (in) | Frontal Area (ft²) | Rows | No. Of Parallel Ckts. | Horz. Tube Spc. (in) | Vert. Tube Spc. (in) |
|---|---|---|---|---|---|---|---|
| 066-0069-00 | 14.75 | 10.00 | 1.02 | 3 | 1.00 | 0.630 | 1.000 |
| 066-0073-00 | 19.00 | 10.00 | 1.32 | 3 | 1.00 | 0.870 | 1.000 |
| 066-0075-00 | 23.00 | 12.00 | 1.92 | 2 | 1.00 | 0.870 | 1.000 |
| 066-0101-00 | 60.12 | 35.00 | 14.60 | 6 | 6.00 | 1.080 | 1.250 |
| 066-0101-01 | 60.06 | 35.00 | 14.60 | 6 | 6.00 | 1.080 | 1.250 |
| 066-0101-02 | 60.06 | 35.00 | 14.60 | 3 | 1.00 | 1.080 | 1.250 |
| 066-0200-00 | 10.12 | 10.00 | 0.76 | 3 | 1.00 | 0.630 | 1.000 |
| 066-0205-00 | 10.88 | 11.00 | 0.83 | 4 | 2.00 | 0.750 | 1.000 |
| 066-0216-00 | 19.06 | 16.00 | 2.12 | 5 | 3.00 | 0.750 | 1.000 |
| 066-0218-00 | 19.00 | 16.00 | 2.11 | 3 | 2.00 | 0.870 | 1.000 |
| 066-0225-00 | 23.72 | 18.00 | 2.97 | 2 | 1.00 | 0.870 | 1.000 |
| 066-0226-00 | 19.00 | 12.00 | 1.32 | 5 | 4.00 | 0.750 | 1.000 |
| 066-0234-00 | 23.00 | 18.00 | 2.90 | 4 | 4.00 | 0.750 | 1.000 |
| 066-0247-00 | 23.25 | 18.00 | 2.90 | 3 | 1.00 | 0.870 | 1.000 |
| 066-0247-AL | 23.25 | 10.00 | 0.55 | 4 | 2.00 | 0.870 | 1.000 |
| 066-0253-00 | 7.88 | 27.50 | 4.73 | | | 1.080 | 1.250 |
| 066-0254-00 | 25.06 | | | | | | |

Compressor Selection — ZR34K3-PFV

60 Hz Rated Current (amp)

| Evap. Temp. --> | -10°F | -5°F | 0°F | 5°F | 10°F | 15°F | 20°F | 25°F | 30°F | 35°F |
|---|---|---|---|---|---|---|---|---|---|---|
| 80°F Cond. | 8.4 | 8.4 | 8.4 | 8.4 | 8.4 | 8.3 | 8.3 | 8.3 | 8.2 | 8.2 |
| 90°F Cond. | 9.3 | 9.3 | 9.3 | 9.3 | 9.2 | 9.2 | 9.2 | 9.2 | 9.1 | 9.1 |
| 100°F Cond. | 10.3 | 10.3 | 10.3 | 10.3 | 10.3 | 10.2 | 10.2 | 10.2 | 10.1 | 10.1 |
| 110°F Cond. | | | 11.5 | 11.5 | 11.5 | 11.4 | 11.4 | 11.4 | 11.3 | 11.3 |
| 120°F Cond. | | | | | 12.9 | 12.9 | 12.8 | 12.8 | 12.7 | 12.6 |
| 130°F Cond. | | | | | | | 14.5 | 14.4 | 14.3 | 14.2 |
| 140°F Cond. | | | | | | | | | 16.2 | 16.1 |
| 150°F Cond. | | | | | | | | | | |

Compressor Selection

Compressor List — H25D11QDBL (R-22, 60Hz) — Rated Performance

| | Compressor Part Number | Refrigerant | Frequency [Hz] | Phase | Rated Voltage | Rated Return Gas Temperature [°F] | Rated Superheat [°F] |
|---|---|---|---|---|---|---|---|
| 1 | H23A423DBL | R-22 | 50 | 3 | 220 | 65 | 20 |
| 2 | H25D11QDBL | R-22 | 60 | 3 | 220 | 65 | 20 |
| 3 | H25G244DPD | R-22 | 50 | 3 | 220 | 65 | 20 |
| 4 | SK240-4 | R-134a | 50 | 3 | 400 | | 18 |
| 5 | SZ240-4 | R-134a | 50 | 3 | 400 | | 18 |
| 6 | SK300-4 | R-134a | 50 | 3 | 400 | | 18 |
| 7 | | | | | | | |
| 8 | | | | | | | |
| 9 | | | | | | | |
| 10 | | | | | | | |
| 11 | | | | | | | |
| 12 | | | | | | | |
| 13 | | | | | | | |
| 14 | | | | | | | |
| 15 | | | | | | | |
| 16 | | | | | | | |
| 17 | | | | | | | |
| 18 | | | | | | | |
| 19 | | | | | | | |

NOTE: Part Number, Refrigerant, Frequency, Voltage, Return Gas Temp. /Superheat, Subcooling, Mass Flow Rate and Power Coefficient inputs are required to run simulation.

Air-Conditioning Unit
Summary: Parametric Simulation

General Information

System: Air-Conditioning     Run Mode: Cooling     Refrigerant: R-22

| Parameter | Run 1 | Run 2 | Run 3 | Run 4 | Run 5 | Run 6 | Run 7 |
|---|---|---|---|---|---|---|---|
| Subcooling at Condenser Exit (°F) | 5.00 | 9.17 | 13.33 | 17.50 | 21.67 | 25.83 | 30.00 |
| Saturated Suction Temperature (°F) | 44.68 | 44.46 | 44.27 | 44.12 | 44.02 | 44.19 | 44.28 |
| Saturated Discharge Temperature (°F) | 115.96 | 116.40 | 117.11 | 118.25 | 120.36 | 123.69 | 127.71 |
| Evaporator Superheat (°F) | 13.15 | 13.22 | 13.21 | 13.21 | 13.21 | 13.26 | 13.20 |
| Evaporator Outlet Air Temperature (°F) | 59.62 | 59.48 | 59.35 | 59.23 | 59.14 | 59.30 | 59.33 |
| Condenser Outlet Air Temperature (°F) | 109.21 | 109.37 | 109.53 | 109.68 | 109.82 | 109.98 | 110.12 |
| System Capacity (Btu/hr) | 34,055 | 34,505 | 34,928 | 35,257 | 35,439 | 35,549 | 35,452 |
| System Power Input (W) | 3,259 | 3,274 | 3,297 | 3,335 | 3,405 | 3,519 | 3,665 |
| Compressor Power Input (W) | 2,559 | 2,574 | 2,597 | 2,635 | 2,705 | 2,819 | 2,965 |
| System EER (Btu/Wh) | 10.45 | 10.54 | 10.59 | 10.57 | 10.41 | 10.10 | 9.67 |
| Sensible Heat Ratio | 0.786 | 0.781 | 0.777 | 0.774 | 0.772 | 0.771 | 0.772 |
| Condenser Heat Rejection (Btu/hr) | 42,438 | 42,926 | 43,422 | 43,866 | 44,261 | 44,718 | 45,074 |
| Refrigeration Mass Flow Rate (lb) | 513.5 | 511.3 | 509.1 | 506.9 | 504.8 | 504.2 | 502.3 |
| Refrigerant Charge (Normalized) | 1.000 | 1.048 | 1.113 | 1.202 | 1.333 | 1.488 | 1.627 |

Condensing Unit Selection

Search/Selection | F3AD-A325-CFV-001 | Components Detail
Compressor | Condenser | Accumulator

CRK3-0325-PFV
High Temperature

Rating Conditions
65 °F Return Gas
0 °F Subcooling
95 °F Ambient Air

R-22
60 HZ
1 Phase
208/230 Volts

Capacity (Btu/hr)

| Cond. Temp. (°F) | 0 | 5 | 10 | 15 | 20 | 25 | 30 | 35 | 40 | 45 | 50 | 55 |
|---|---|---|---|---|---|---|---|---|---|---|---|---|
| 70 | 19,000 | 22,300 | 26,000 | 30,100 | 34,800 | 39,800 | 45,400 | 51,400 | 58,000 | 65,100 | 72,800 | 81,100 |
| 80 | 16,900 | 20,000 | 23,500 | 27,300 | 31,900 | 36,700 | 42,000 | 47,800 | 54,100 | 61,000 | 68,400 | 76,300 |
| 90 | 14,900 | 17,800 | 21,100 | 24,900 | 29,000 | 33,600 | 38,600 | 44,100 | 50,100 | 56,700 | 63,700 | 71,300 |
| 100 | 13,100 | 15,800 | 18,900 | 22,500 | 26,200 | 30,500 | 35,200 | 40,400 | 46,100 | 52,300 | 59,000 | 66,200 |
| 110 | 11,500 | 13,900 | 16,700 | 19,900 | 23,400 | 27,400 | 31,800 | 36,700 | 42,000 | 47,800 | 54,100 | 60,900 |
| 120 | | 12,300 | 14,700 | 17,600 | 20,800 | 24,400 | 28,400 | 32,700 | 37,500 | 43,900 | 49,200 | 55,600 |
| 130 | | | 13,000 | 15,400 | 18,300 | 21,500 | 25,200 | 29,200 | 33,800 | 38,700 | 44,200 | 50,200 |
| 140 | | | | 13,900 | 16,000 | 18,800 | 22,000 | 23,600 | 29,700 | 34,200 | 39,200 | 44,700 |

Air-Conditioning Unit
Simulation Inputs

System: Air-Conditioning     Run Mode: Cooling     Refrigerant: R-22

Inlet/Air Conditions

| | Evaporator | Condenser |
|---|---|---|
| Dry Bulb Temperature | 80.0 °F | 95.0 °F |
| Wet Bulb Temperature | 67.0 °F | 75.0 °F |
| Air Flow Rate | 1200 ft³/min | 2800 ft³/min |
| Fan Power | 450 W | 250 W |
| Fan in Air Stream | YES | N/A |

Compressor

| | |
|---|---|
| Model | ZR34K3-PFV |
| Product Type | Scroll |
| Application | Air-Conditioning |
| Voltage | 208-230v |
| Frequency | 60 Hz |
| Phase | Single |

Heat Exchanger Tubing and Fin

| | Evaporator | Condenser |
|---|---|---|
| Horizontal Tube Spacing | 0.866 in | 0.866 in |
| Vertical Tube Spacing | 1.000 in | 1.000 in |
| No. of Circuits in Two Phase | 3.00 | 3.00 |
| No. of Circuits in Liquid Phase | 1.00 | 1.00 |
| Number of Rows | 3.00 | 2.00 |
| Number of Tubes Per Row | 30 | 27 |
| Outside Diameter of Tubing | 3/8 in | 3/8 in |
| Wall Thickness of Tubing | 0.013 in | 0.013 in |
| Tubing Type | Smooth | Smooth |
| Tube Material | Copper | Copper |
| Finned Length | 27.50 in | 44.93 in |
| Finned Height | 21.47 in | 38.46 in |
| Fin Density | 14 fins/in | 13 fins/in |
| Fin Thickness | 0.0046 in | 0.0046 in |
| Fin Pattern | Corrugated | Corrugated |
| No. of Fin Patterns / Row | 2 | 2 |
| Pattern Depth, Pd | 0.0520 in | 0.0520 in |
| Fin Material | Aluminum | Aluminum |
| Refrigerant Flow Configuration | Cross Flow | Cross Flow |
| Coil Part Number | N/A | N/A |

Compressor Performance Scaling Factors

| | |
|---|---|
| Displacement | 1.000 |
| EER | 1.000 |

Flow Control

| | |
|---|---|
| Selected Option | Subcooling/Superheat |
| Subcooling at Condenser Exit | 15.0 °F |
| Superheat at Compressor Inlet | 16.0 °F |

Connecting Tubing

| | |
|---|---|
| Liquid Line | |
|   Outside Dia. / Wall Thickness / Eqv. Length | 3/8 in / 0.030 in / 38.0 ft |
| Vapor Line: From Evaporator to Compressor | |
|   Outside Dia. / Wall Thickness / Eqv. Length | 3/4 in / 0.035 in / 38.0 ft |
| Discharge Line: From Compressor to Condenser | |
|   Outside Dia. / Wall Thickness / Eqv. Length | 1/2 in / 0.032 in / 5.0 ft |

Heat Exchanger Scaling Factors

| | Evaporator | Condenser |
|---|---|---|
| Refrigerant Side Heat Transfer | 1.000 | 1.000 |
| Refrigerant Side Pressure Drop | 1.000 | 1.000 |
| Refrigerant Side Surface Area | 1.000 | 1.000 |
| Air Side Heat Transfer | 1.000 | 1.000 |
| Air Side Pressure Drop | 1.000 | 1.000 |
| Air Side Surface Area | 1.000 | 1.000 |

Shell Loss / Heat Transfer

| | |
|---|---|
| Shell Heat Loss Factor | 0.100 |
| Discharge Line Loss | 1,000 Btu/hr |
| Suction Line Gain | 200 Btu/hr |
| Liquid Line Loss | 200 Btu/hr |

Pressure Drops

| | |
|---|---|
| Suction Line Device Pressure Drop | 0.0 psig @ 0.0 lb/hr |
| Discharge Line Device Pressure Drop | 0.0 psig @ 0.0 lb/hr |
| Liquid Line Device Pressure Drop | 0.0 psig @ 0.0 lb/hr |

FIG 63

Air-Conditioning Unit
Outputs: Evaporator and Condenser Coils

| Property | Evaporator | Condenser |
|---|---|---|
| Surface Area of Fins (ft²) | 139.8 | 254.3 |
| Weight of Finned Area (lb) | 9.66 | 16.12 |
| Length of Tube (ft) | 147.6 | 288.0 |
| Internal Volume of Coil (ft³) | 0.103 | 0.198 |
| Weight of the Tube (lb) | 8.44 | 16.47 |
| Air-Side Pressure Drop Across Coil (in. h₂o) | 0.212 | 0.061 |
| Heat Rejection (Btu/hr) | | 43,601 |

Figure 69:
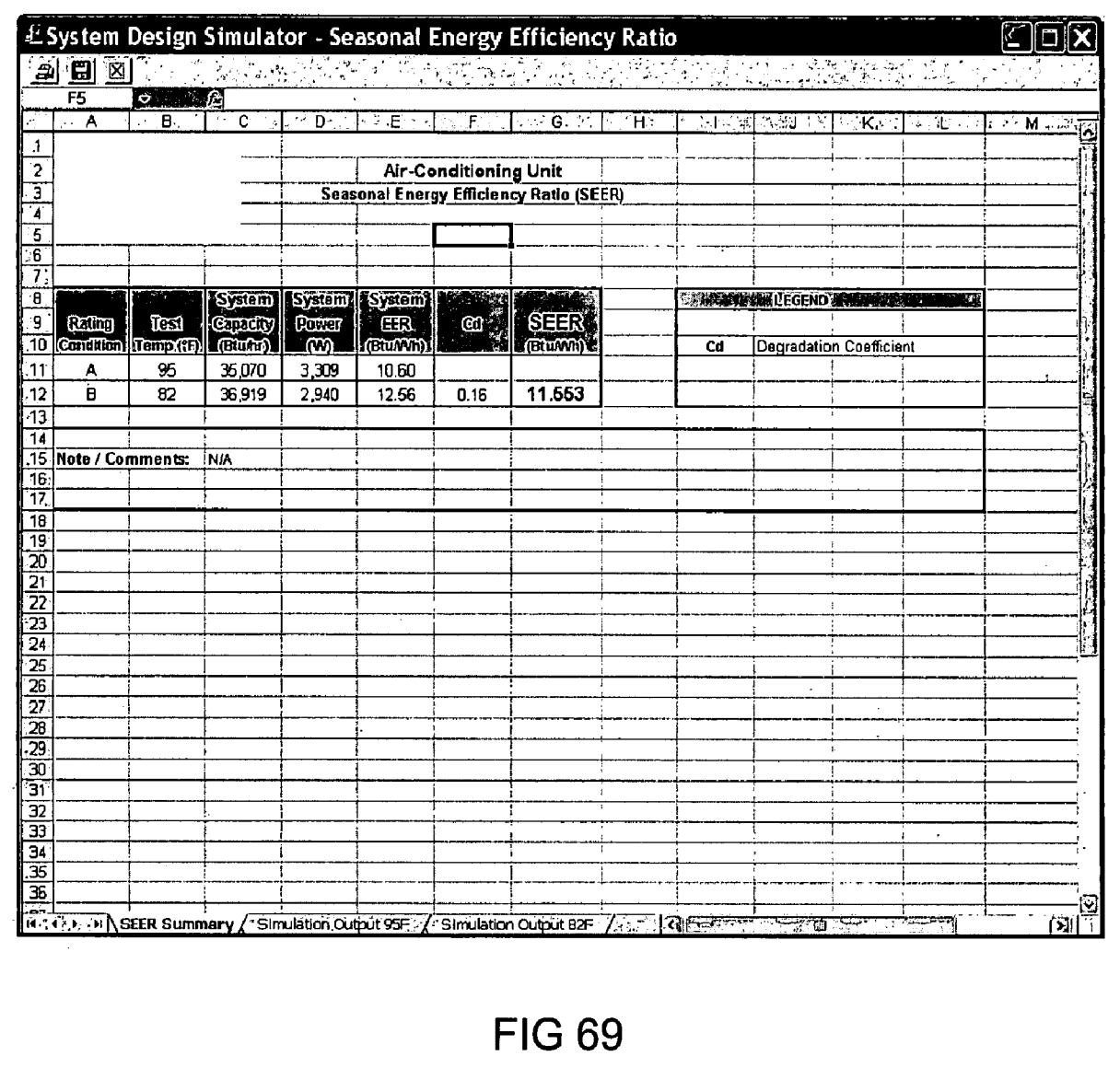

| Rating Condition | Test Temp (°F) | System Capacity (Btu-h) | System Power (W) | System EER (Btu/Wh) | Cd | SEER (Btu/Wh) |
|---|---|---|---|---|---|---|
| A | 95 | 35,070 | 3,309 | 10.60 | 0.16 | 11.553 |
| B | 82 | 36,919 | 2,940 | 12.56 | | |

Air-Conditioning Unit
Seasonal Energy Efficiency Ratio (SEER)

Note / Comments: N/A

LEGEND
Cd — Degradation Coefficient

FIG 70

Two Capacity Air-Conditioner
Seasonal Energy Efficiency Ratio

| Compressor Capacity | Capacity (Btu/hr) | Total Power (W) | Outdoor Temp (f) | EER (Btu/Wh) |
|---|---|---|---|---|
| HIGH | 36,919 | 2,240 | 95 | 16.48 |
| HIGH | 36,919 | 2,240 | 82 | 16.48 |
| LOW | 60,412 | 5,305 | 95 | 11.39 |
| LOW | 63,184 | 4,830 | 82 | 13.08 |
| Cd Low | 0.160 | | | |

LEGEND: Cd — Degradation Coefficient

| Bin Temp (f) | Building Load (Btu/h) | High Capacity Cooling (Btu/h) | Low Capacity Cooling (Btu/h) | High Power Input (W) | Low Power Input (W) | Low Load Factor (-) | High Load Factor (-) | Overall Load Factor (-) | Case (-) | Par |
|---|---|---|---|---|---|---|---|---|---|---|
| 67 | 2,238 | 36,919 | 66,381 | 2,240 | 4,282 | 0.0337 | 0.0000 | 0.0337 | Low | 0 |
| 72 | 7,831 | 36,919 | 65,315 | 2,240 | 4,464 | 0.1199 | 0.0000 | 0.1199 | Low | 0 |
| 77 | 13,425 | 36,919 | 64,249 | 2,240 | 4,647 | 0.2090 | 0.0000 | 0.2090 | Low | 0 |
| 82 | 19,019 | 36,919 | 63,184 | 2,240 | 4,830 | 0.3010 | 0.0000 | 0.3010 | Low | 0 |
| 87 | 24,613 | 36,919 | 62,118 | 2,240 | 5,013 | 0.3962 | 0.0000 | 0.3962 | Low | 0 |
| 92 | 30,206 | 36,919 | 61,052 | 2,240 | 5,195 | 0.4948 | 0.0000 | 0.4948 | Low | 0 |
| 97 | 35,800 | 36,919 | 59,986 | 2,240 | 5,378 | 0.5969 | 0.0000 | 0.5969 | Low | 0 |
| 102 | 41,394 | 36,919 | 58,920 | 2,240 | 5,561 | 0.7025 | 0.0000 | 0.7025 | Low | 0 |

| Micro-Channel Condenser Geometry | Pass 1 | Pass 2 | Pass 3 | Totals |
|---|---|---|---|---|
| Condenser Core Design | | | | |
| Passes | | 0 | 0 | 1 |
| Coil Dimensions | | | | |
| Fin Height (in) | | | | 0.339 |
| Fin Depth (in) | | | | 1.00 |
| Fin Thickness (in) | | | | 0.006 |
| Fins Density (fins/in) | | | | 21.0 |
| Number of Fins | | | | 53 |
| Number of Tubes | 52 | 0 | 0 | 52 |
| Tube Length (in) | | | | 60.00 |
| Tube Outside DI Minor (in) | | | | 0.072 |
| Tube Outside DI Major (in) | | | | 1.000 |
| Tube Thickness (in) | | | | 0.017 |
| Number of Internal Legs | | | | 10.000 |
| Leg Thickness (in) | | | | 0.018 |
| Leg Height (in) | | | | 0.037 |
| Fin Material | | | | Aluminum |
| Tube Material | | | | Aluminum |
| Side to Side Width (in) | | | | 21.66 |
| Header to Header Length (in) | | | | 60.00 |
| Air Side Areas | | | | |
| Secondary (fin) Surface (ft²) | | | | 313.50 |
| Prime Surface (ft²) | | | | 39.47 |
| Total Surface (ft²) | | | | 352.97 |
| Face (ft²) | | | | 9.02 |

COOLING SYSTEM DESIGN SIMULATOR

CROSS-REFERENCE TO RELATED APPLICATIONS

This application claims the benefit of U.S. Provisional Application No. 60/675,729, filed on Apr. 28, 2005. The disclosure of the above application is incorporated herein by reference.

FIELD

The present teachings relate to cooling systems, and more particularly to simulating performance of a cooling system.

BACKGROUND

Traditional cooling systems, such as refrigeration and air-conditioning systems, include a compressor, a condensing unit, an expansion device and an evaporator. The compressor compresses gaseous refrigerant exiting the evaporator and discharges the high pressure refrigerant to the condensing unit. The condensing unit operates as a heat exchanger enabling heat transfer from the gaseous refrigerant to a heat sink (e.g., air or water). The refrigerant condenses within the condensing unit and a state change occurs from gas to liquid. The liquid refrigerant exits the condensing unit and flows to the evaporator through the expansion device. The evaporator also operates as a heat exchanger enabling heat transfer from the atmosphere surrounding the evaporator to the liquid refrigerant. As the heat transfer occurs, the temperature of the refrigerant increases until a state change occurs from liquid to gas. The gaseous refrigerant is drawn into the suction side of the compressor and the cooling cycle continues.

In order to competently design a new cooling system or maintain an existing cooling system, the potential performance of the individual components within the system need to be estimated. Traditionally, system components are selected based on the refrigerant type and ratings provided by the manufacturer. However, these ratings are determined under fixed conditions and not actual system operational conditions. Therefore, although the rating of a component may suggest that it is proper for the particular cooling system, the actual performance of that component within the cooling system may be far less than optimal.

SUMMARY

Accordingly, a method of computer-based simulation of a cooling system is provided. The method includes receiving configuration data for a heat exchanger of the cooling system, customizing the configuration data for the heat exchanger; simulating performance of the cooling system by processing the customized configuration data through a model of the cooling system, and generating simulated cooling system performance data, based on the simulating, for evaluating operation of the cooling system.

Additionally, another method of computer-based simulation of a cooling system includes receiving inputted parametric data for the cooling system corresponding to predetermined simulated operating conditions for the cooling system, simulating cooling system performance by processing the parametric data through a model of the cooling system, and generating simulated cooling system performance data, based on the simulating, for evaluating operation of the cooling system.

Further, a method of computer-based simulation of a heat exchanger system is provided. The method includes receiving heat exchanger system configuration data, simulating heat exchanger system performance by processing the heat exchanger system configuration data through a model of the heat exchanger system, generating simulated heat exchanger system performance data based on the simulating, and rating the heat exchanger system based on the generated simulated performance data.

Further areas of applicability will become apparent from the detailed description provided hereinafter. It should be understood that the detailed description and specific examples, while indicating a preferred embodiment, are intended for purposes of illustration only and are not intended to limit the scope of the teachings.

BRIEF DESCRIPTION OF THE DRAWINGS

The present teachings will become more fully understood from the detailed description and the accompanying drawings, wherein:

FIG. 9 is a screen-shot illustrating exemplary outputs for flow control devices;

FIG. 10 is a screen-shot illustrating exemplary selection criteria for a thermal expansion valve (TXV);

FIG. 13 is a screen-shot of an exemplary psychometric calculator;

FIG. 21 is a screen-shot illustrating condenser heat exchanger fin inputs;

FIG. 23 is a screen-shot illustrating a condenser database;

FIG. 25 is a screen-shot illustrating compressor search results;

FIG. 30 is a screen-shot illustrating compressor rated current values;

FIG. 34 is a screen-shot illustrating re-rated compressor capacity;

FIG. 36 is a screen-shot illustrating a non-manufacturer specific compressor library;

FIG. 37 is a screen-shot illustrating rated performance of a non-manufacturer specific compressor selected from the library;

FIG. 39 is a screen-shot illustrating tubing and line heat transfer inputs for a system including a reversing valve;

FIG. 40 is a screen-shot illustrating an accumulator database;

FIG. 48 is a screen-shot illustrating an exemplary parametric simulation summary;

FIG. 50 is a screen-shot illustrating ACU selection inputs;

Figure 51:
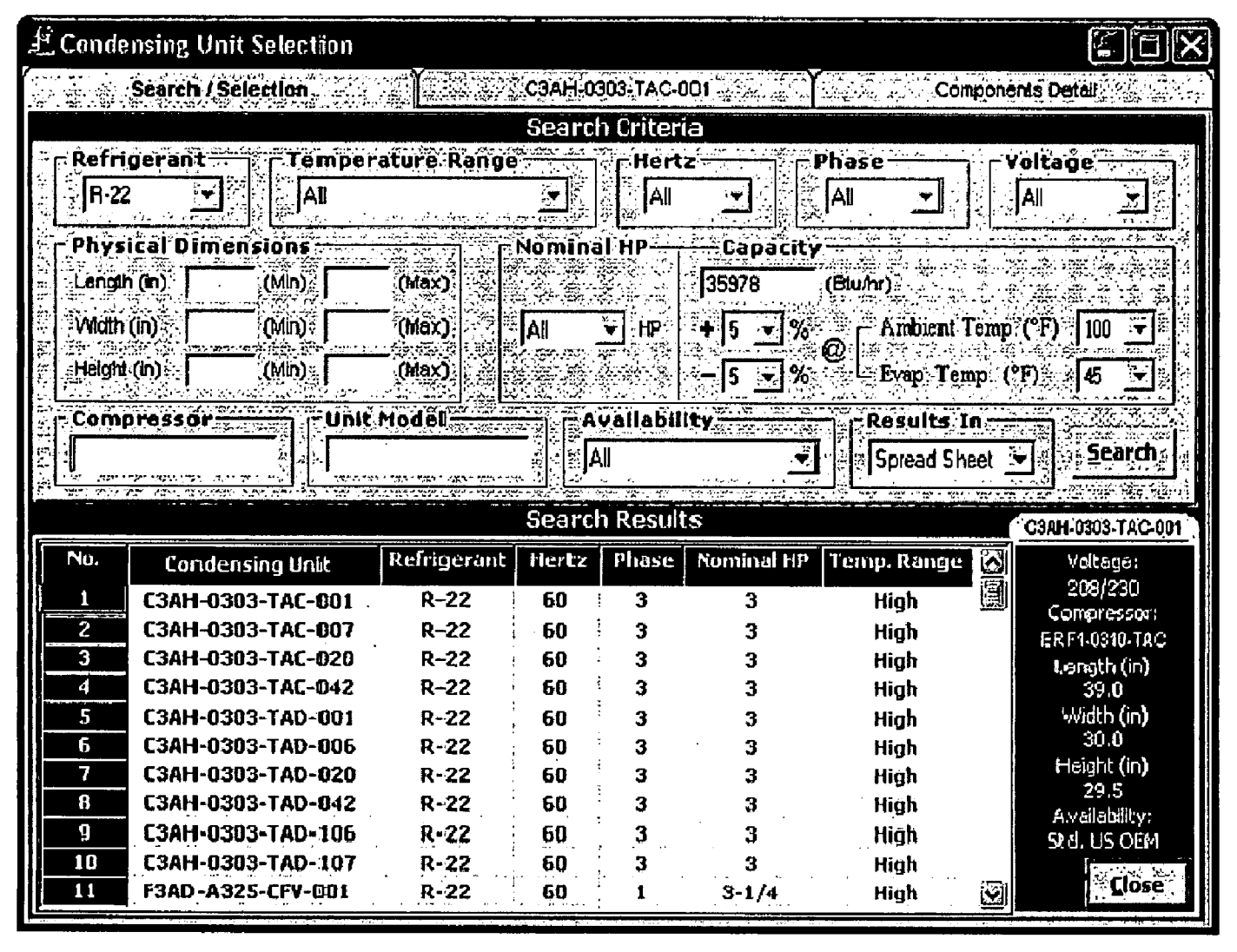

FIG. 51 is a screen-shot illustrating a selected ACU summary;

FIG. 53 is a screen-shot illustrating ACU compressor capacity based on evaporator temperature and condensing temperature;

FIG. 55 is a screen-shot illustrating ACU condenser details;

FIG. 56 is a screen-shot illustrating ACU key features;

FIG. 57 is a screen-shot illustrating a key feature comparison between ACUs;

FIG. 63 is a screen-shot illustrating key simulation inputs;

FIG. 65 is a screen-shot illustrating evaporator and condenser coil outputs;

FIG. 68 is a screen-shot illustrating exemplary SEER inputs;

FIG. 69 is a screen-shot illustrating an SEER summary;

FIG. 70 is a screen-shot illustrating SEER inputs for a dual capacity system;

FIG. 71 is a screen-shot illustrating an SEER summary for the dual capacity system;

FIG. 73 is a screen-shot illustrating HSPF inputs and calculation;

FIG. 74 is a screen-shot illustrating an HSPF summary;

FIG. 75 is a screen-shot illustrating HSPF inputs and calculation for a dual capacity system;

FIG. 76 is a screen-shot illustrating an HSPF summary for a dual capacity system;

FIG. 77 is a screen-shot illustrating a psychrometric calculator used to calculate moist air properties;

FIG. 84 is a screen-shot illustrating condenser geometry outputs of the condenser model;

DETAILED DESCRIPTION

The following description is merely exemplary in nature and is not intended to limit the present disclosure, application, or uses.

Figure 1:
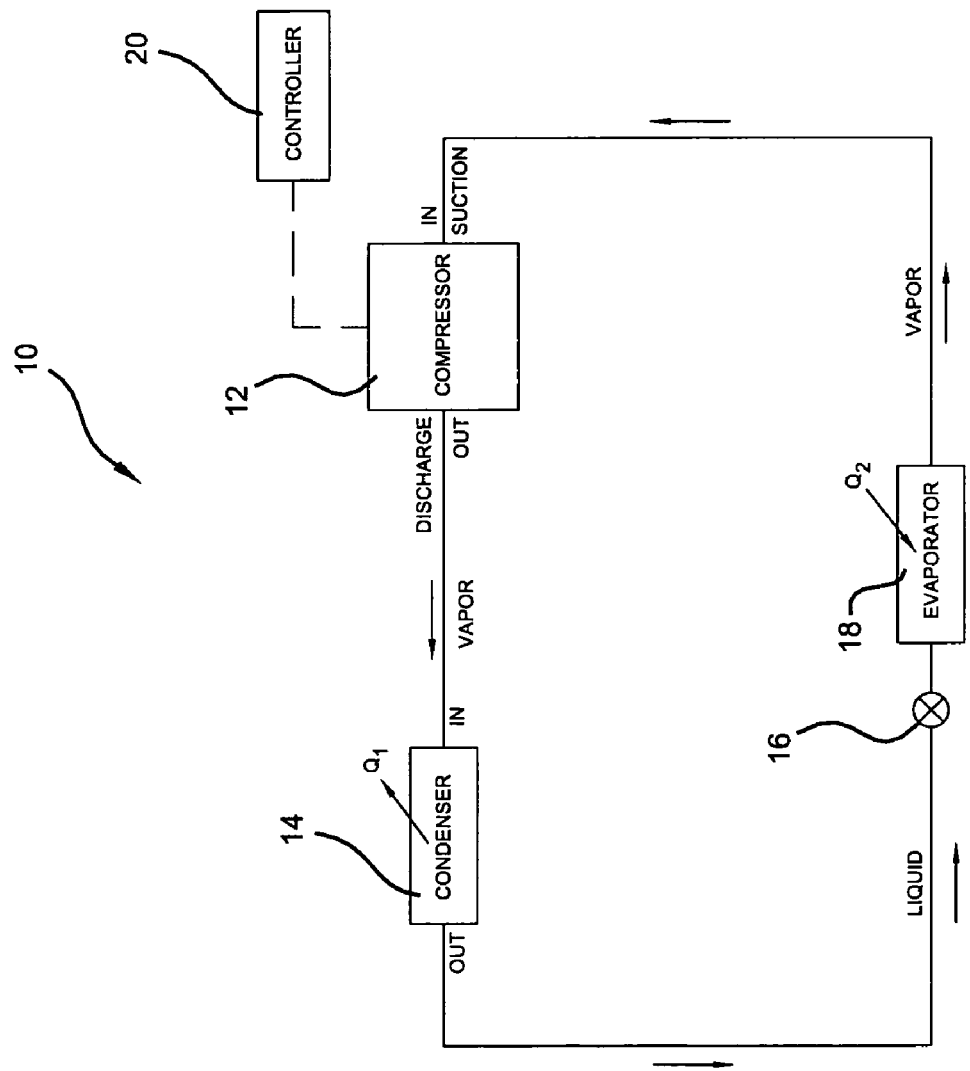
FIG. 1 is a schematic illustration of an exemplary cooling system.

Referring now to FIG. 1, a generic cooling system 10 may include a compressor 12, a condenser 14, an expansion device 16 and an evaporator 18. The compressor 12 may be controlled by a controller 20 and may compress gaseous refrigerant exiting the evaporator 18. The compressor 12 may discharge the high pressure refrigerant to the condenser 14. The condenser 14 may operate as a heat exchanger enabling heat transfer ($Q_1$) from the gaseous refrigerant to a heat sink (e.g. air or water). The refrigerant may condense within the condenser 14 and a state change may occur from gas to liquid. The liquid refrigerant may exit the condenser 14 and flow to the evaporator 18 through the expansion device 16. The evaporator 18 may also operate as a heat exchanger enabling heat transfer ($Q_2$) from the atmosphere surrounding the evaporator 18 to the liquid refrigerant. As the heat transfer occurs, the temperature of the refrigerant may increase until a state change occurs from liquid to gas. The gaseous refrigerant may be drawn into the suction side of the compressor 12 and the cooling cycle may continue.

The cooling system design simulator may include a series of sub-routines to determine the performance of the individual components of exemplary cooling systems and/or the cooling system 10 as a whole. More particularly, the design simulator may perform steady-state design and analysis of vapor compression air-to-air-systems operating in either heating or cooling modes. A cooling system model may be based on underlying physical principles and generalized correlations to avoid the limitations of empirical correlations derived from manufacturer specifications. As a hardware-based model, a user may specify the individual component parameters and define the geometry of tubing connecting the cooling system components. The design simulator may preferably be provided as a software-based computer program. More specifically, the design simulator may preferably include a Windows interface functionality integrated in the software to enable quick cooling system design. Other complimentary functions may be integrated to streamline design efforts. These include, but are not limited to look-up tables for refrigerant and psychrometric properties of air.

Figure 2:
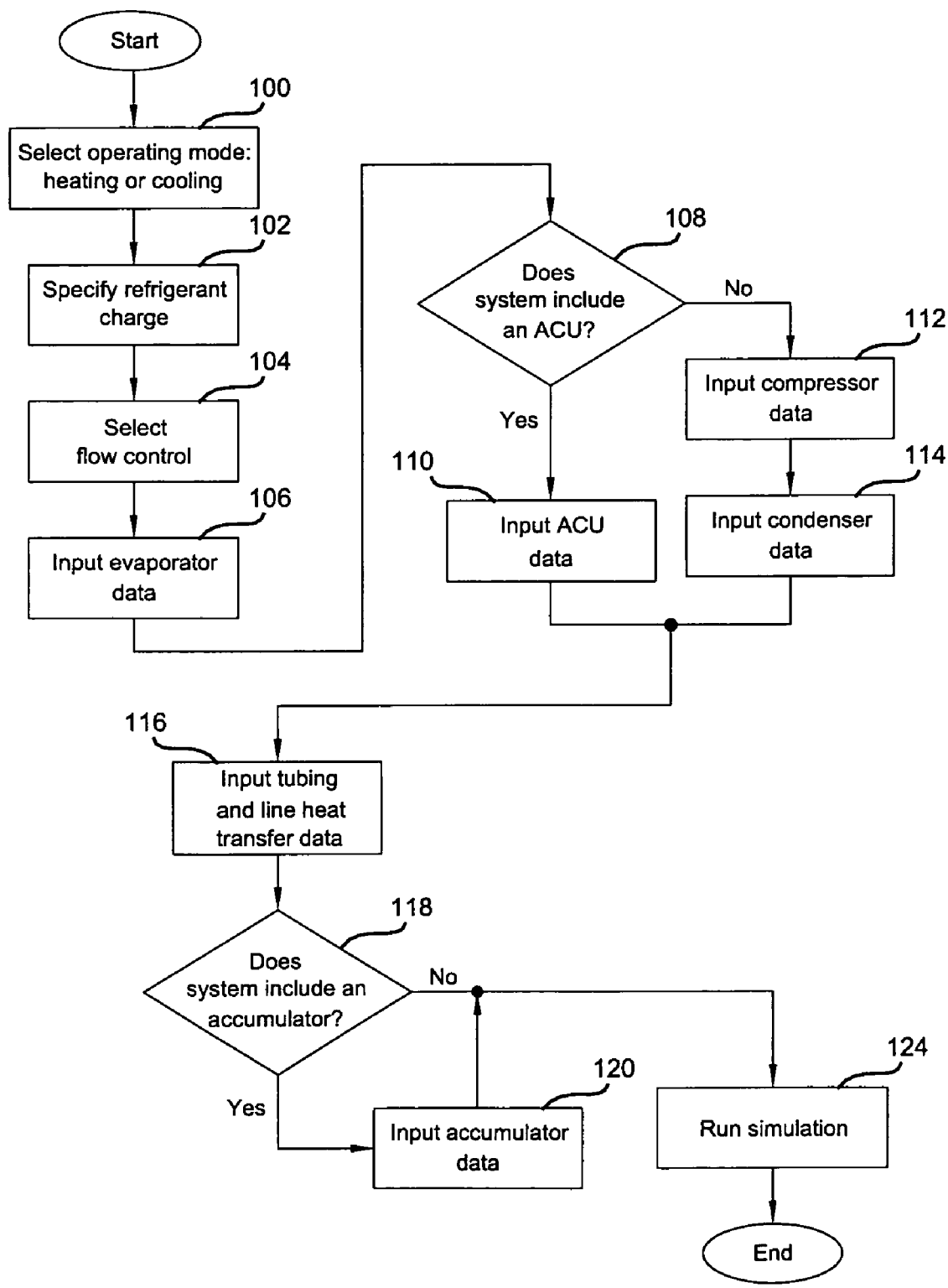
FIG. 2 is a flowchart illustrating general steps of a cooling system design simulator according to the present teachings.

Referring now to FIG. 2, a flowchart illustrates the general steps of the cooling system design simulator. In step 100, the user may select the operating mode of the cooling system (i.e., cooling or heating). In step 102, the user may specify the refrigerant charge. The user may select the flow control in step 104. In step 106, the user may input evaporator data. In step 108, the user may determine whether the cooling system includes an air-cooled condensing unit (ACU) in step 108. If the cooling system does include an ACU, the simulator may continue in step 110. If the cooling system does not include an ACU, the simulator may continue in step 112.

In step 110, the user may input the ACU data. In step 112, the user may input compressor data. The user may input condenser data in step 114. In step 116, the user may input tubing and line heat transfer data for the plumbing between components of the cooling system. In step 118, the user may determine whether the cooling system includes an accumulator. If the cooling system does include an accumulator, the simulator may continue in step 120. If the cooling system does not include an accumulator, the simulator may continue in step 122. In step 120, the user may input accumulator data. In step 122, the user may input refrigerant properties. In step 124, the user may run the simulation based on the input data and the simulation may end.

Figure 3:
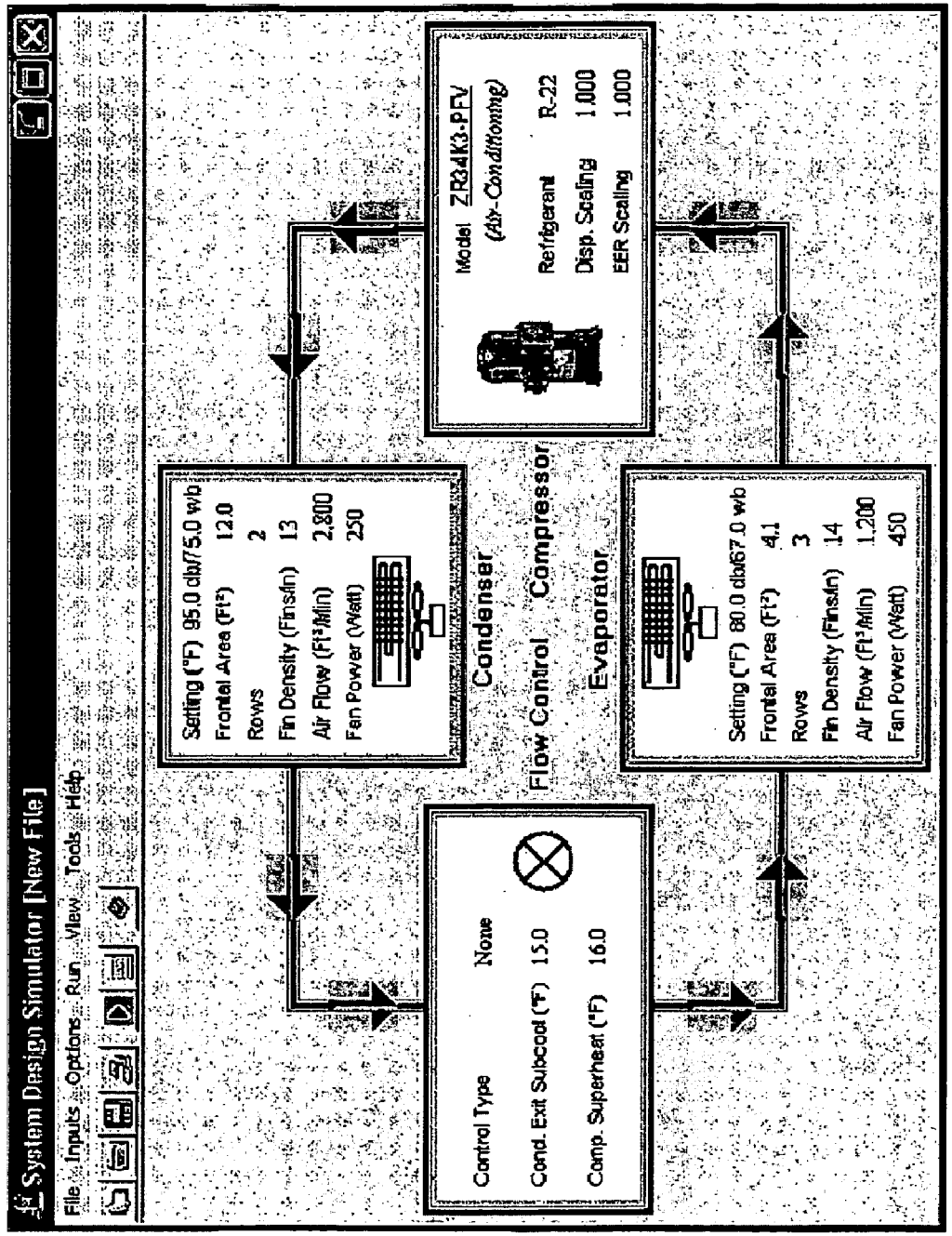
FIG. 3 is a screen-shot illustrating software-based input of cooling system component information.
Figure 4:
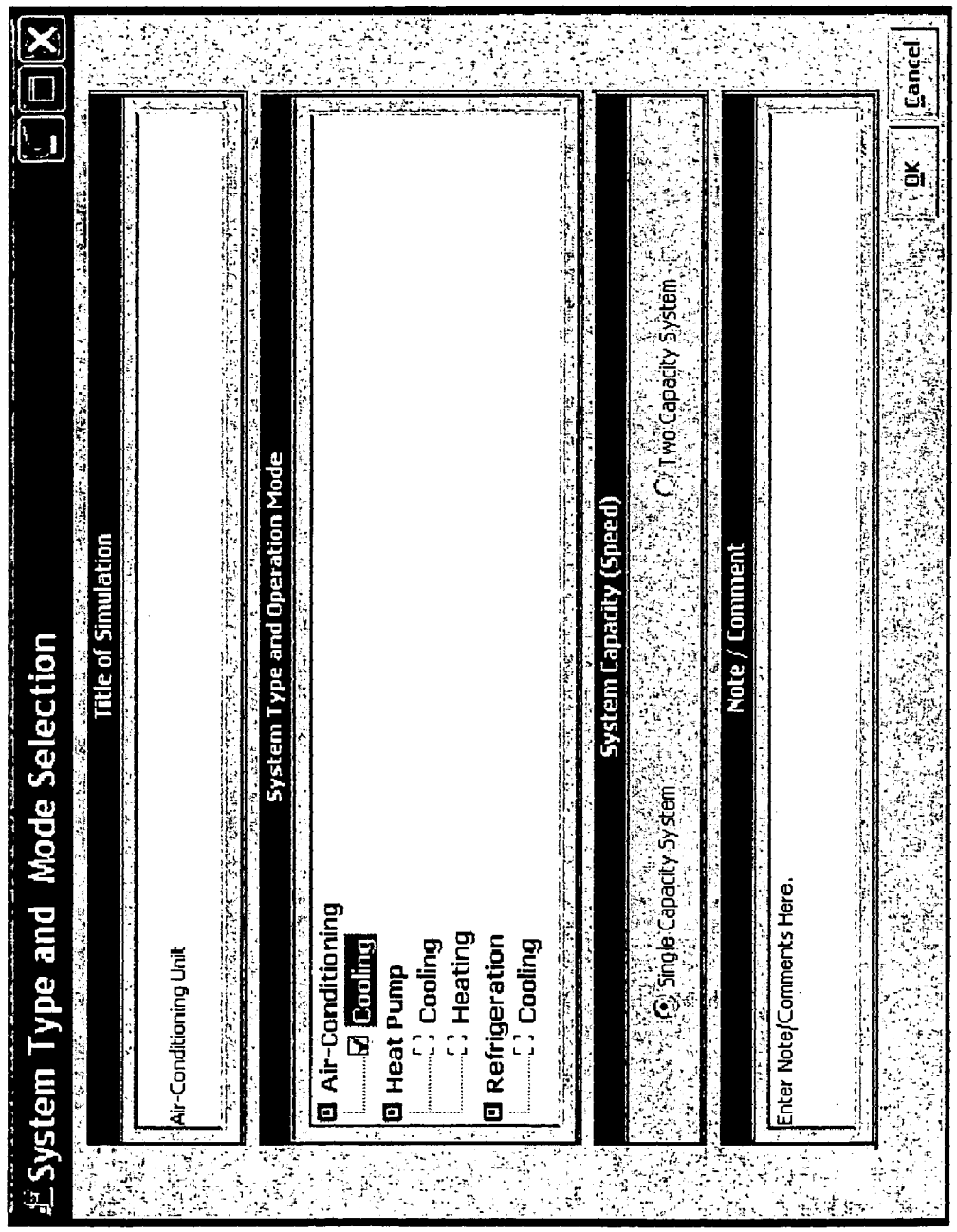
FIG. 4 is a screen-shot illustrating system type and operation mode inputs including single and dual capacity systems.
Figure 86:
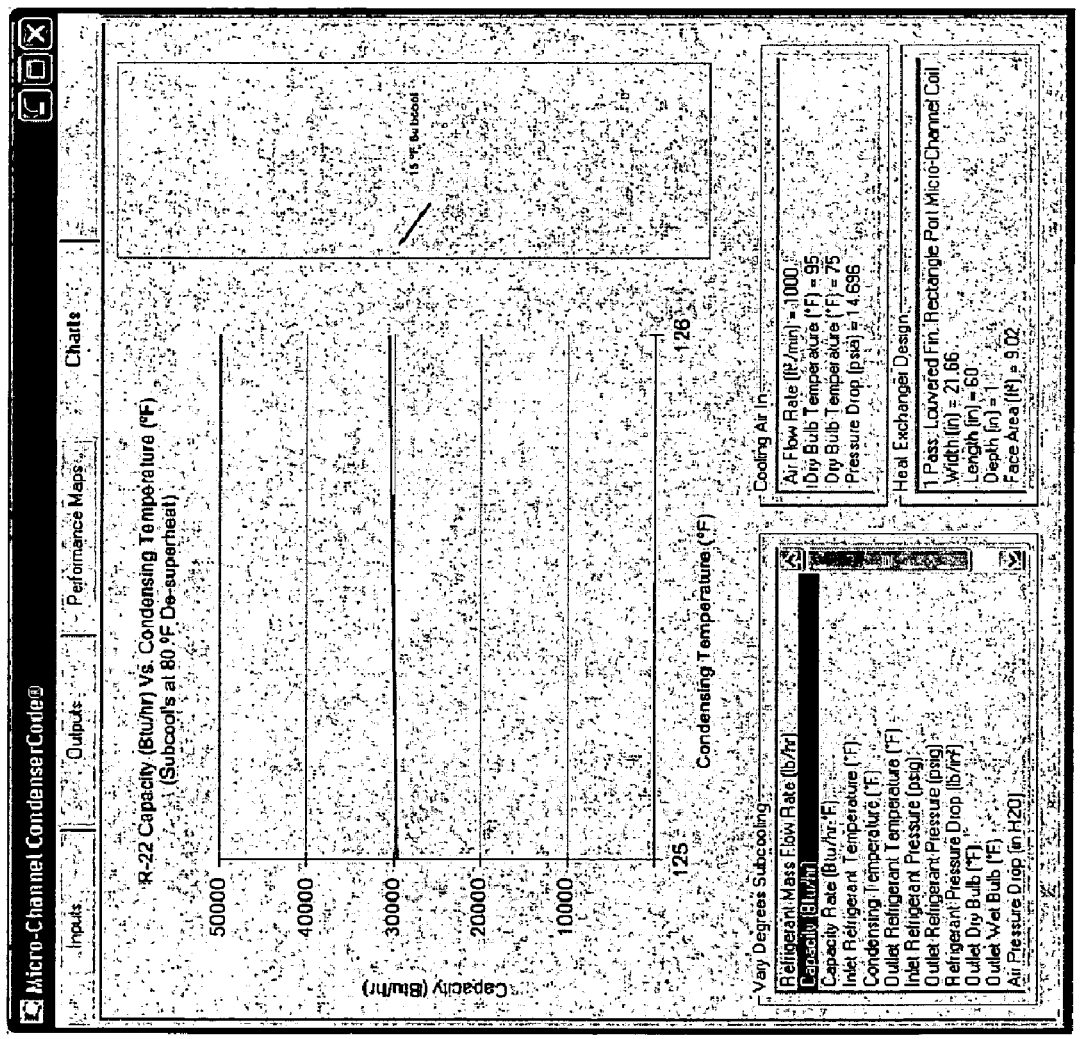
FIG. 86 is a screen-shot illustrating condenser charts of the condenser model.

Referring now to FIGS. 3 through 86, the cooling system design simulator will be described in further detail. FIGS. 3 through 86 generally provide screen-shots of a software-based implementation of the cooling system design simulator. More particularly, FIG. 3 is a screen-shot illustrating a generic cooling system schematic. As similarly described above with reference to FIG. 1, the cooling system schematic includes a condenser, a flow control device, an evaporator and a compressor. The cooling system may be simulated in either a cooling mode or a heating mode. The user may select the operating mode by clicking on Inputs in the toolbar and selecting the System Type and Operation Mode option. FIG. 4 illustrates a screen-shot of a system type and mode screen. The user may select between an A/C system operating in respective cooling and heating modes or a refrigeration system operating in a cooling mode. The user may select between a single capacity system (e.g., high or low capacity) and a dual capacity system (e.g., high and low capacities). The user may also enter a simulation title and notes.

Figure 5:
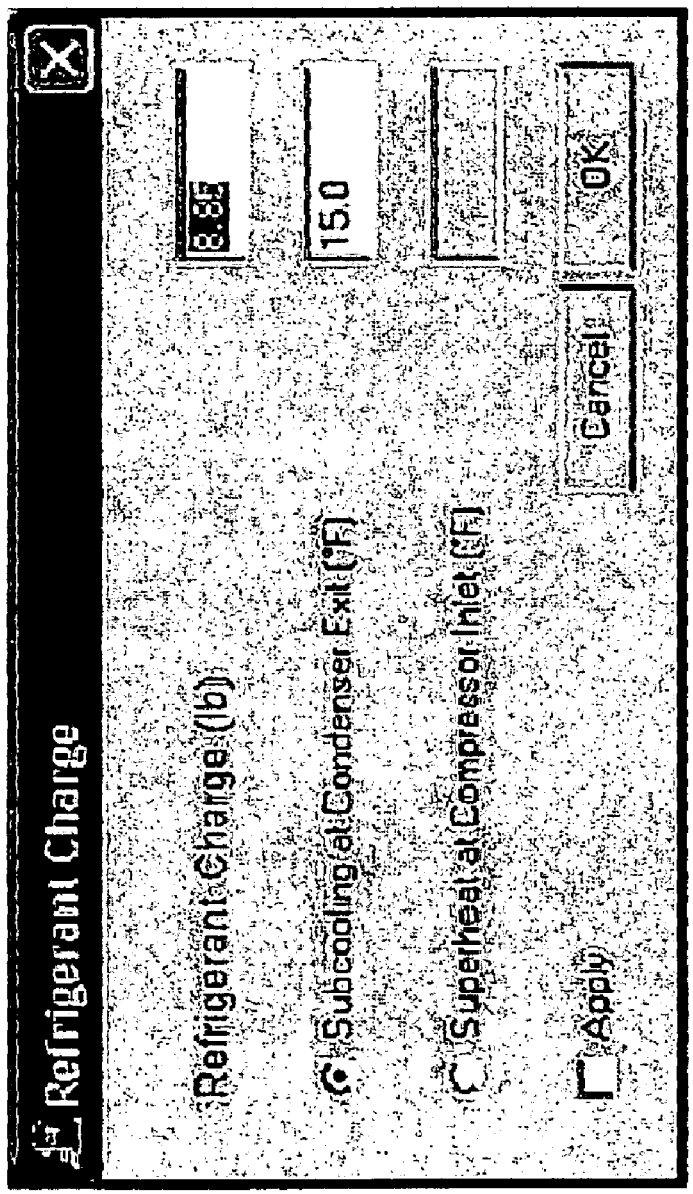
FIG. 5 is a screen-shot illustrating refrigerant charge inputs.

The user may specify the refrigerant charge for the cooling system or may have the simulator calculate the refrigerant charge from the other system parameters. The user may input the refrigerant charge data by clicking on Inputs in the toolbar and selecting the Specify Refrigerant Charge and Edit Inputs option. FIG. 5 illustrates a screen-shot of the refrigerant charge menu. The user may input the refrigerant charge in lbs and either the sub-cooling temperature (° F.) at the condenser discharge or the superheat temperature (° F.) at the compressor inlet.

The simulator enables the user to select between flow control device options. The options include capillary tube and orifice. Alternatively, the user may specify flow control parameters including the condenser discharge sub-cooling temperature (° F.) and the compressor inlet superheat temperature (° F.). The simulator may calculate the equivalent Thermal Expansion Valve (TXV), capillary tube and orifice sizes to achieve these conditions; as described in further detail below. The flow control may be selected by clicking on Inputs in the toolbar and choosing the Flow Control menu or by clicking on the flow control illustration.

Figure 6:
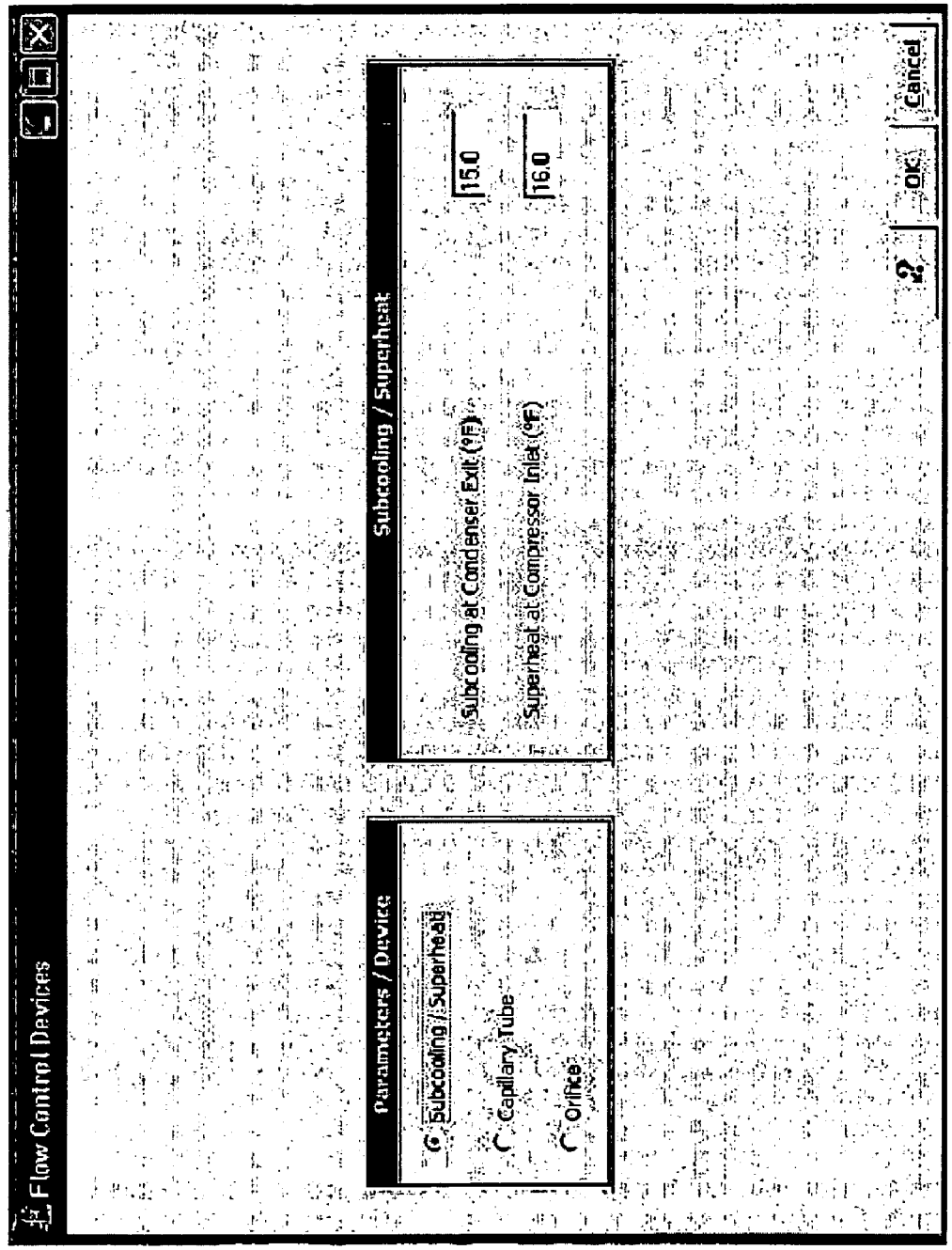
FIG. 6 is a screen-shot illustrating sub-cooling and super-heat parameter inputs for flow control.
Figure 7:
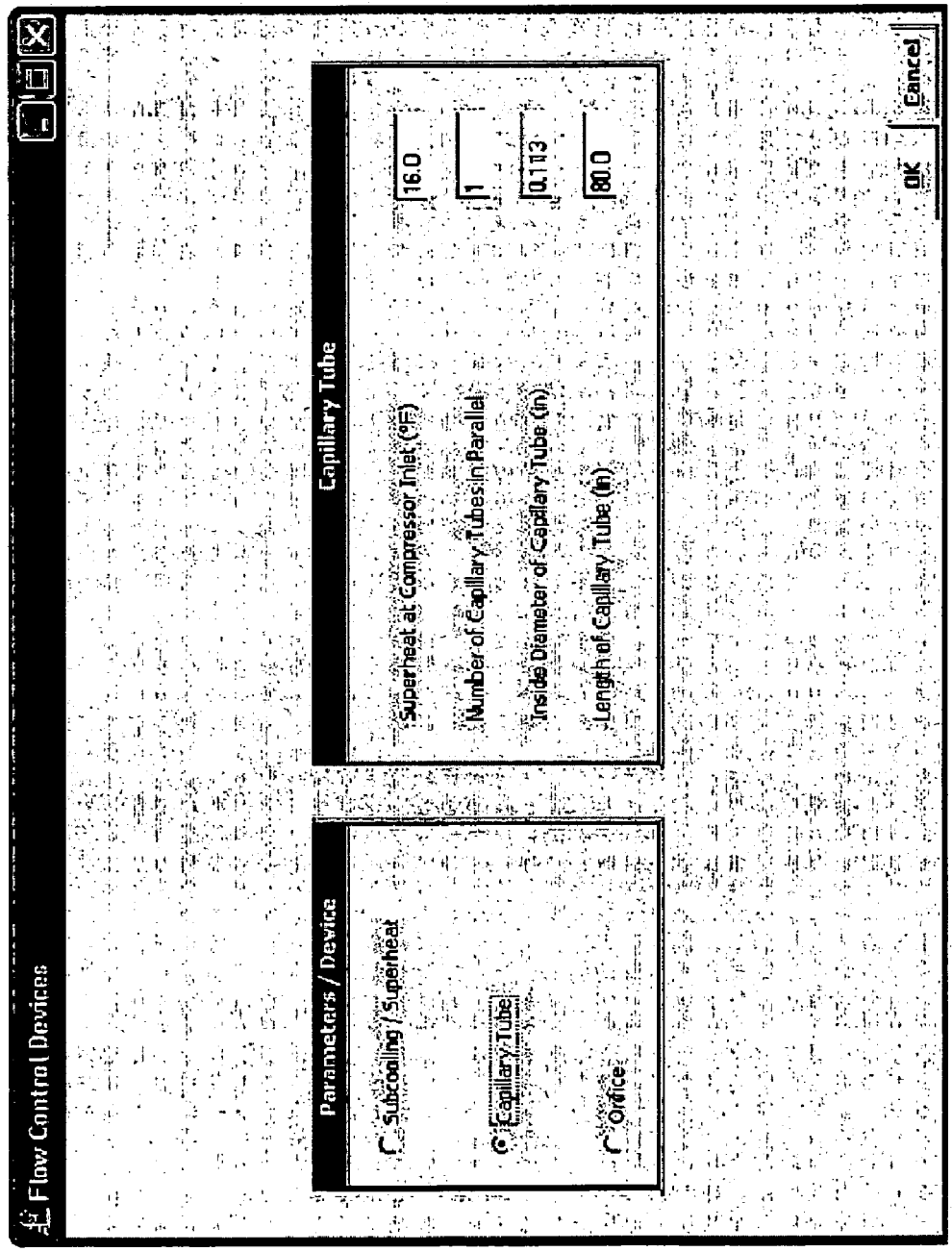
FIG. 7 is a screen-shot illustrating capillary tube flow control device inputs.
Figure 8:
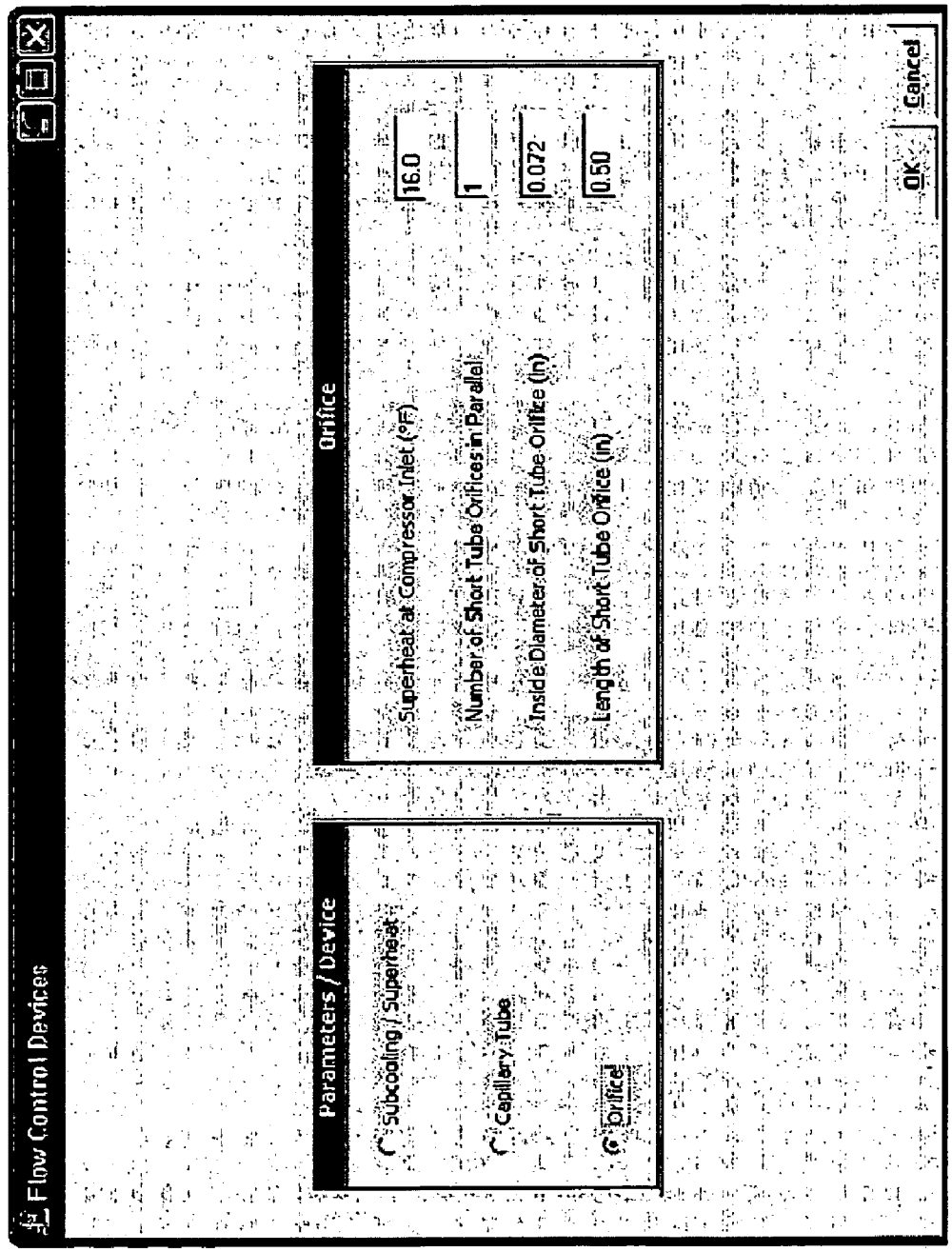
FIG. 8 is a screen-shot illustrating orifice flow control device inputs.

FIG. 6 provides a screen-shot of the Flow Control Devices screen with the sub-cooling/superheat parameters option selected. The user may input the sub-cooling and superheat temperatures. FIG. 7 provides a screen-shot of the Flow Control Devices screen with the capillary tube device selected. The user may input the superheat temperature, number of parallel capillary tubes, inside diameter of the capillary tube(s) and the length of the capillary tube(s). FIG. 8 provides a screen-shot of the Flow Control Devices screen with the orifice device selected. The user may input the superheat temperature, the number of parallel short tube orifices, the inside diameter of the short tube orifice(s) and the length of the short tube orifice(s). FIG. 9 illustrates an output screen for the Flow control Devices including properties and property values for the TXV, capillary tube and orifice.

Figure 10:
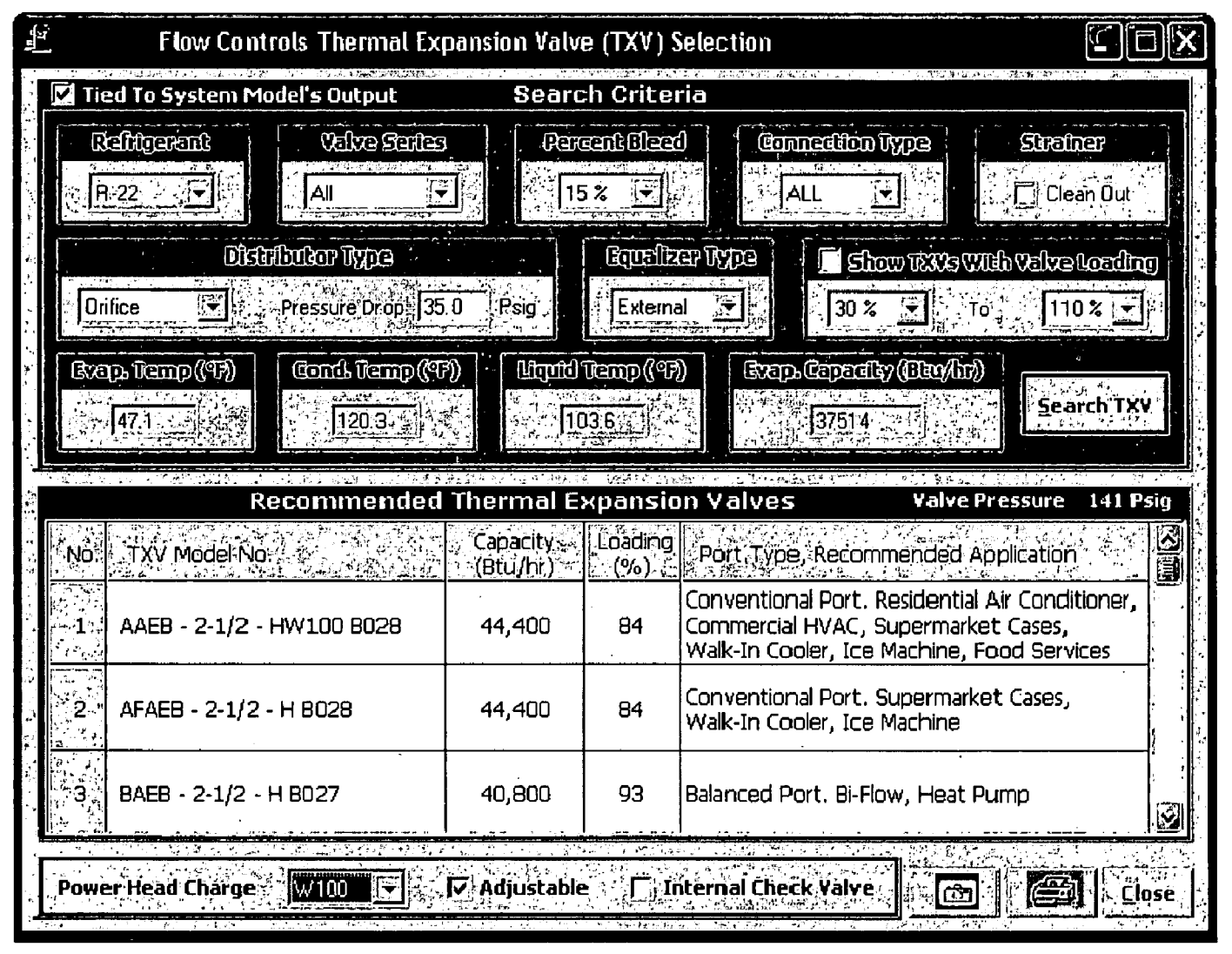

Referring now to FIG. 10, the TXV may be selected by the user by accessing TXV Selection in the Tools menu. A TXV selection screen is provided and includes a Search button which searches available TXVs based on exemplary inputs of: refrigerant, percent bleed, evaporator, condensing, liquid temperature and system capacity and the like. Many of the above parameters may be entered automatically on the execution of the system simulation. A provision has been provided so that the user may choose to enter the required data manually for selecting TXV without running the system simulation. The user may also enter other criteria including valve type series, connection type, strainer, distributor type and valve loading range. The available TXVs are listed based on the input including the capacity, percent loading, port type and recommended application.

The user may customize data for the evaporator. The data for the evaporator may be entered by opening the evaporator screen. The user may access this screen by either choosing Inputs on the toolbar and the Evaporator option or by clicking on the evaporator image. The evaporator may require several inputs that are grouped into four categories: (i) entering air condition (dry bulb and wet bulb temperature) and air flow rate/fan power, (ii) whether the fan motor is in or out of the air stream, (iii) heat exchanger physical properties and (iv) scaling factors to adjust simulation results to match with measured system performance data. Expert tips may be included on each input screen to help the user streamline their design efforts. The expert tips may be accessed by choosing the icon with question mark.

Figure 11:
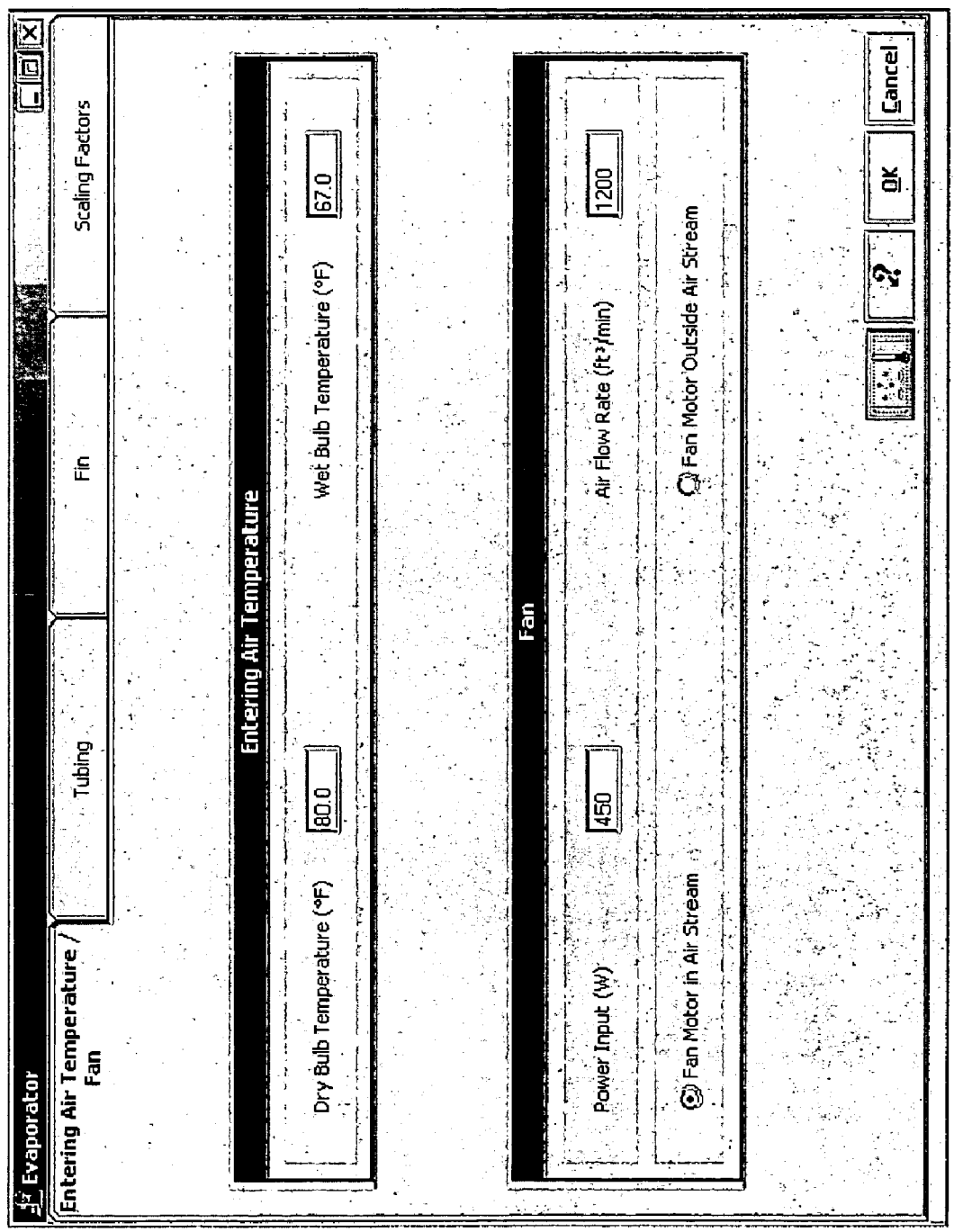
FIG. 11 is a screen-shot illustrating evaporator entering air temperature and air flow inputs for a single capacity system.
Figure 12:
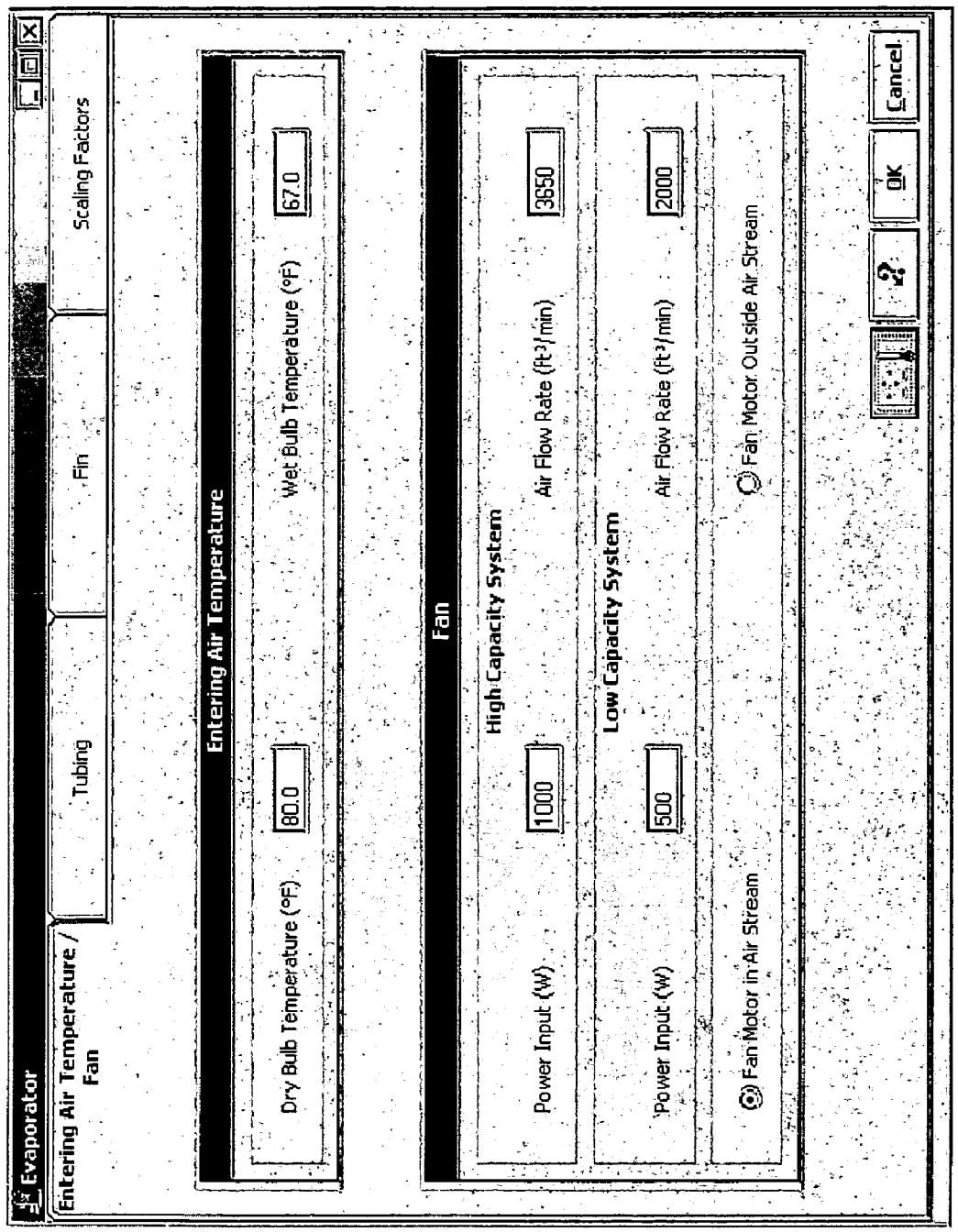
FIG. 12 is a screen-shot illustrating evaporator entering air temperature and air flow inputs for a dual capacity system.
Figure 13:
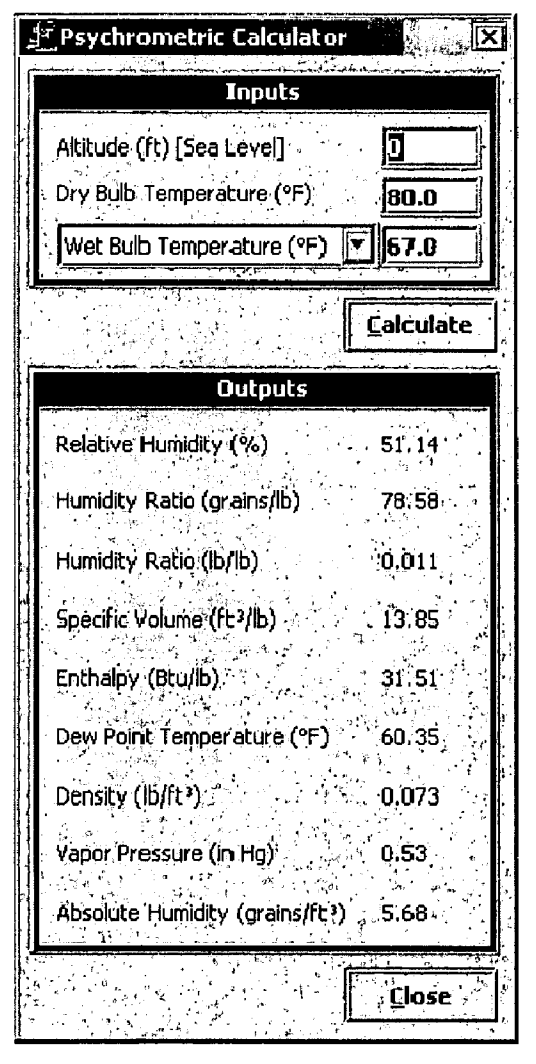

FIG. 11 provides a screen-shot of an Entering Air and Fan input screen for a single capacity system. FIG. 12 provides a screen-shot of an Entering Air and Fan input screen for a dual capacity system. The user may input the entering air information including the dry bulb temperature (° F.) and the wet bulb temperature (° F.). The user may also input the fan information including the air flow rate ($Ft^3$/Min) and power input (Watts). The air flow rate and fan power inputs depend on whether the system is a single capacity or a dual capacity system. The Entering Air Fan input screen also provides access to a Psychrometric Calculator and the option of adding the evaporator fan motor heat to the conditioned air stream. The Psychrometric Calculator is illustrated in FIG. 13 and may be accessed by choosing the button with a thermometer. The Psychometric Calculator provides accurate entering air condition information.

Figure 14:
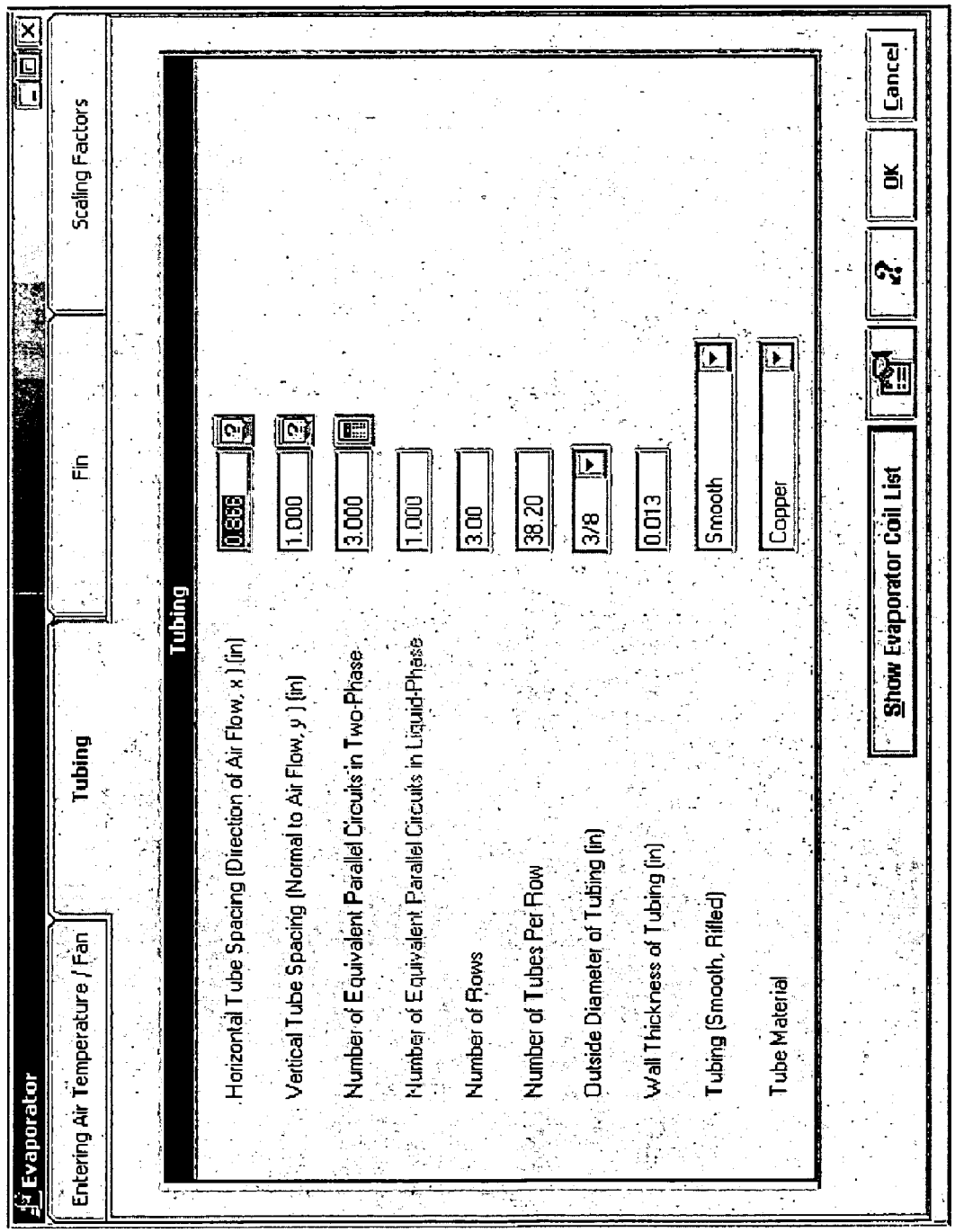
FIG. 14 is a screen-shot illustrating evaporator heat exchanger tubing inputs.
Figure 15:
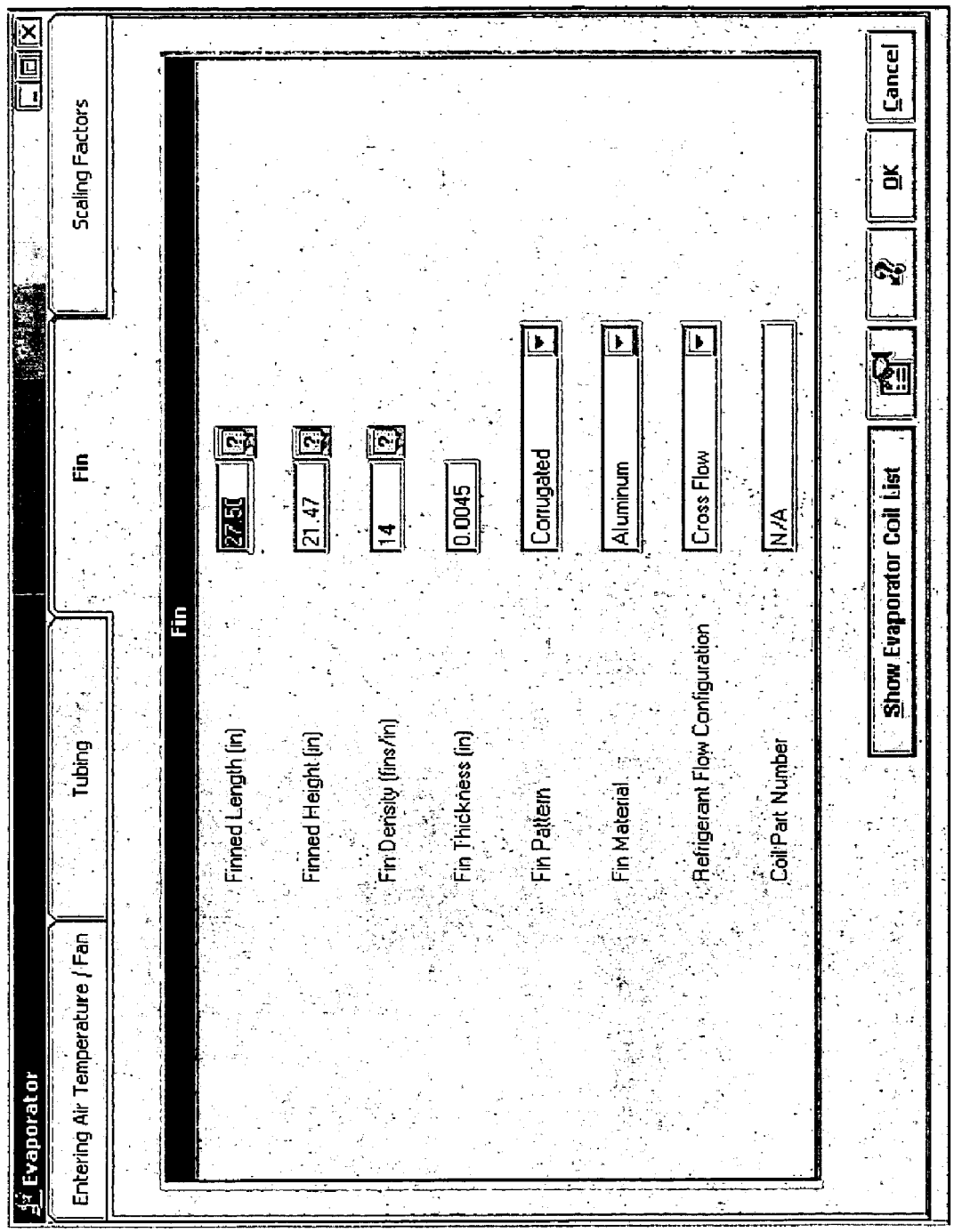
FIG. 15 is a screen-shot illustrating evaporator heat exchanger fin inputs.
Figure 16:
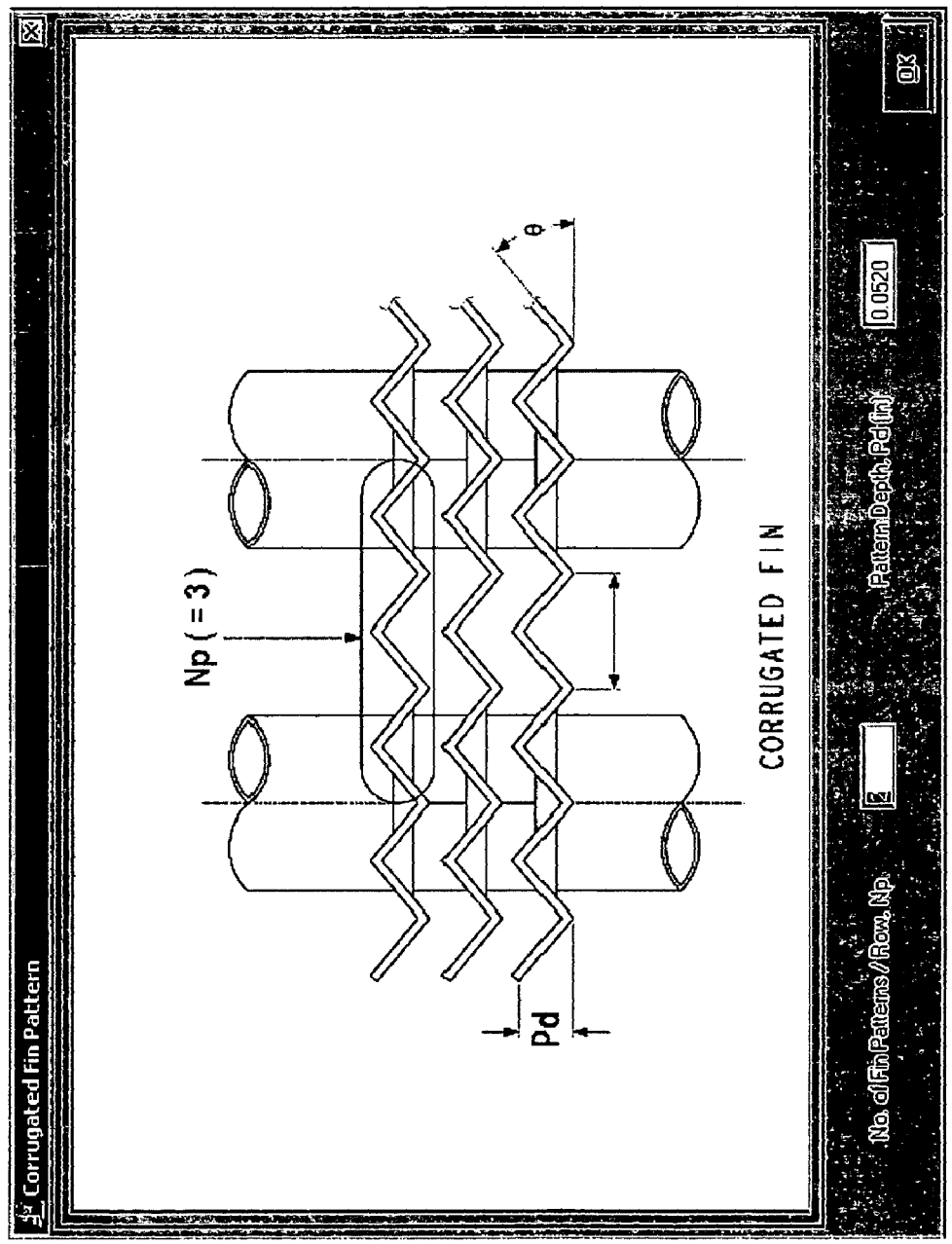
FIG. 16 is a screen-shot illustrating an exemplary corrugated fin pattern for the heat exchanger.

FIG. 14 provides a screen-shot of a Heat Exchanger tubing input screen. The user may input customized geometry information including number of rows, number of equivalent, parallel refrigerant circuits (two-phase and liquid phase), horizontal tube spacing, vertical tube spacing and number of tubes per row, tubing outside diameter, tubing wall thickness, smooth or rifled and tube material (e.g., copper). FIG. 15 provides a screen-shot of a Heat Exchanger fin input screen. The user may input geometry information including finned length, finned height, fin density, fin thickness, fin pattern, fin material, refrigerant flow configuration and coil part number. FIG. 16 provides a screen illustrating fin customization.

Figure 17:
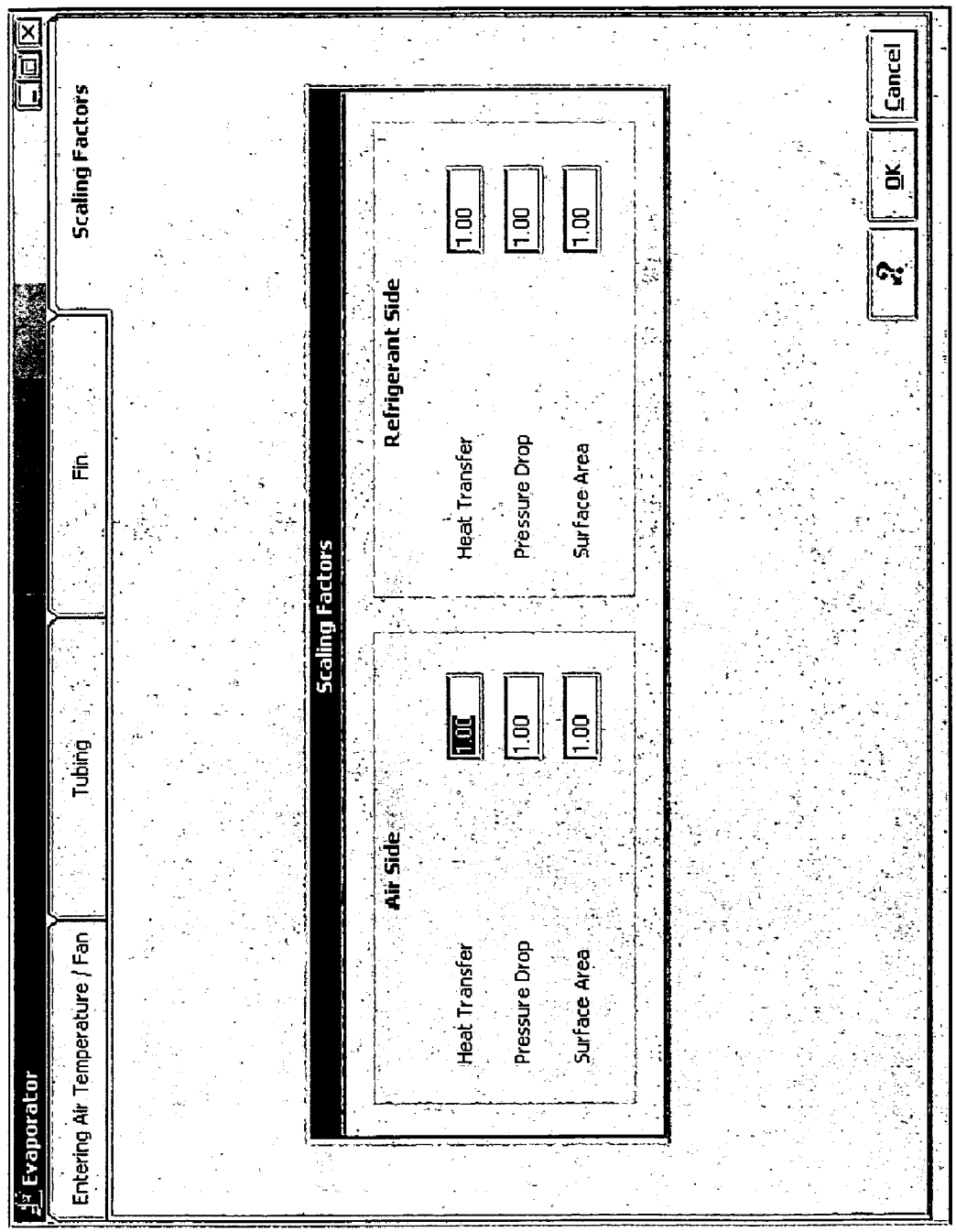
FIG. 17 is a screen-shot illustrating evaporator scaling factor inputs.

FIG. 17 provides a screen-shot of an Evaporator scaling factors input screen. The scaling factors may be divided into air side and refrigerant side groups. The air side group may include heat transfer, pressure drop and surface area scaling factors. The refrigerant side group may include heat transfer, pressure drop and surface area scaling factors. The scaling factors may enable the user to adjust the simulation results to match measured system performance.

Figure 18:
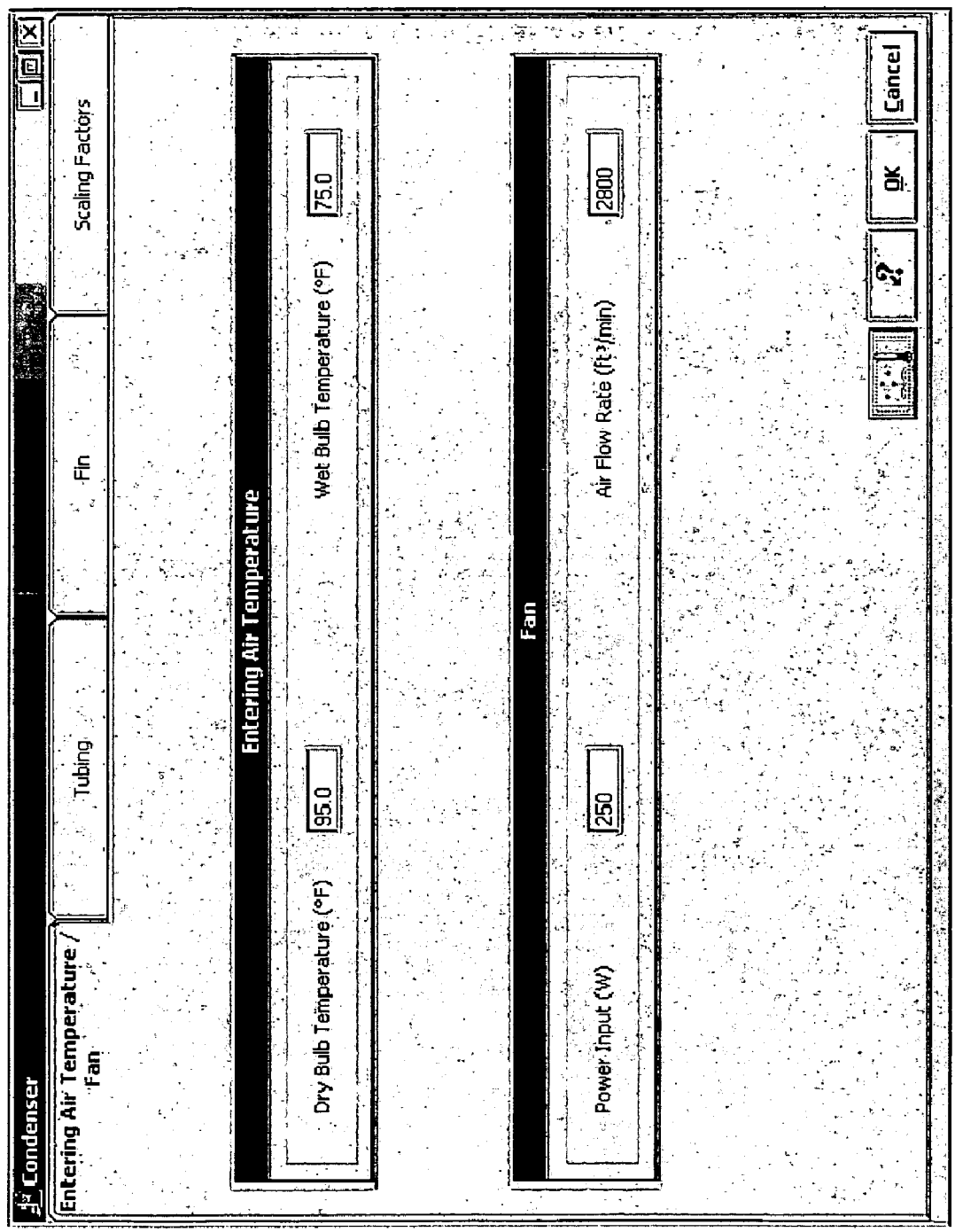
FIG. 18 is a screen-shot illustrating condenser entering temperature and air flow inputs for a single capacity system.
Figure 19:
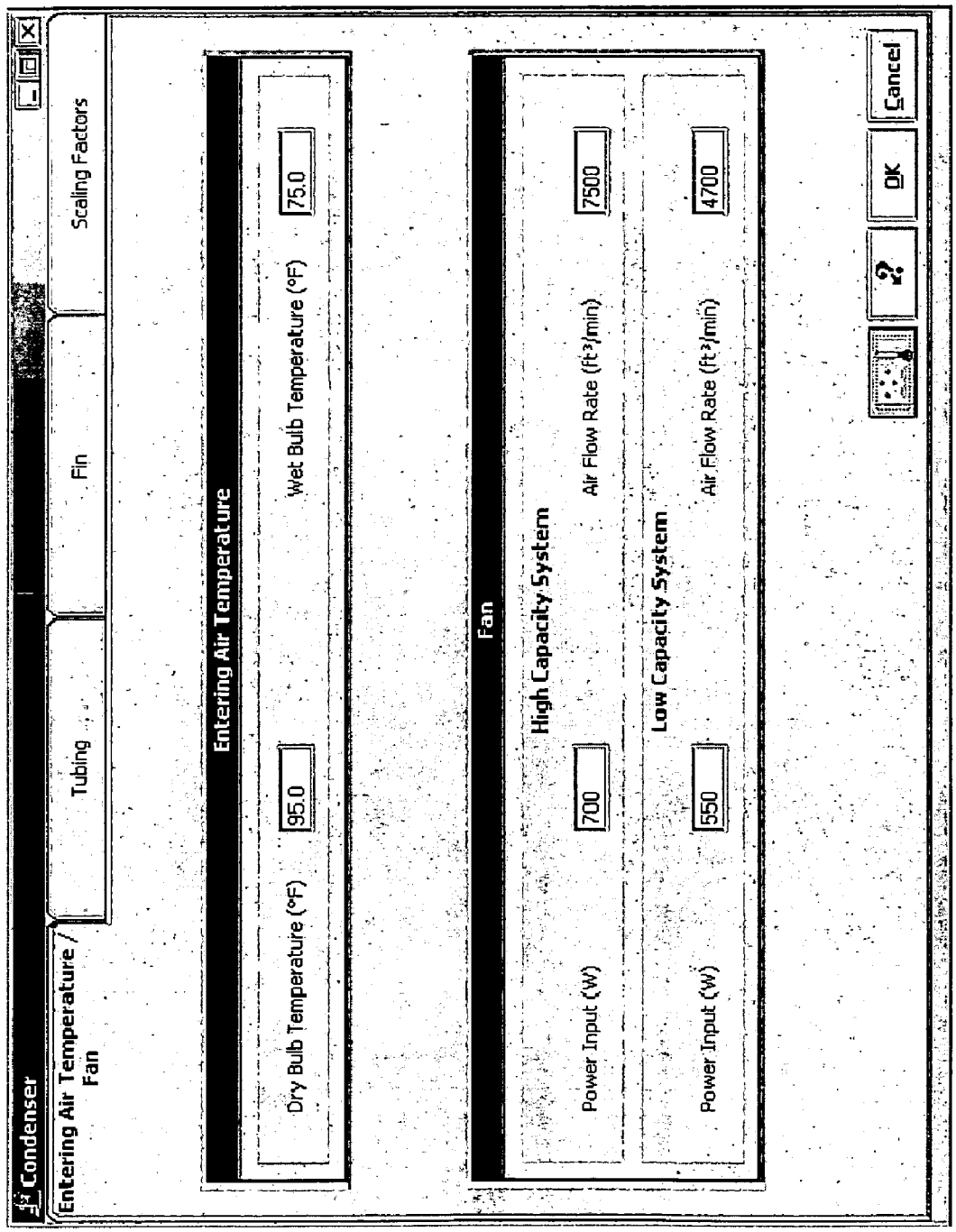
FIG. 19 is a screen-Shot illustrating condenser entering temperature and air flow inputs for a dual capacity system.

The user may customize data for the condenser. The data for the condenser may be entered by opening the condenser screen. The user may access this screen either by choosing Inputs on the toolbar and the Condenser menu or by clicking on the condenser image on the main screen. This opens a condenser dialog screen, which is illustrated in FIG. 18 for a single capacity system and FIG. 19 for a dual capacity system. Initially, the user may input entering air temperature data and fan parameters. The entering air temperature data may include dry bulb temperature (° F.) and wet bulb temperature (° F.). The fan parameters may include air flow rate ($ft^3$/min) and power input (Watts).

Figure 20:
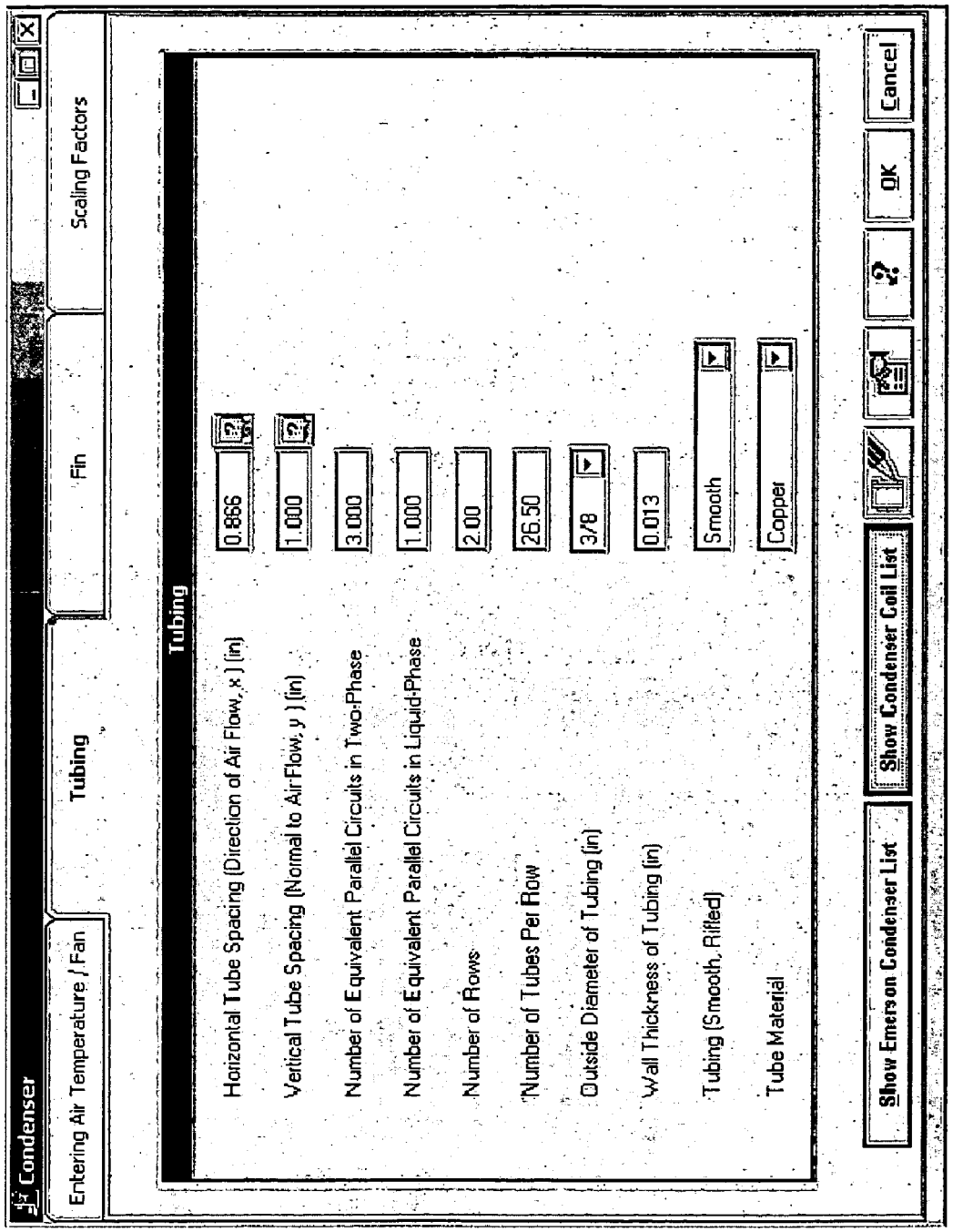
FIG. 20 is a screen-shot illustrating condenser heat exchanger tubing inputs.
Figure 21:
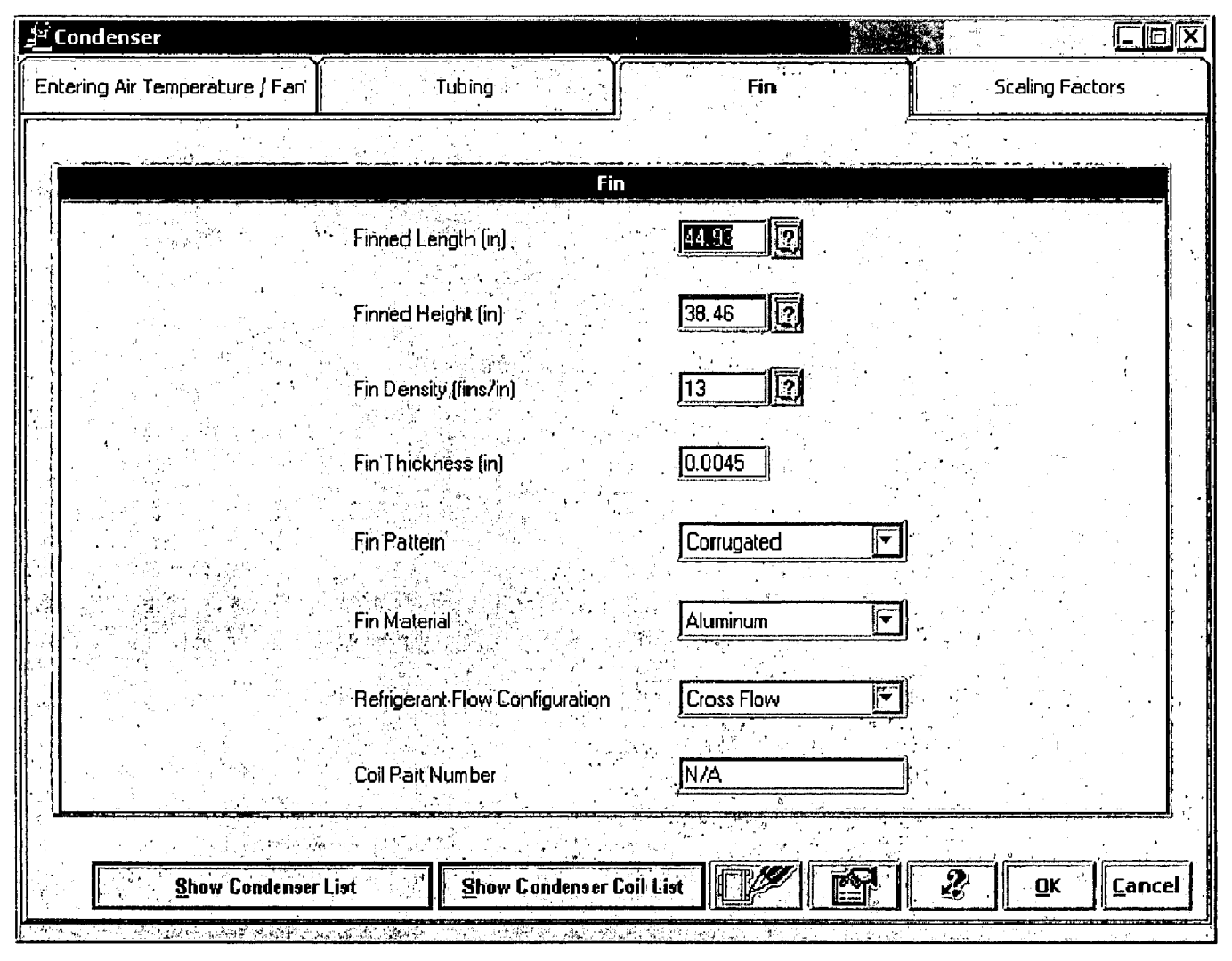
Figure 22:
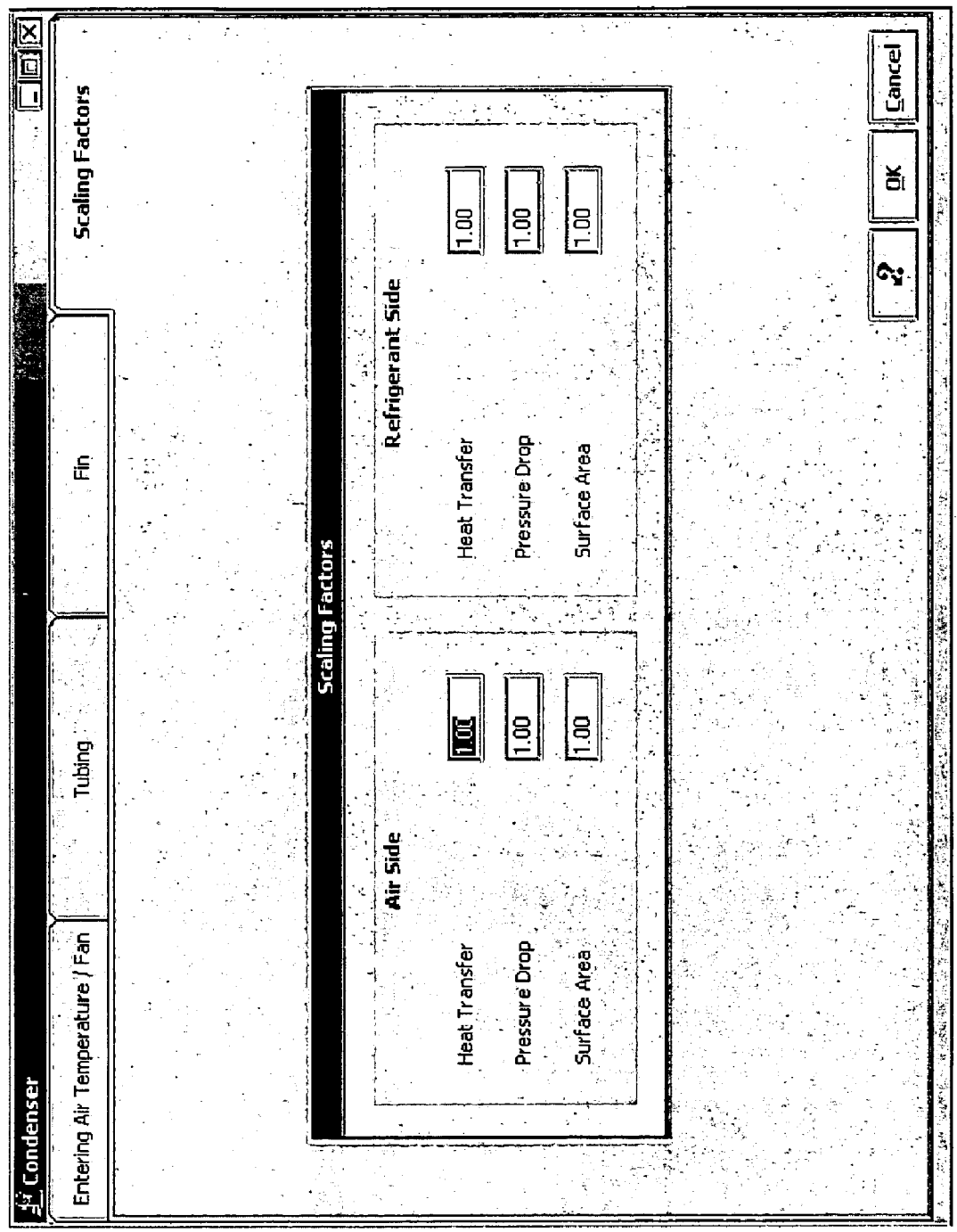
FIG. 22 is a screen-shot illustrating condenser scaling factor inputs.

FIG. 20 provides a screen-shot of a Condenser Heat Exchanger tubing input screen. The user may customize the geometry information similar to that described above with regard to FIG. 14. FIG. 21 provides a screen-shot of a Heat Exchanger fin input screen. The user may input geometry information similar to that described above with regard to FIG. 15. FIG. 22 provides a screen-shot of a condenser Scaling Factors input screen. The scaling factors may be divided into air side and refrigerant side groups and may include those described above with regard to FIG. 17.

Referring now to FIG. 23, the user may select a specific condenser from a list of available models. The user may access a database by clicking on the Show Condenser List button on the bottom left corner of tubing input screen. A table with condenser information appears. The user may scroll through the condenser list to find the condenser model that meets system requirements. The condenser list is initially ordered by condenser part number. The user may re-order the condenser list by another parameter by clicking on that parameter in the top row of condenser list. Condenser geometry parameters are automatically entered in the appropriate fields of the Condenser screen when user selects a condenser by double clicking on the condenser part number. An engineering drawing of a particular condenser (not shown) is provided upon the user's request.

Figure 24:
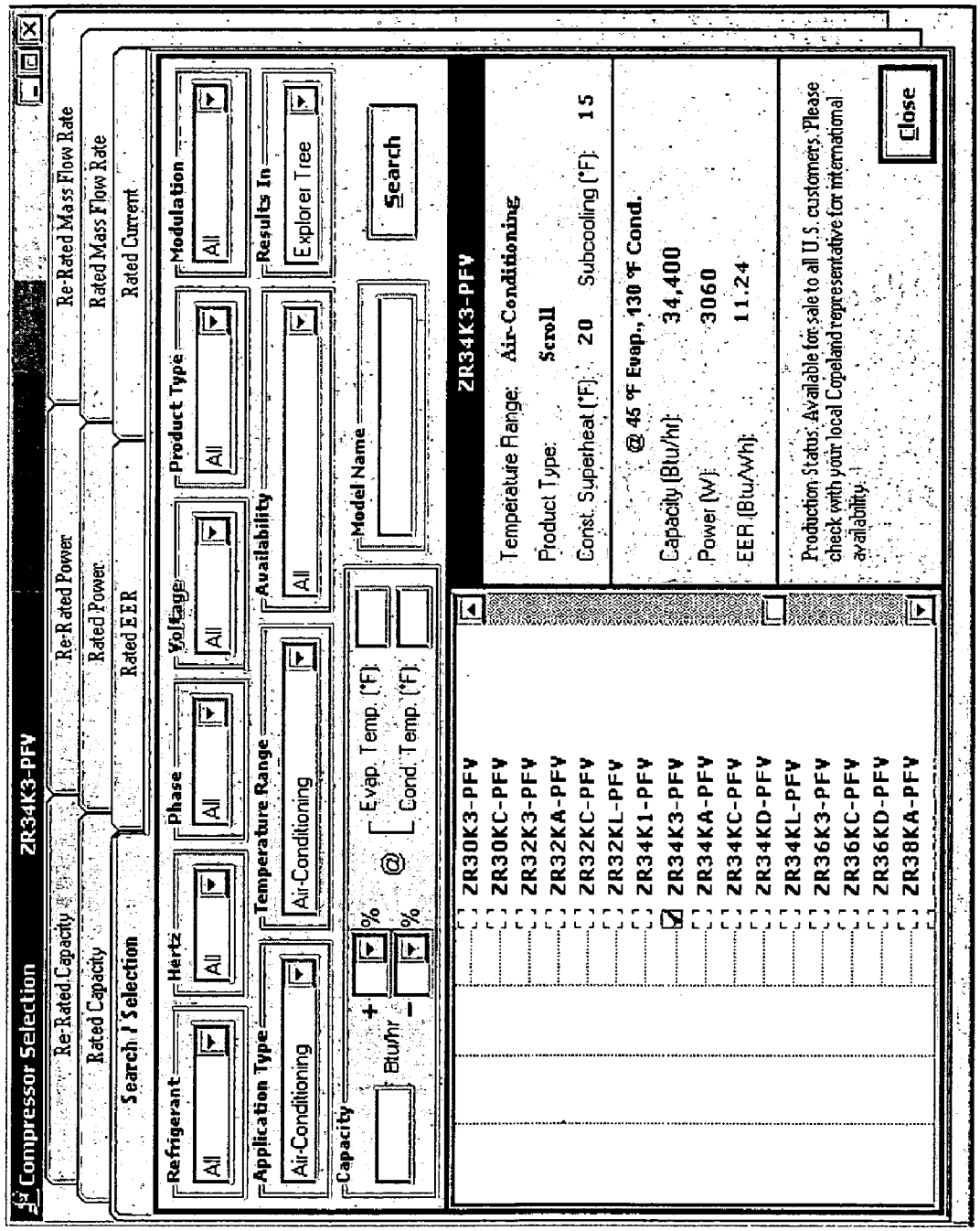
FIG. 24 is a screen-shot illustrating compressor search and selection inputs.

Referring now to FIG. 24, the user may access a database of manufacturer's compressors (both air-conditioning and refrigeration compressors models). The user may search and view the details of all available compressors. The compressor details may include compressor type (e.g., semi-hermetic, hermetic, scroll, etc.), application type (e.g., refrigeration and air-conditioning), temperature range (e.g., air-conditioning, medium temp. high temp., etc.), voltage, frequency, capacity, power, amps, compressor operating envelope and re-rating of compressor performance to a user specified condition. The compressor selection screen may be accessed either by choosing Inputs from the toolbar and Compressor menu or by clicking on the compressor image in the main screen.

Figure 25:
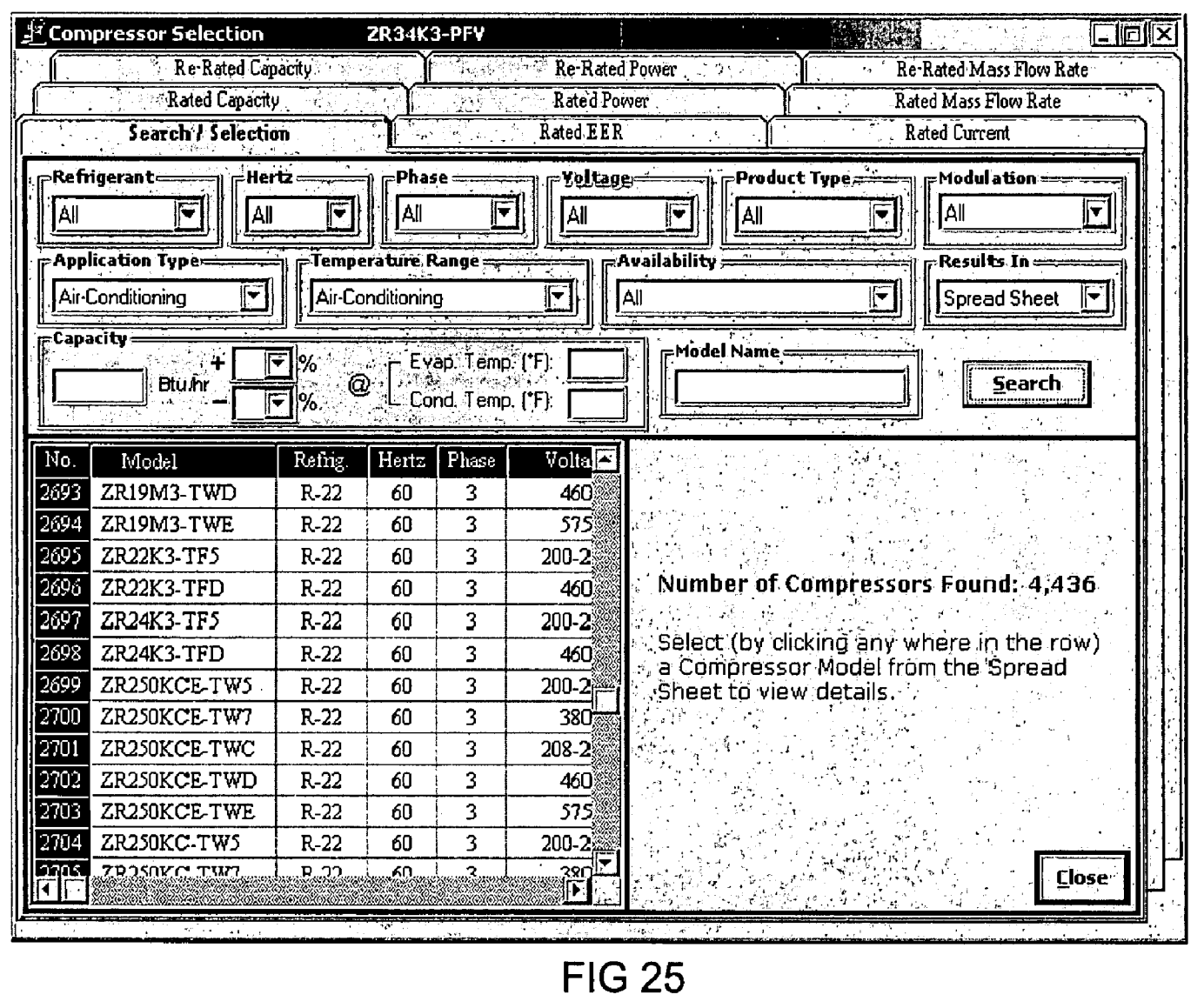
Figure 26:
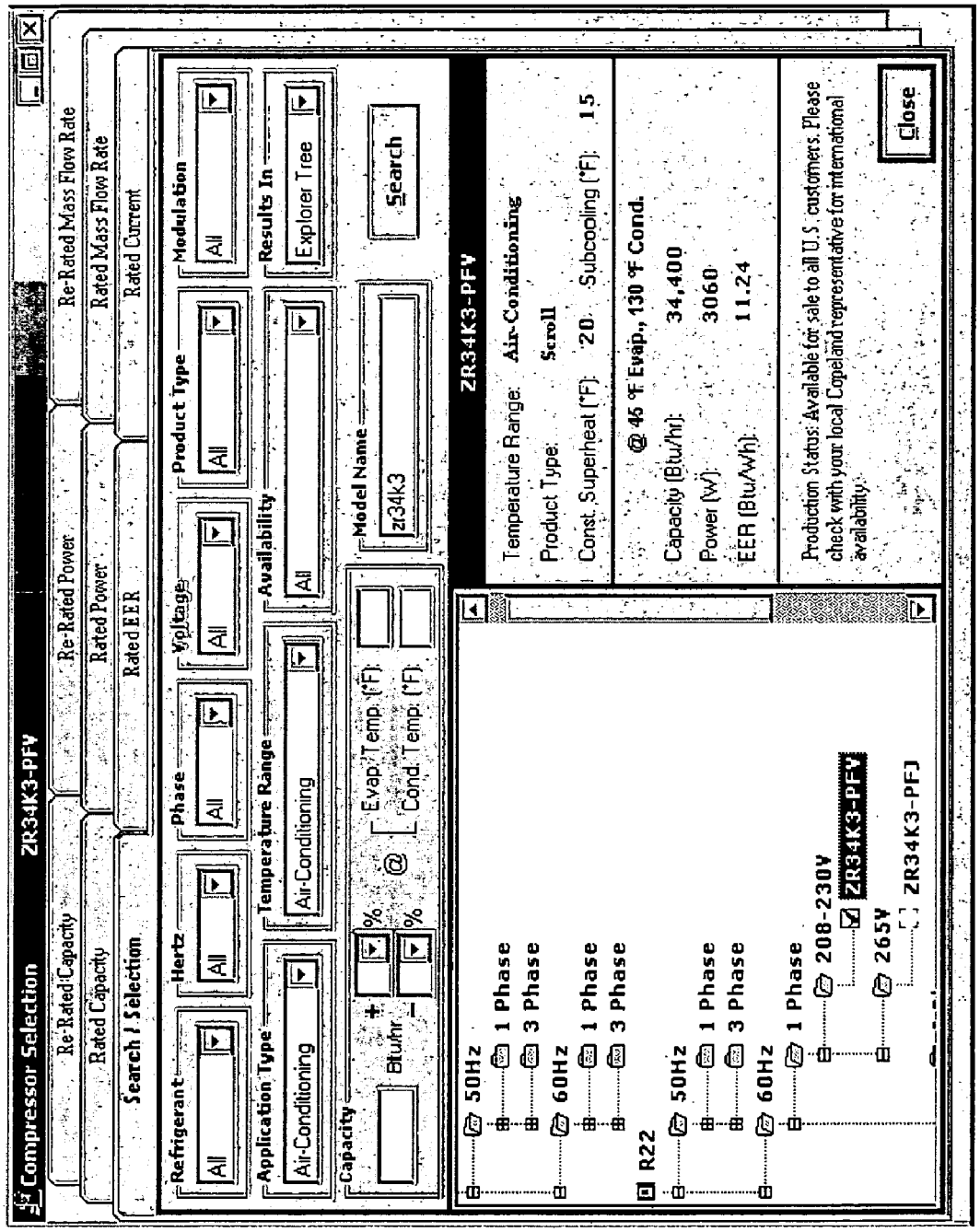
FIG. 26 is a screen-shot illustrating compressor details for an exemplary compressor selected from the search results.
Figure 27:
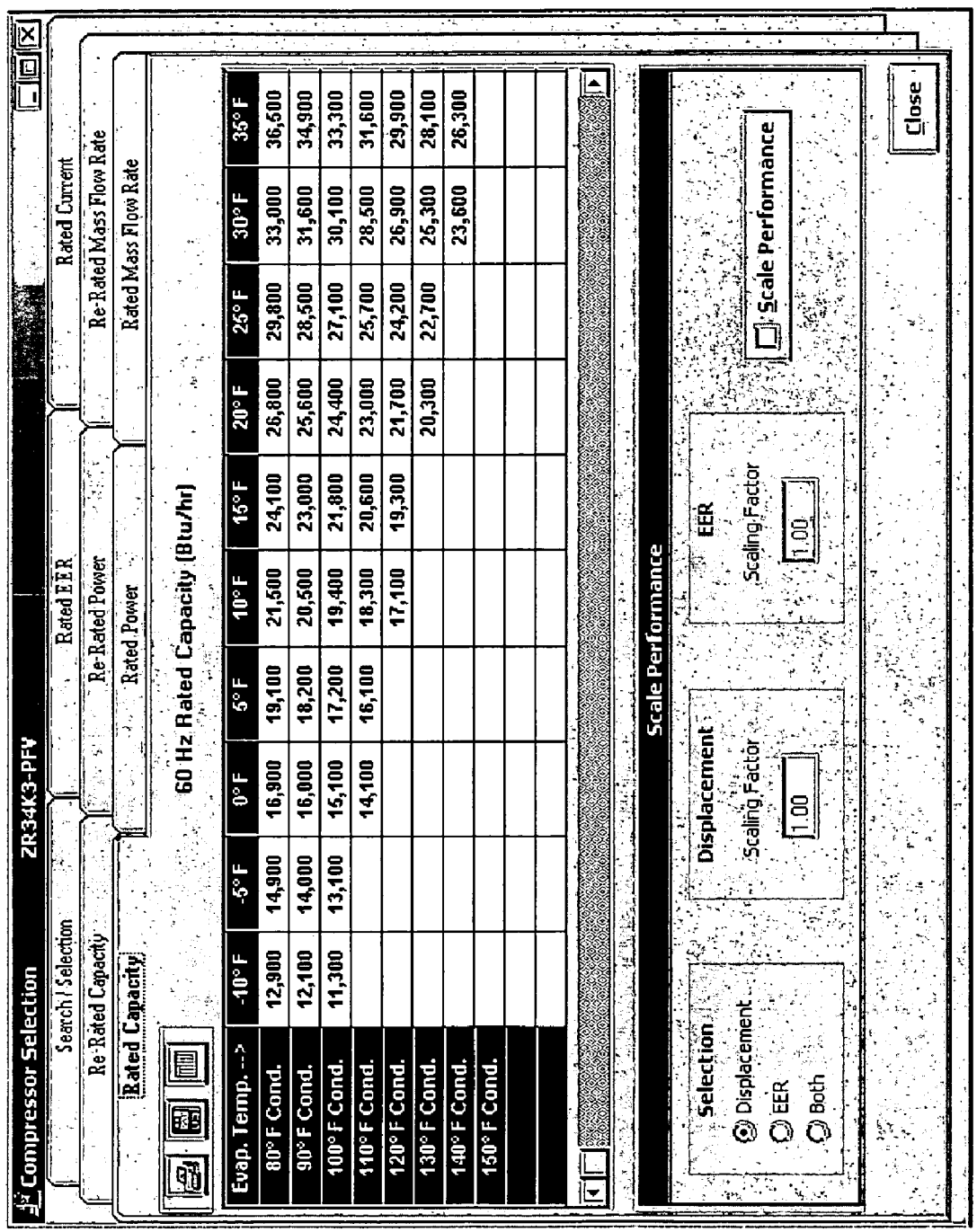
FIG. 27 is a screen-shot illustrating compressor rated capacity values.
Figure 28:
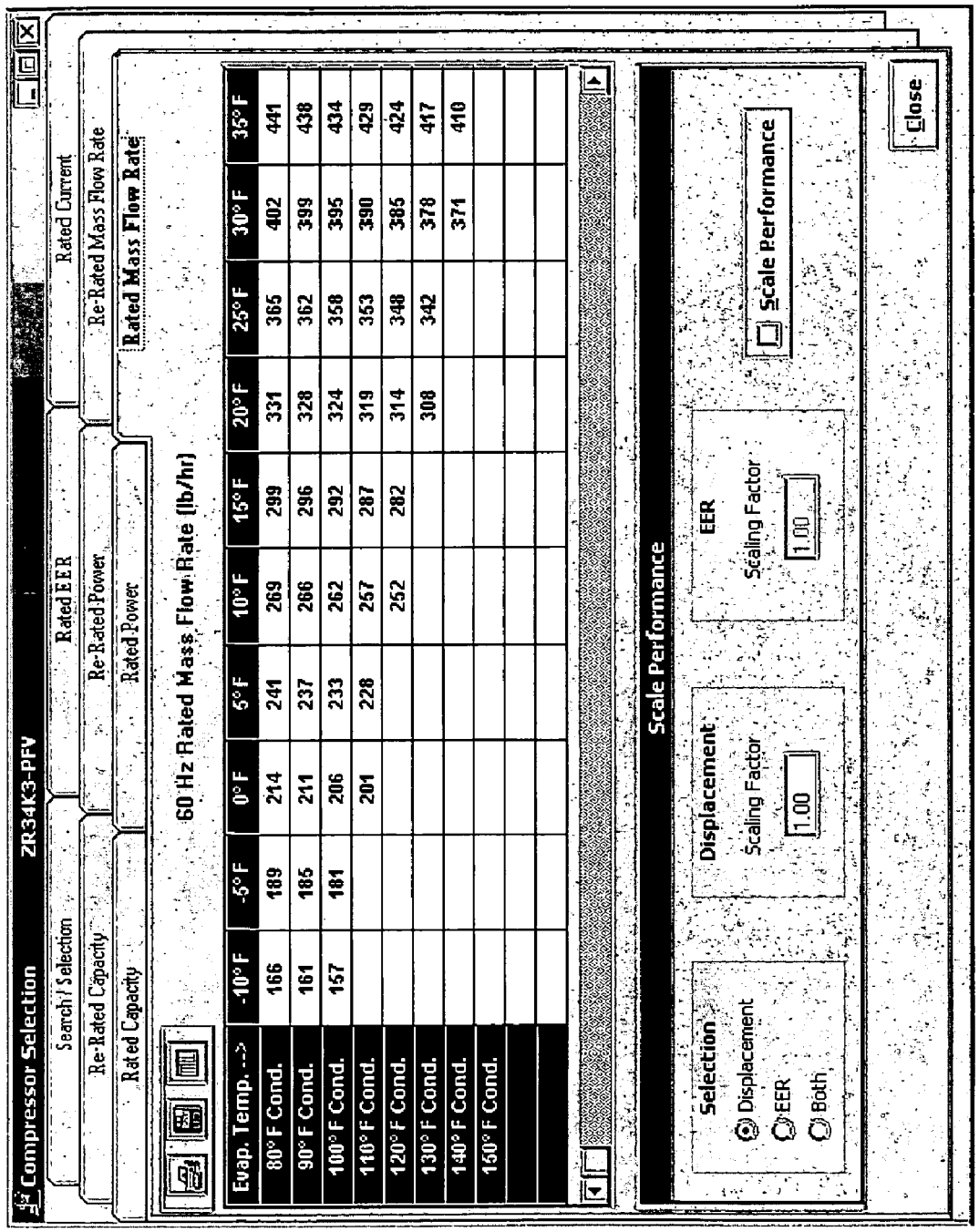
FIG. 28 is a screen-shot illustrating compressor rated mass flow rate values.
Figure 29:
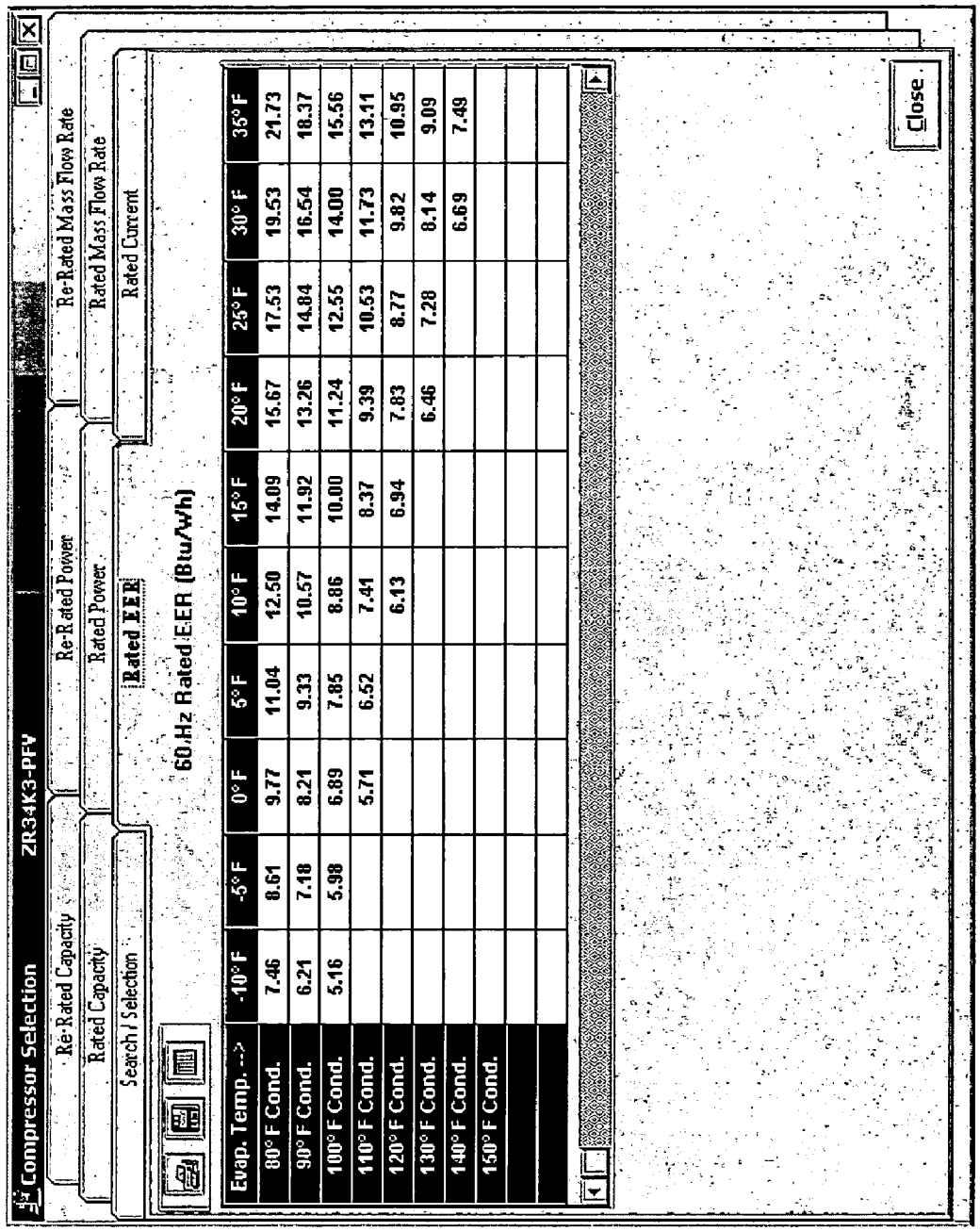
FIG. 29 is a screen-shot illustrating compressor rated EER values.

Referring now to FIGS. 25 and 26, the compressor database may be searched by entering a known compressor model in the Model Name field and clicking the Search button. The model name can be complete or partial. For example, if the user enters the model name as ZR34K3-PFV and Refrigerant R-22, the search is very specific and only the ZR34K3-PFV compressor will show up in the search result. However, if the user enters the model name as ZR, all the models starting with ZR will appear in the compressor result list. The search settings and the results include compressor model (e.g., ZR34K3), voltage, phase and frequency, application (e.g., air-conditioning), product type (e.g., scroll), capacity, power and energy efficiency ratio (EER) at a specified rating point (e.g., 45° F. Evaporator, 130° F. Condenser), record date and tested condition (e.g., return gas temperature/superheat and subcooling). Capacity, power and current (amp) data over the entire operating range of the compressor are shown in the Rated Capacity, Rated Power and other tabs (see FIGS. 27 through 30), respectively, once a compressor model is selected from the generated compressor list.

Figure 31:
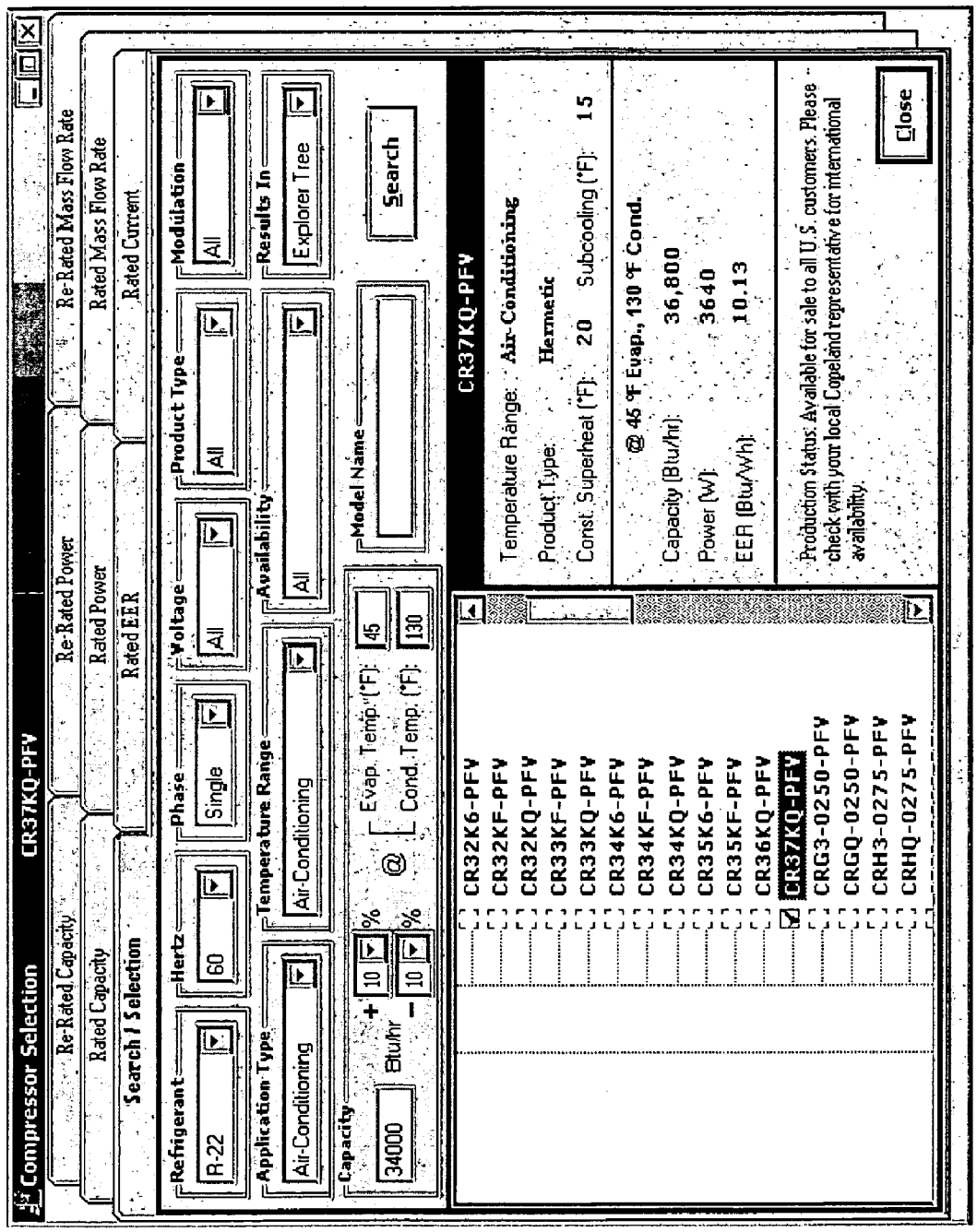
FIG. 31 is a screen-shot illustrating compressor search inputs based on user specified capacity.
Figure 32:
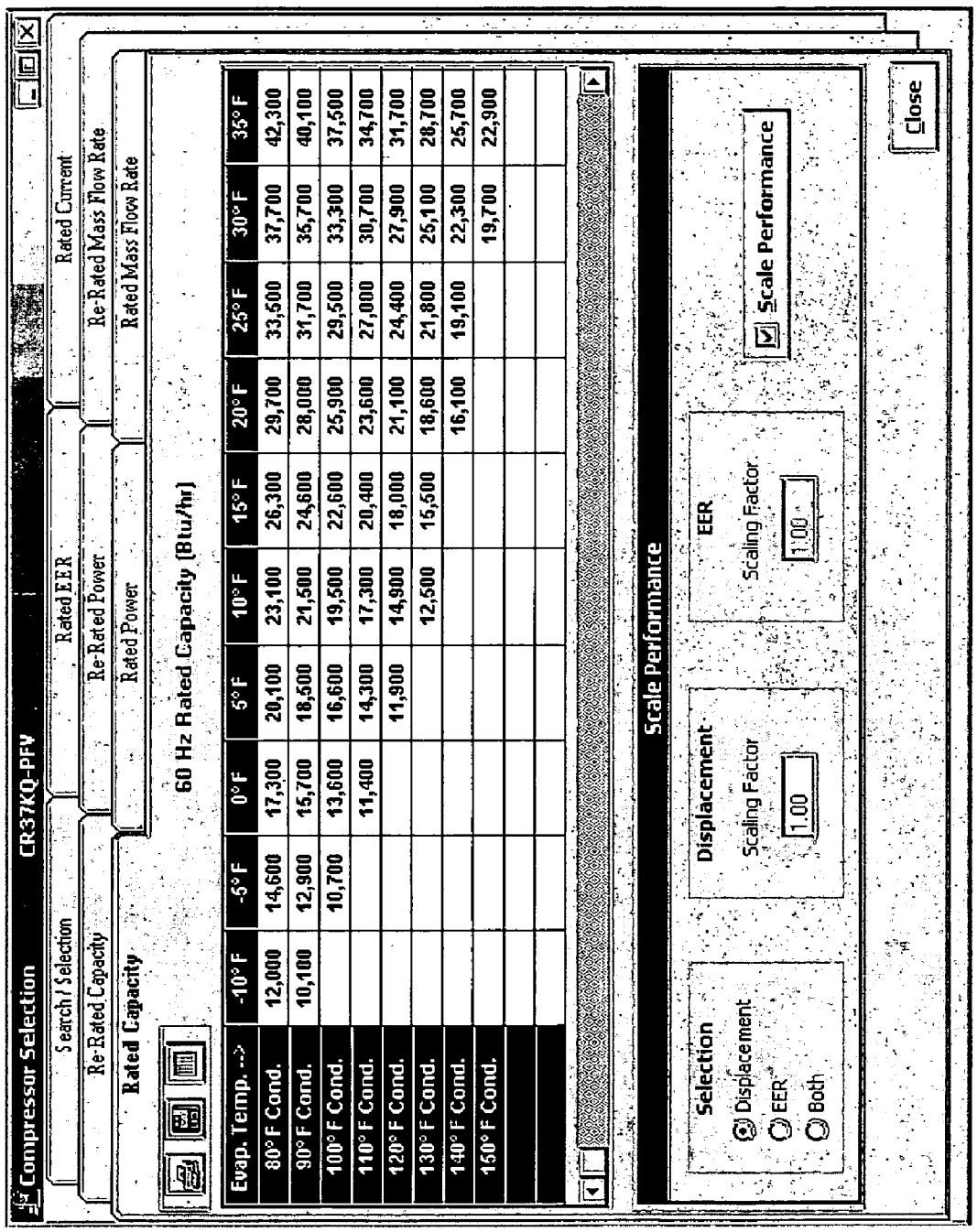
FIG. 32 is a screen-shot illustrating compressor rated capacity.
Figure 33:
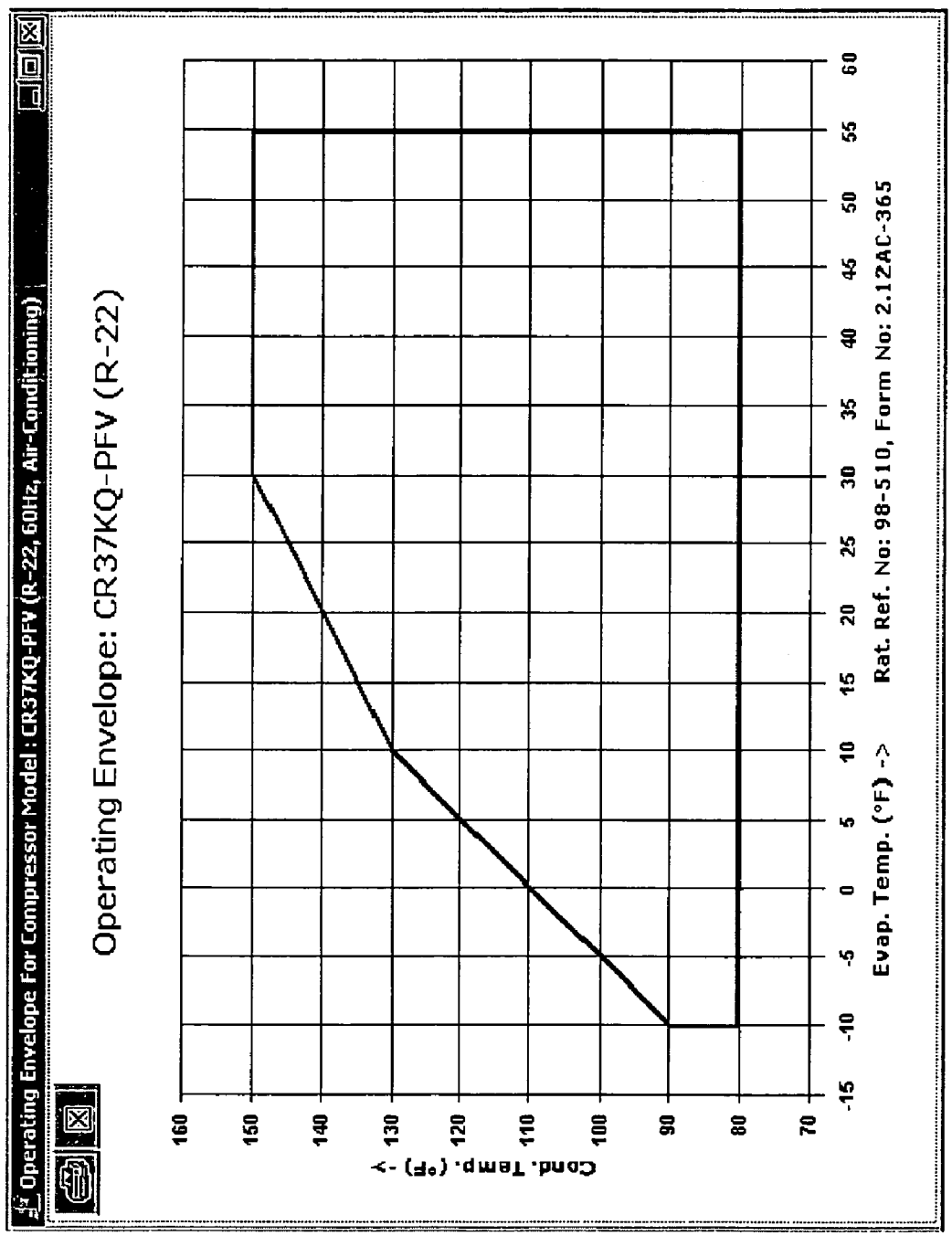
FIG. 33 is a screen-shot illustrating a compressor operating envelope.
Figure 34:
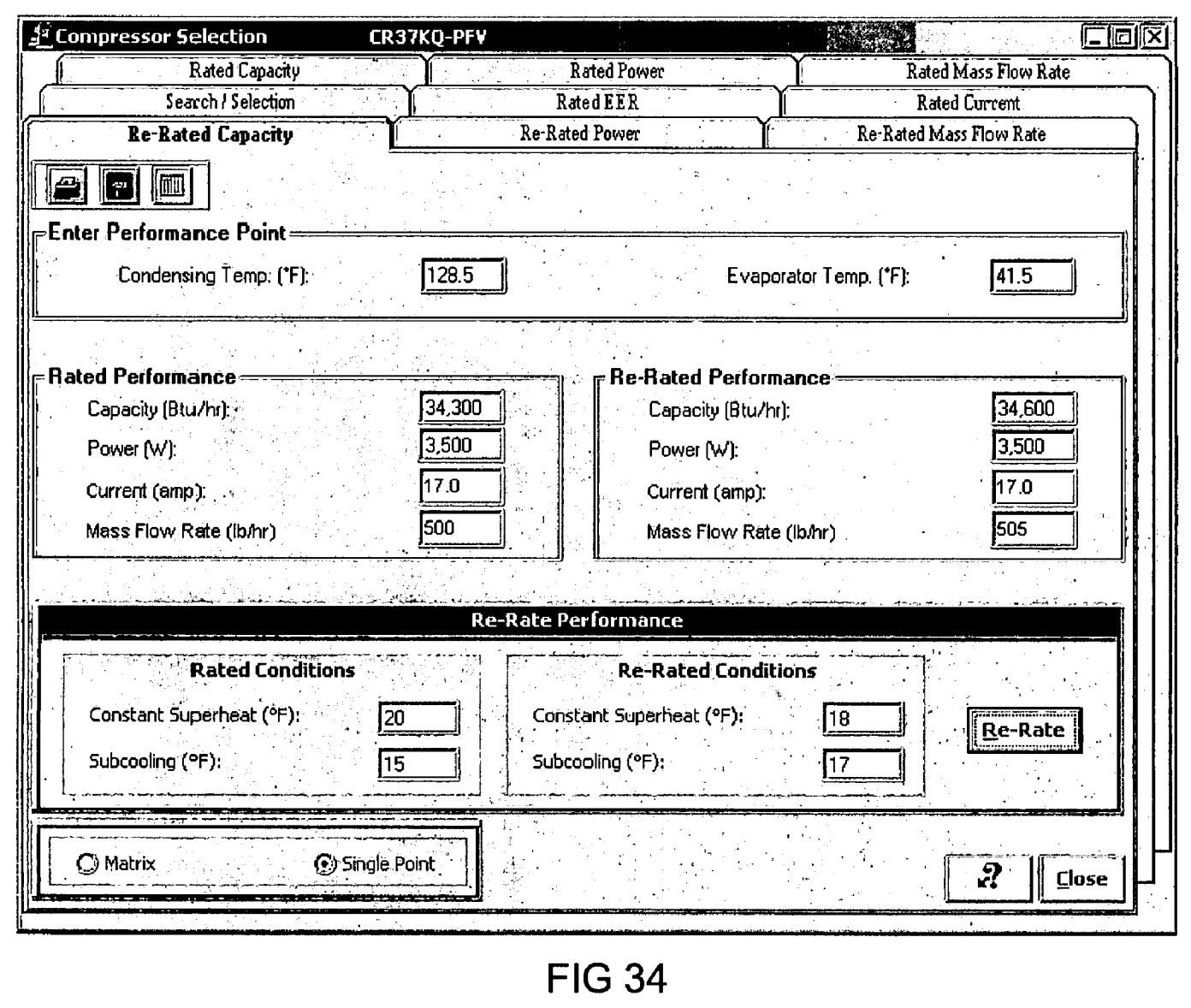

Referring now to FIG. 31, the user can search the compressor database based on a specified capacity range. The user enters a capacity and specifies a capacity tolerance (±5% to ±50%), refrigerant, application and product type and clicks on the Search button. For example, if the user enters the capacity as 34,000 Btu/hr with a capacity tolerance of −10% to +10%, 45° F. evaporator temperature, 130° F. condensing temperature, application type as air-conditioning, product type as scroll and refrigerant as R-22 the search lists several corresponding compressor models. Capacity, power and current information are displayed when the user selects a particular compressor model from the compressor list. Compressor models that are obsolete are highlighted. FIGS. 32 through 34 illustrate relevant compressor information including rated capacity, operating envelope and re-rated capacity, respectively.

Figure 35:
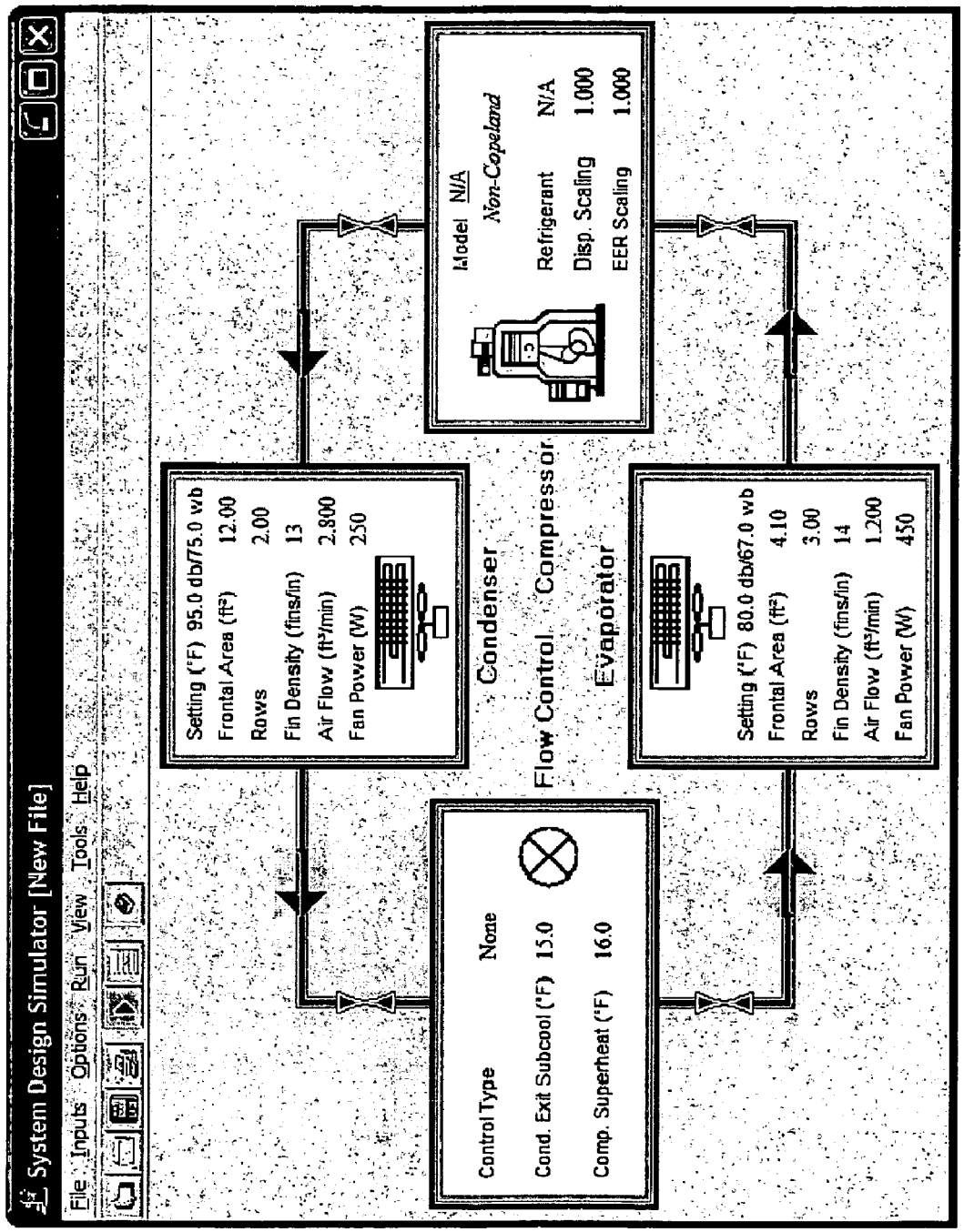
FIG. 35 is a screen-shot illustrating a non-manufacturer specific compressor selection option.
Figure 37:
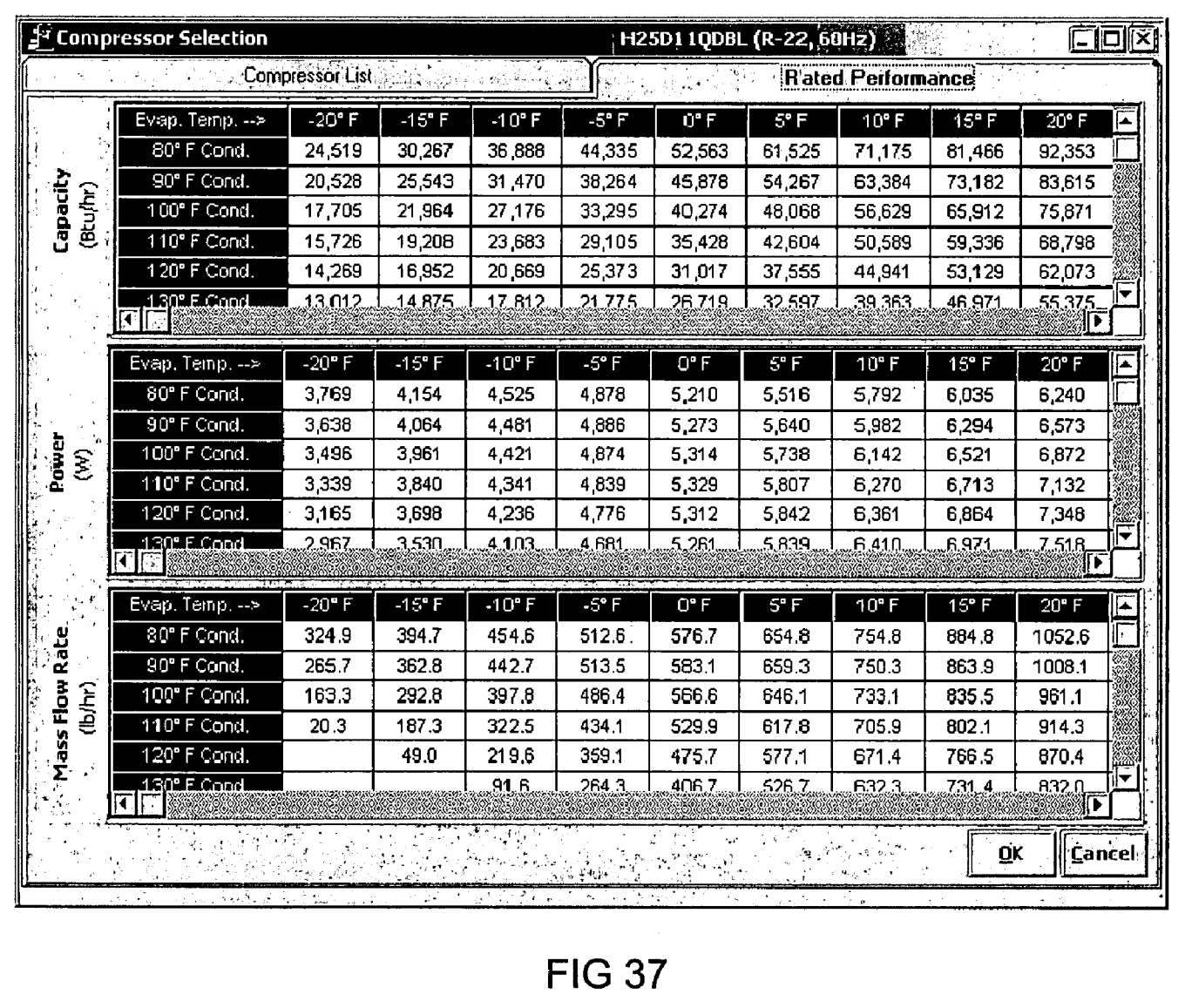

Referring now to FIG. 35, the simulator may enable the user to input a non-manufacturer specific or user-specified compressor. Access to the framework for adding user specified compressor performance may be achieved by left clicking on the compressor image to open a compressor selection dialog screen illustrated (see FIG. 36). Compressor performance is added via the 10 term ARI Coefficients for capacity (Btu/hr), refrigerant mass flow rate (lb/hr), power input (Watt) along with other inputs and may be saved for future use. Compressor performance is selected by double clicking the part number. The user may also view the compressor performance in the tab Rated Performance shown in FIG. 37.

Figure 38:
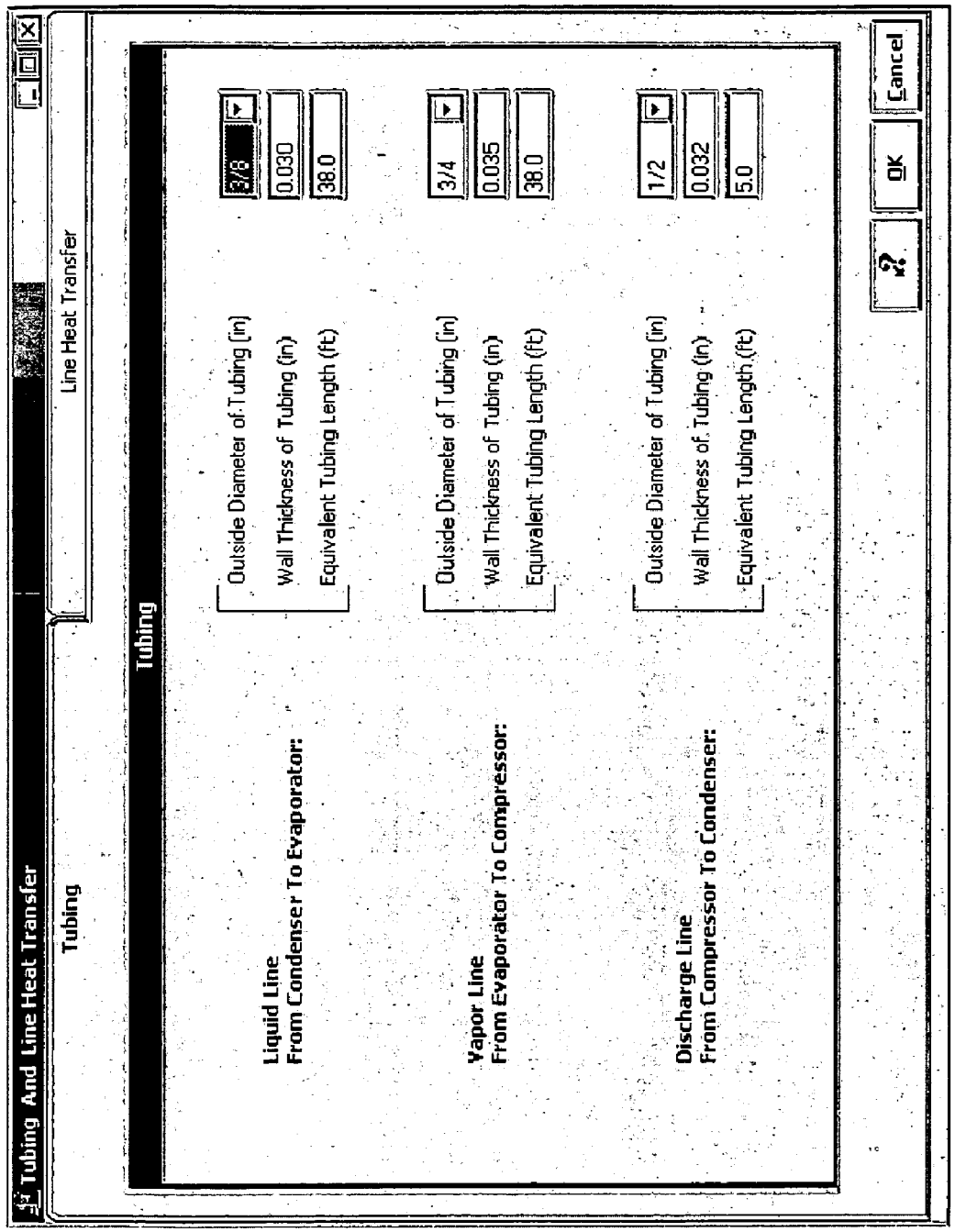
FIG. 38 is a screen-shot illustrating tubing and line heat transfer inputs.
Figure 39:
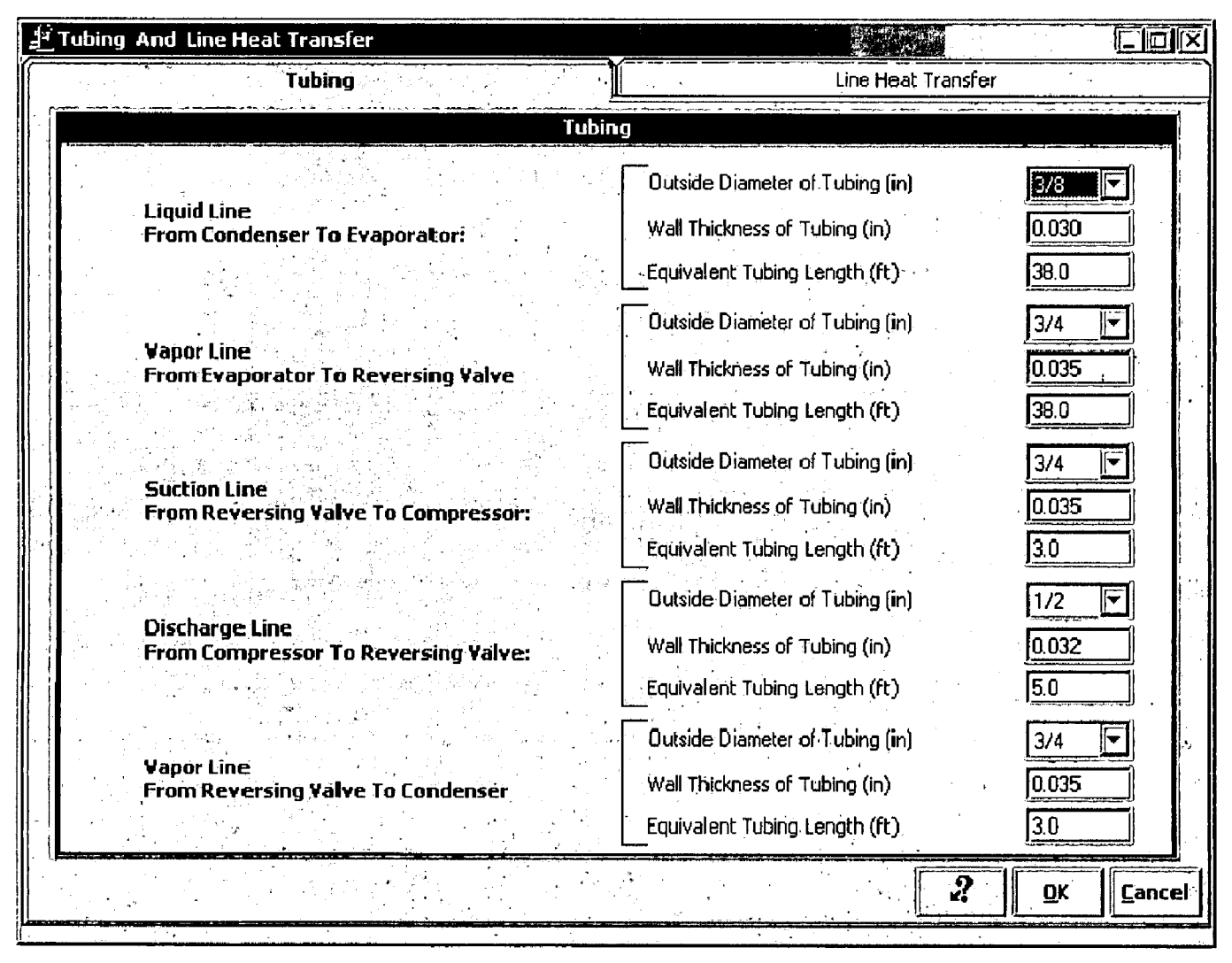

Referring now to FIGS. 38 and 39, the tubing connecting the main system components may require several inputs which change automatically depending upon system type (i.e., air-conditioner (FIG. 38) or heat pump (FIG. 39)) and its operation mode (i.e., heating or cooling). The inputs required may be grouped in two categories: (i) tubing geometry and (ii) equivalent tubing lengths of connecting tubing of the system. The tubing geometry (i.e., wall thickness) is entered automatically when the user selects the tube size (i.e., outside diameter) from the drop down list. This list is based on standard tubing sizes used in the air-conditioning industry.

Figure 40:
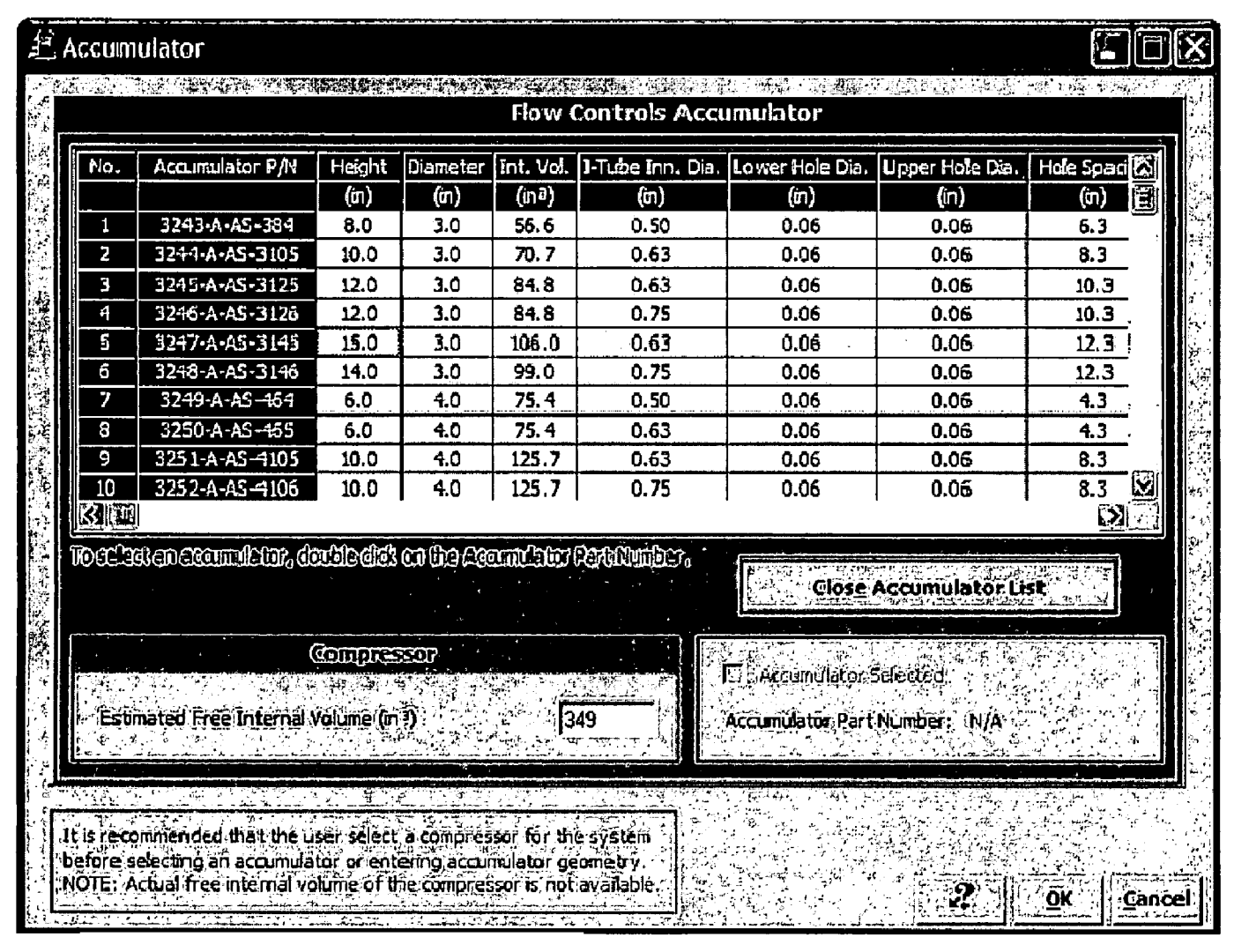
Figure 41:
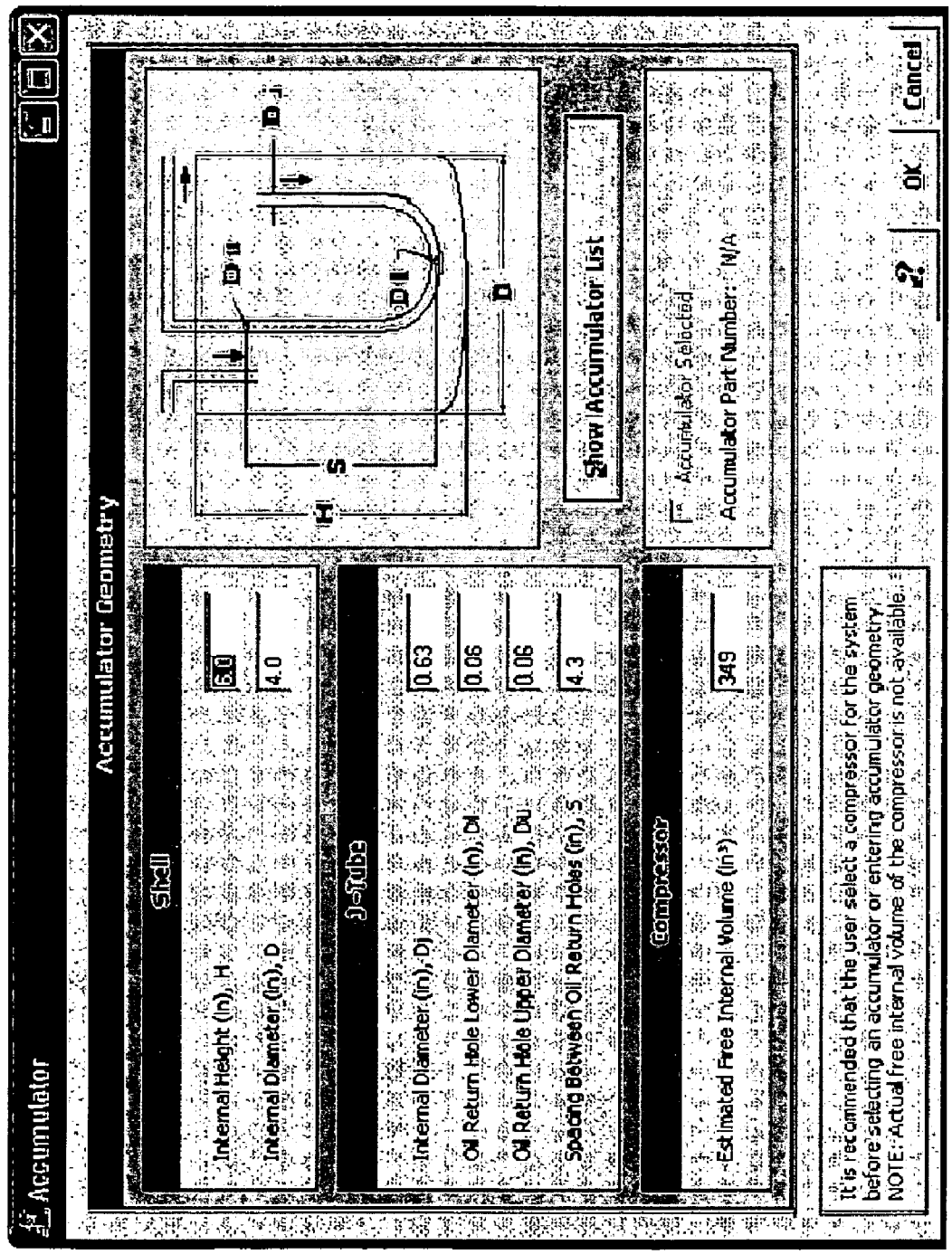
FIG. 41 is a screen-shot illustrating accumulator geometry inputs.

Referring now to FIGS. 40 and 41, the user may add an accumulator to the cooling system simulation. To add an accumulator, the user may select the Accumulator under the Options menu in the main screen. An Accumulator image appears in the main screen between the evaporator and the compressor. To remove the accumulator, the user may unselect the Accumulator under the Options menu.

The user may input the accumulator configuration parameters including shell, J-tube and compressor. The shell parameters include internal height and internal diameter. The J-tube parameters include internal diameter, oil return hole lower diameter, oil return hole upper diameter and spacing between oil return holes. The compressor parameters include estimated free internal volume.

The user may select an accumulator from an accumulator database, which automatically inputs the configuration parameters. By clicking on the Show Accumulator List button, the user may browse the database of available accumulators. The database is initially ordered by part number (P/N) field. The user may re-order the list by clicking the desired parameter on the top row (header row). An accumulator is selected from the list by double clicking on the desired accumulator P/N.

Figure 42:
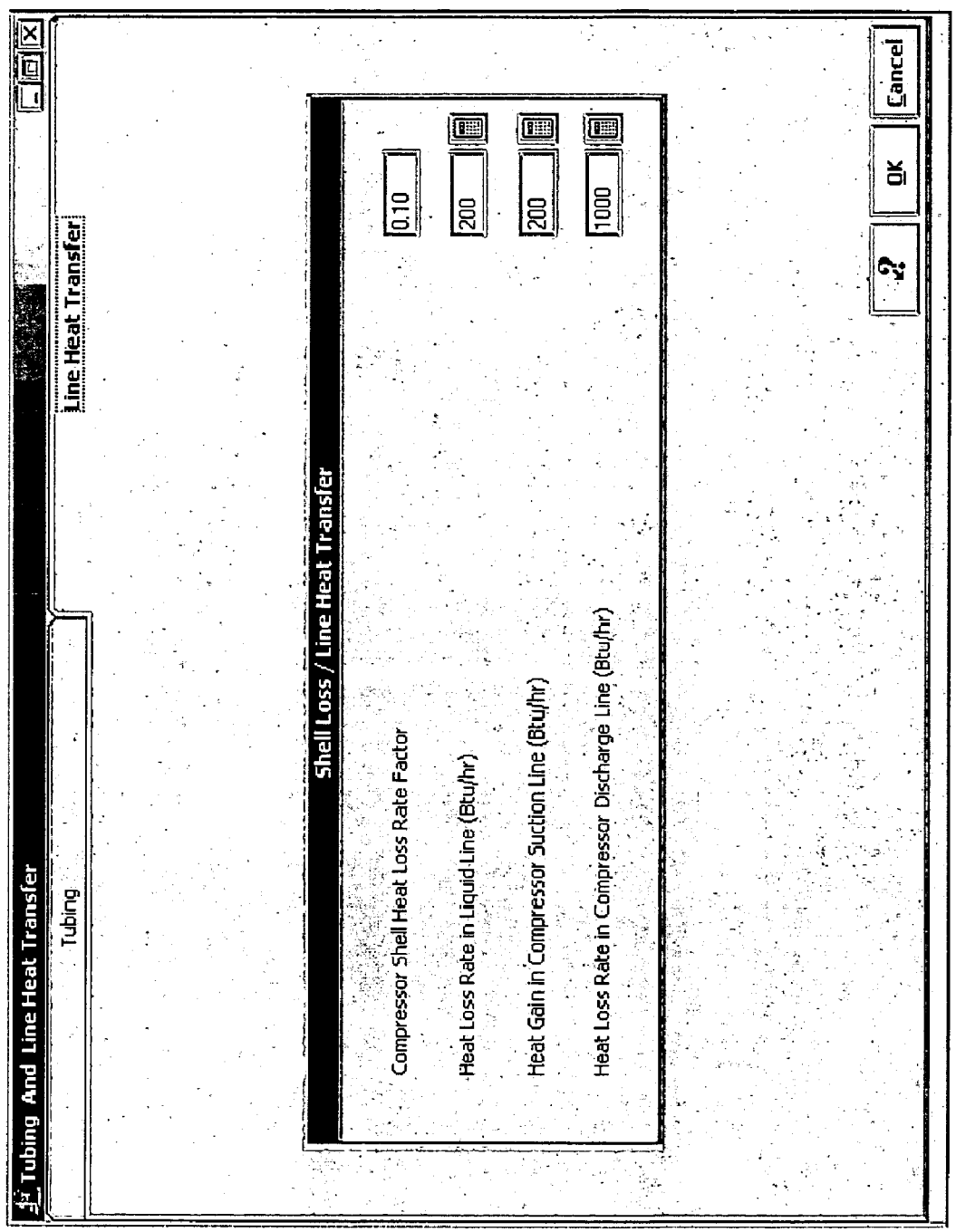
FIG. 42 is a screen-shot illustrating line heat transfer inputs.
Figure 43:
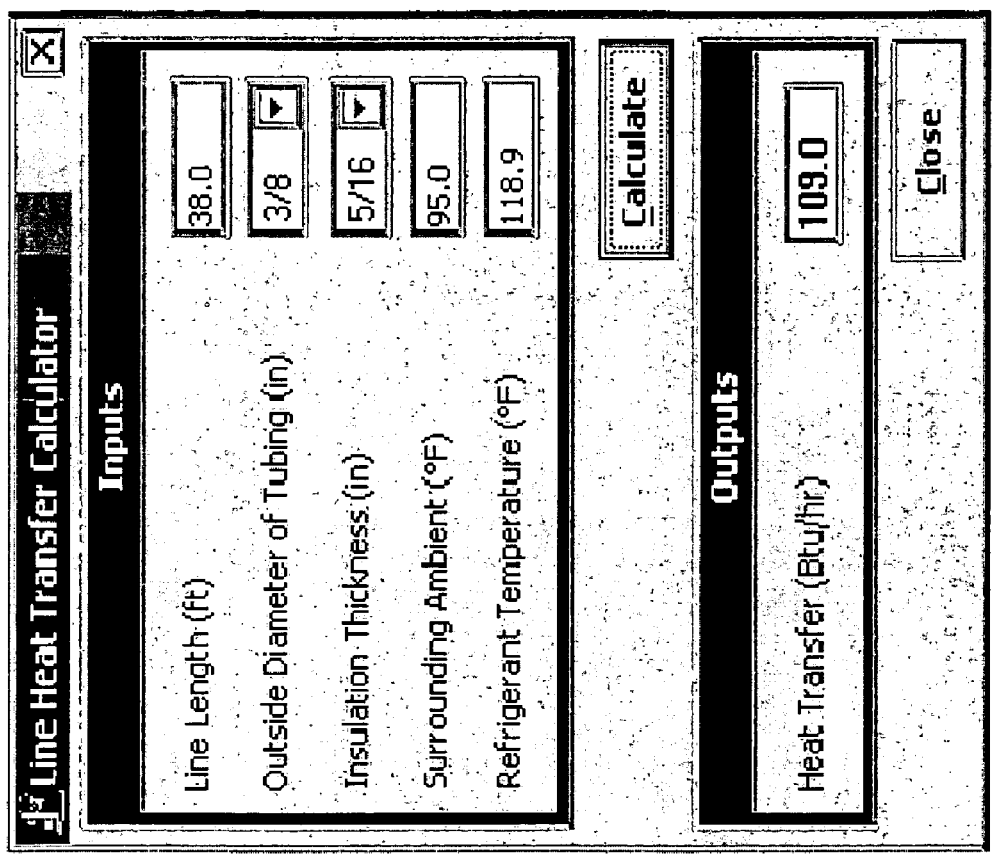
FIG. 43 is a screen-shot illustrating a line heat transfer calculator

Connecting tubing Heat Transfer and Shell Loss Factors may be accessed by choosing the Line Heat Transfer tab (see FIG. 42). The user may enter connecting tubing heat transfer data based on an estimation procedure or using the Line Heat Transfer Calculator provided in the simulator (see FIG. 43). Shell heat loss rate is defined as a fraction of the compressor power input in the system. The Line Heat-Transfer Calculator may be accessed by choosing the Calculator button located near the heat transfer input for Liquid, Suction and Discharge Line inputs. This calculator reads the user inputs in the relevant screens and provides a convenient method of estimating the line heat transfer. The Calculated value can be automatically entered in the Line Heat Transfer screen when the user selects the results obtained from the Calculator. The Calculator's procedure is based on an American Society of Heating and Refrigeration Engineers publication.

Figure 44:
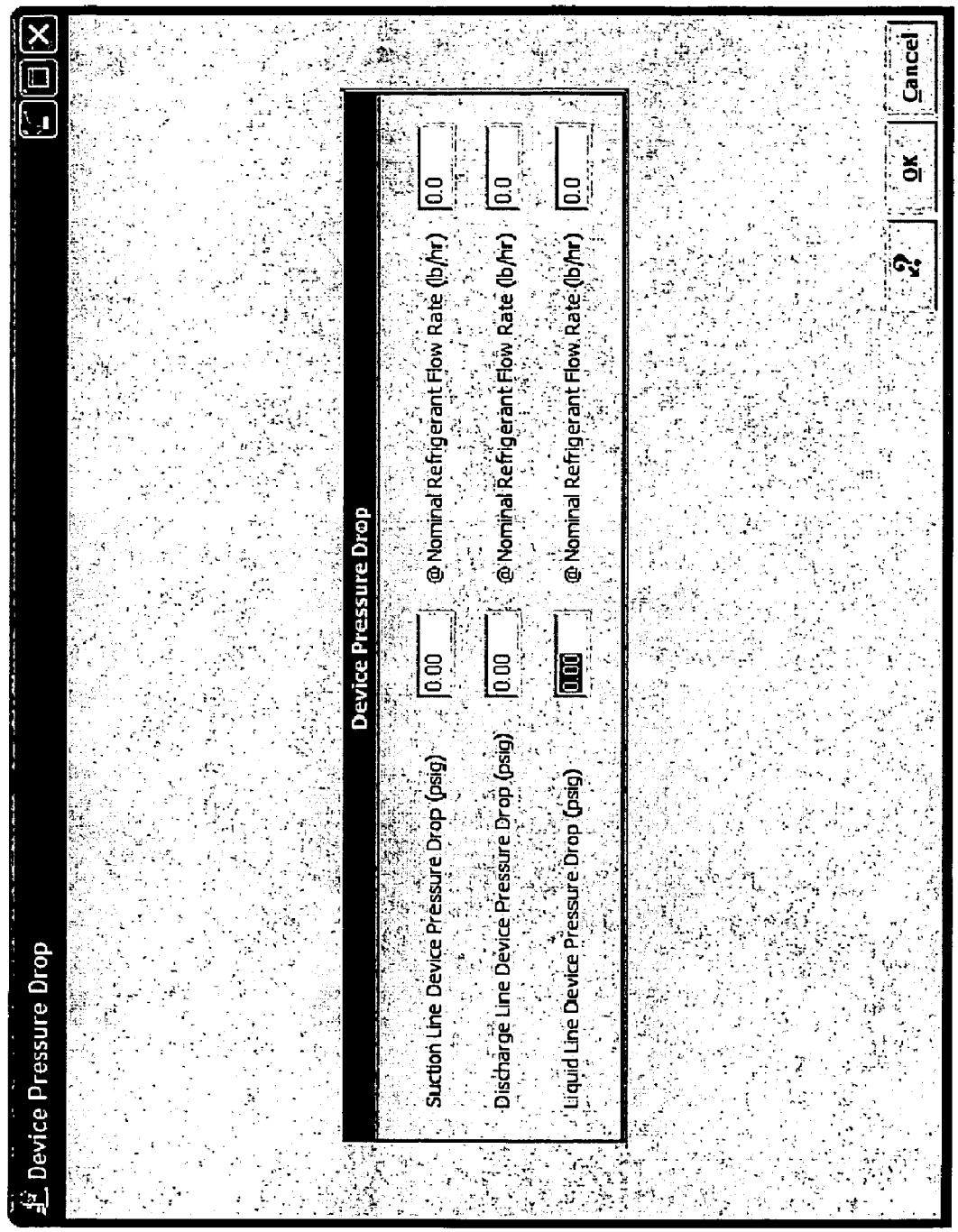
FIG. 44 is a screen-shot illustrating device pressure drop inputs.

Referring now to FIG. 44, the simulator may enable evaluation of the effect of pressure drop on system performance due to system accessories. This capability is provided to assess the effect on system performance due to accessories such as reversing valve and other pressure drop inducing devices used in the refrigeration cycle. This function may be accessed by selecting any of the restrictor images in the main screen. This opens the Device Pressure Drop dialog screen illustrated in FIG. 44. The user may enter pressure drop data for rated refrigerant flow rate for the selected device(s). The user may also enter description notes about each of the selected devices. This data is generally obtained from the manufacturer of the device.

Figure 45:
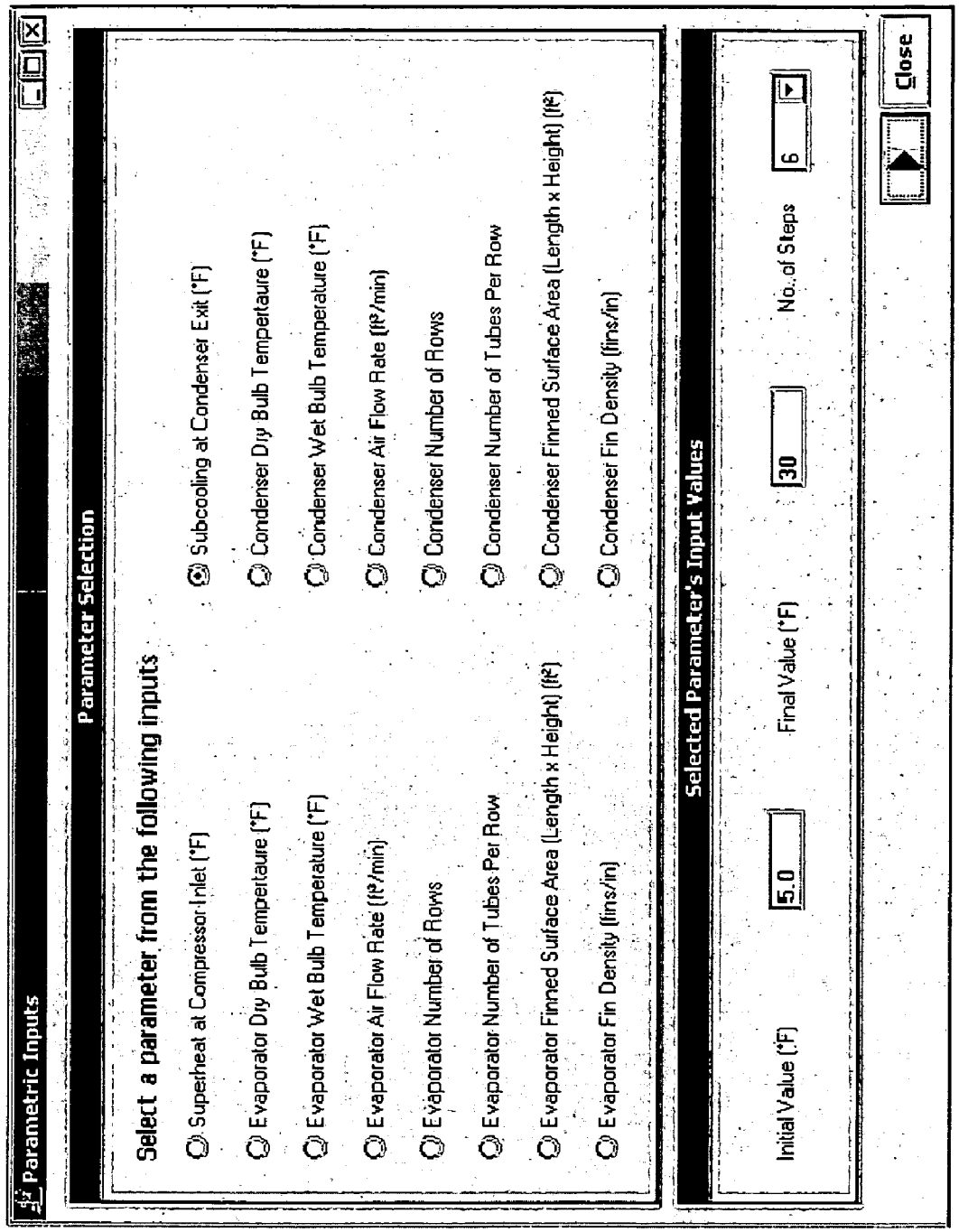
FIG. 45 is a screen-shot illustrating exemplary parametric inputs.
Figure 46:
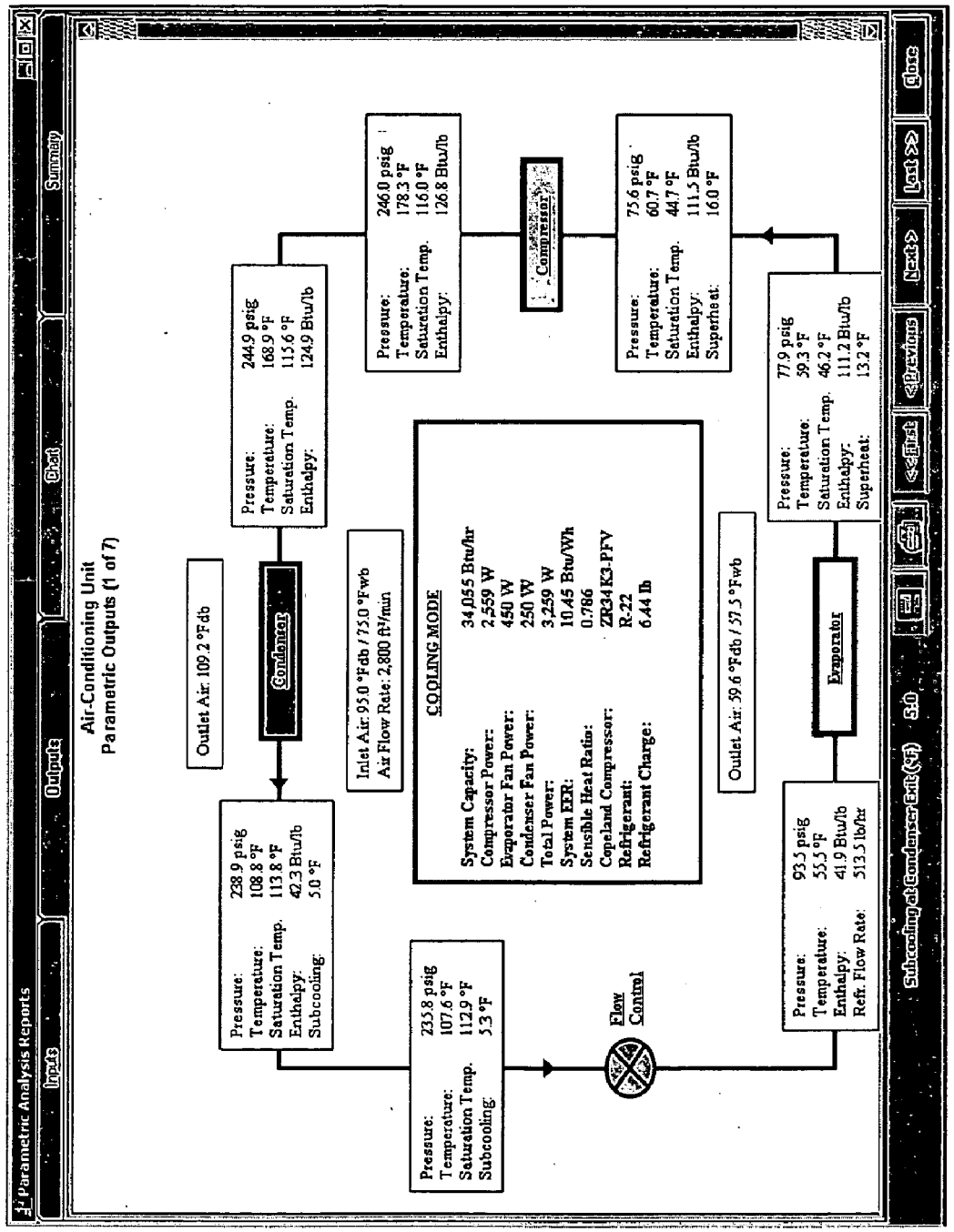
FIG. 46 is a screen-shot illustrating exemplary parametric outputs.
Figure 47:
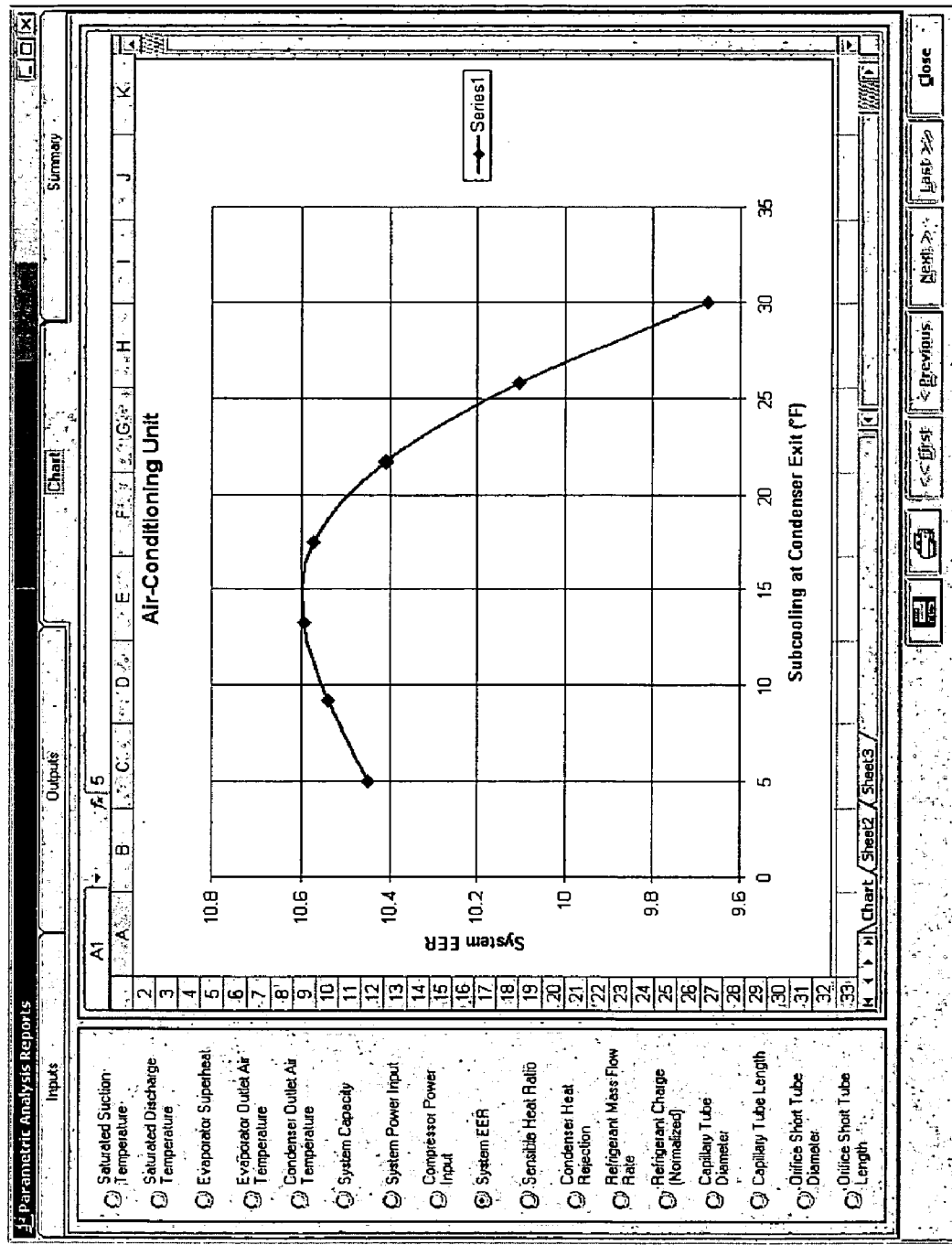
FIG. 47 is a screen-shot illustrating an exemplary system EER curve.
Figure 49:
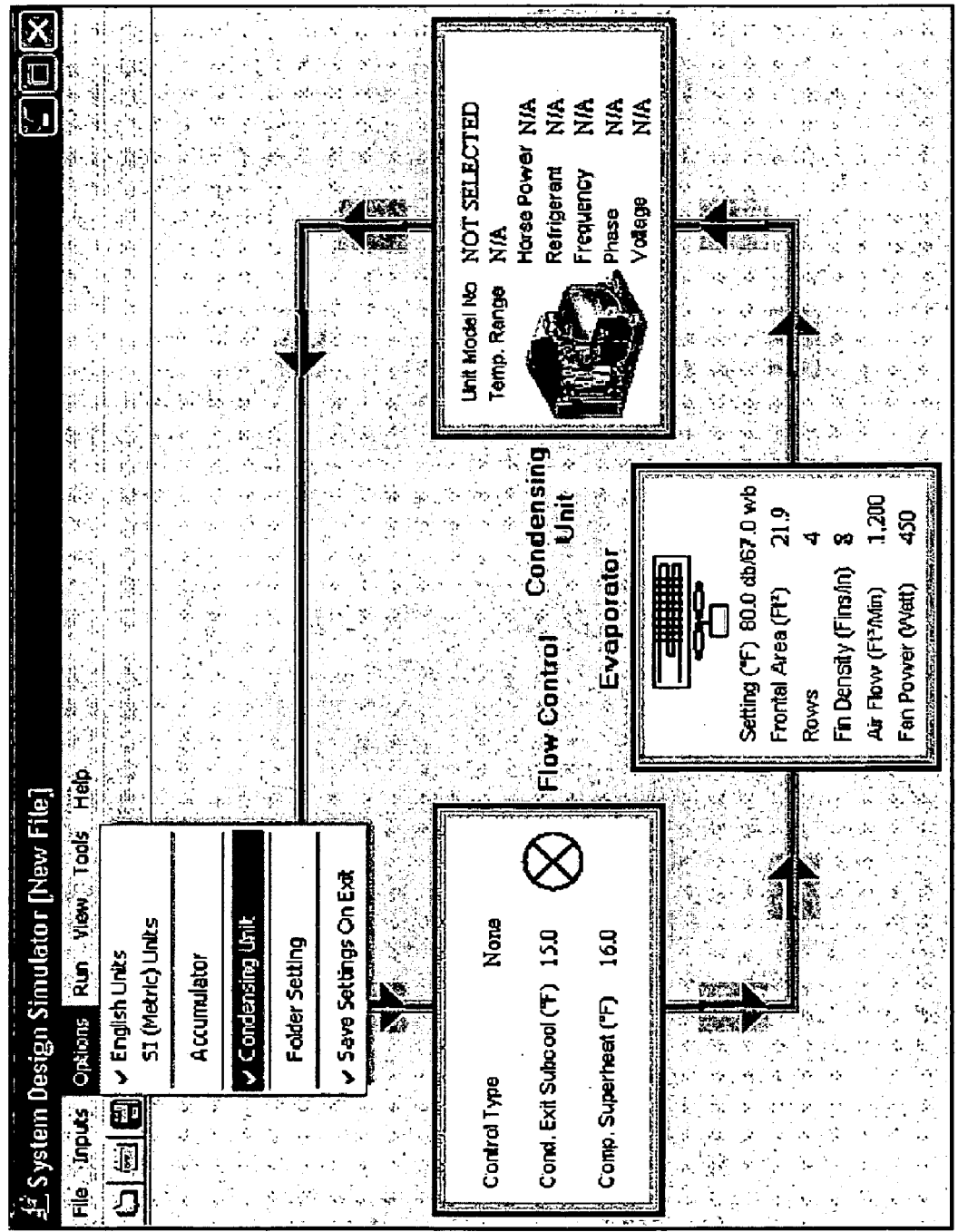
FIG. 49 is a screen-shot illustrating air-cooled condensing unit (ACU) selection.

Referring now to FIGS. 45 through 48, the simulator further provides parametric analysis. This capability is included to enable a user to automatically run multiple simulations. The objective is to find the best system design configuration for its operating condition. This is achieved by selecting the parameter from the parameter list that includes a plurality of available variables for the user to choose from. The user may choose the starting and ending values of the parameter and the number of simulations steps. FIG. 45 lists the parameters available to the user for performing the analysis. In the example shown in FIG. 45, Subcooling at the Condenser Exit is selected as the parameter. In this case, the starting Subcooling value is 5° F., the final value is 30° F. and the number of steps is 6. Upon completion of the runs, the simulator may produce a summary of inputs used, outputs, charts showing the results in a graphical format and a summary of key output variables in a spreadsheet format. FIGS. 46 through 48 show exemplary output screens.

Referring now to FIGS. 49 to 55, the system design simulator enables the user to design a system including an air-cooled condensing unit (ACU). The user may include an ACU by clicking on Condensing Unit under the Options menu in the main screen. The cooling system graphic is altered to illustrate the ACU (i.e., combined compressor and condenser).

Figure 50:
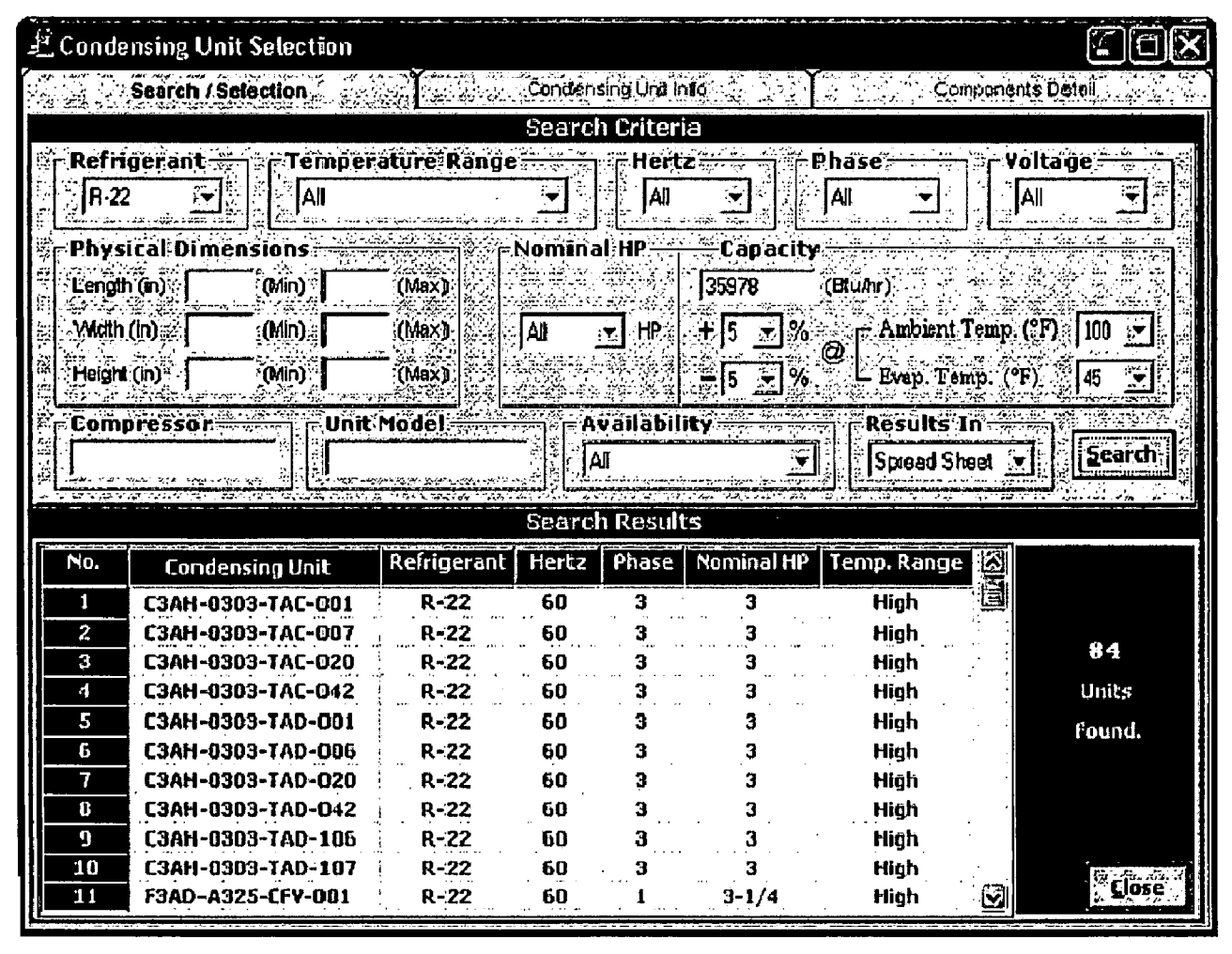

With particular reference to FIG. 50, the user may select an available ACU from an ACU database. A search tool is provided so that the user can quickly search and view the details of the available ACU's that meet the design need. The ACU selection screen shows a variety of search criteria available for finding the proper ACU. The search criteria may be a single parameter or a combination of parameters. The search criteria may include refrigerant type, temperature range, frequency, phase, voltage, ranges of physical dimensions (i.e., length, width, height), nominal horsepower (Hp) or capacity.

Figure 52:
FIG. 52 is a screen-shot illustrating ACU components details.
Figure 54:
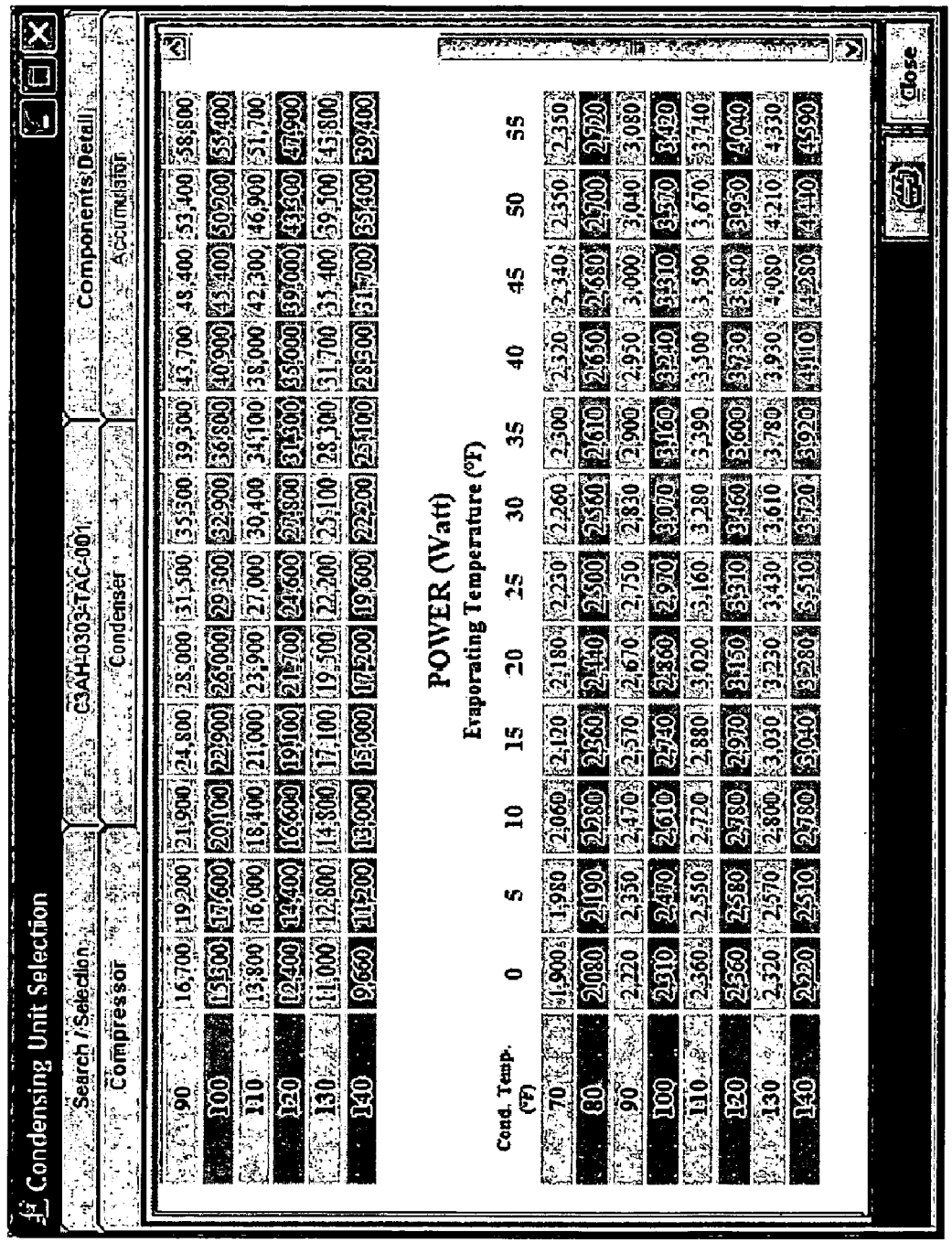
FIG. 54 is a screen-shot illustrating ACU compressor power based on evaporator temperature and condensing temperature.
Figure 55:
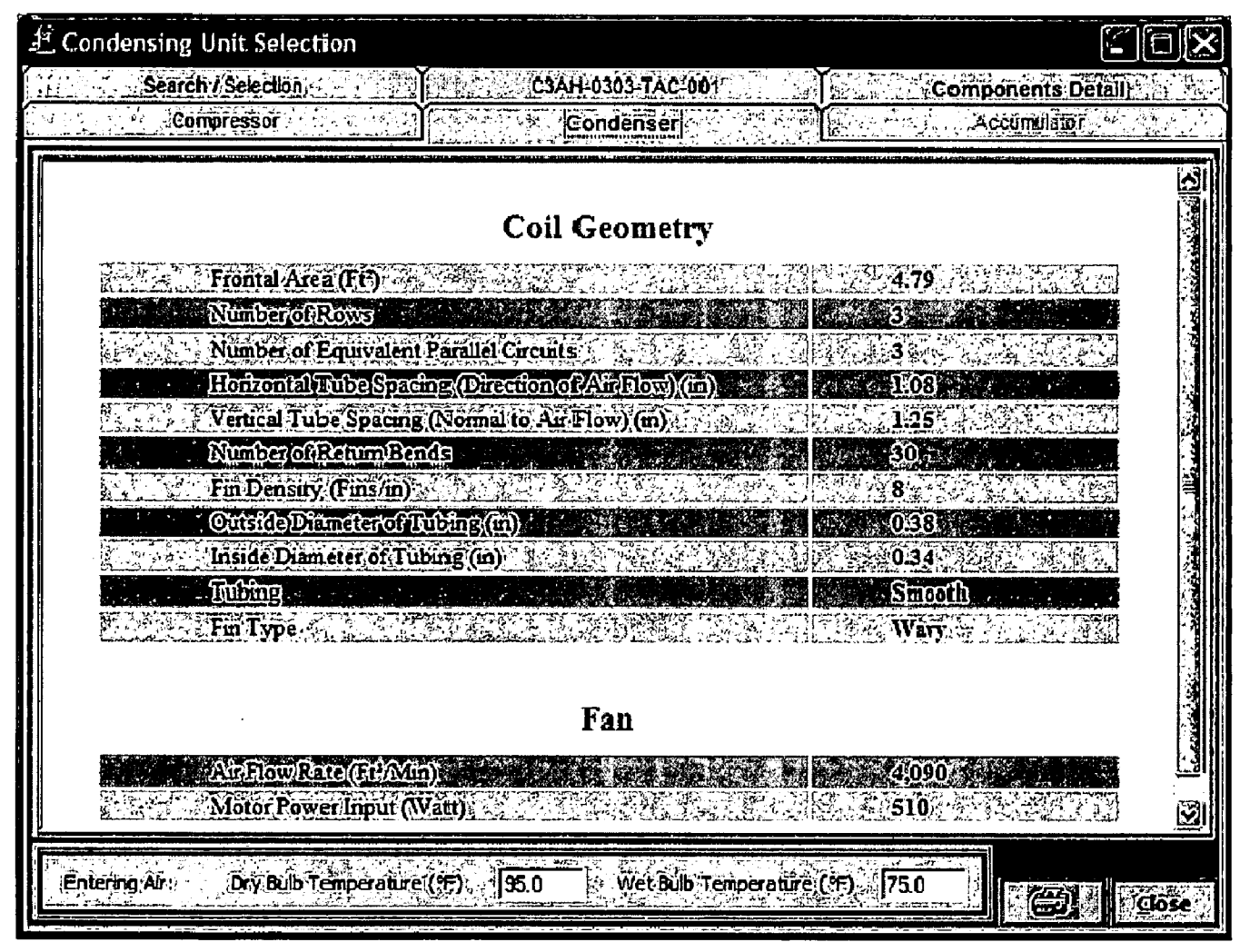

The search may be initiated by choosing the Search button. The result yields a list of ACU's matching the user specified criteria. An ACU is selected by double clicking the model. The Component Details tab may provide pertinent information about the selected ACU. The Compressor tab under Components Detail shows the compressor performance (capacity and power) (see FIGS. 53 and 54). The Condenser tab illustrates condenser geometry and the Accumulator tab provides accumulator geometry (see FIG. 55). Accumulator details may be provided only if the particular ACU is equipped with an accumulator. The Condenser tab may enable the user to enter inputs for the entering air condition. The user may view a reference drawing of the ACU illustrating the component layout. As illustrated in FIG. 52, the user may view the details of the selected ACU by clicking on the ACU tab (e.g. C3AH-0303-TAC-001).

Figure 56:
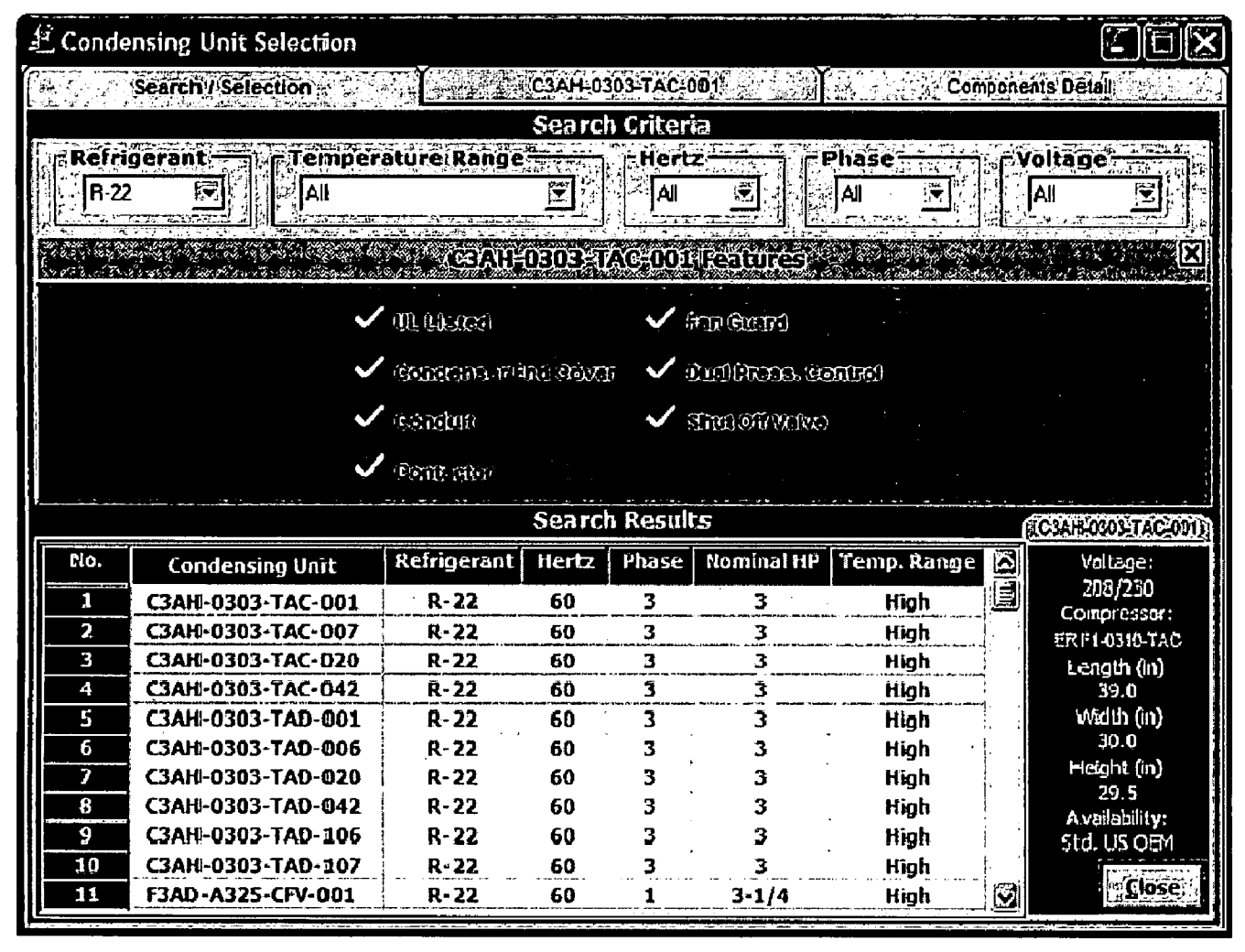
Figure 57:
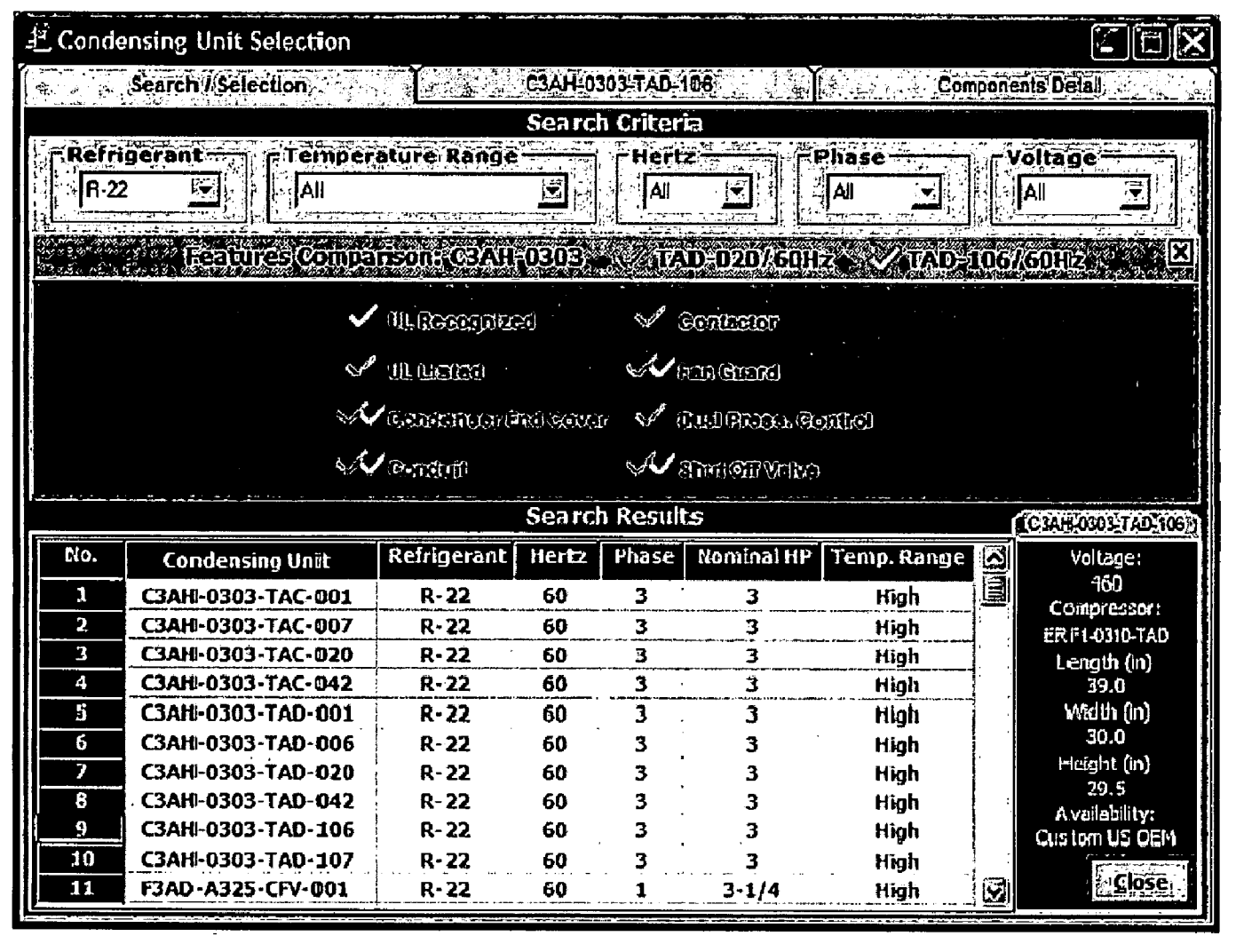

Referring now to FIGS. 56 and 57, the system design simulator may identify the key features of the selected ACU. The key features may include shut-off valves, receiver, accumulator, pressure controls and the like. The key features may not impact the ACU's thermal performance but may be provided to enhance the ACU's functionality. The user may view the ACU's key features by moving the mouse over the lower half of the screen. The check mark shows the key items included in the feature list for the selected ACU. The key features available may vary with the ACU model line. However, the thermal performance of both units is same as long as the first nine characters of the model and the operating frequency of the units are same. As illustrated in FIG. 57, the user may compare key features of multiple ACU's.

Figure 58:
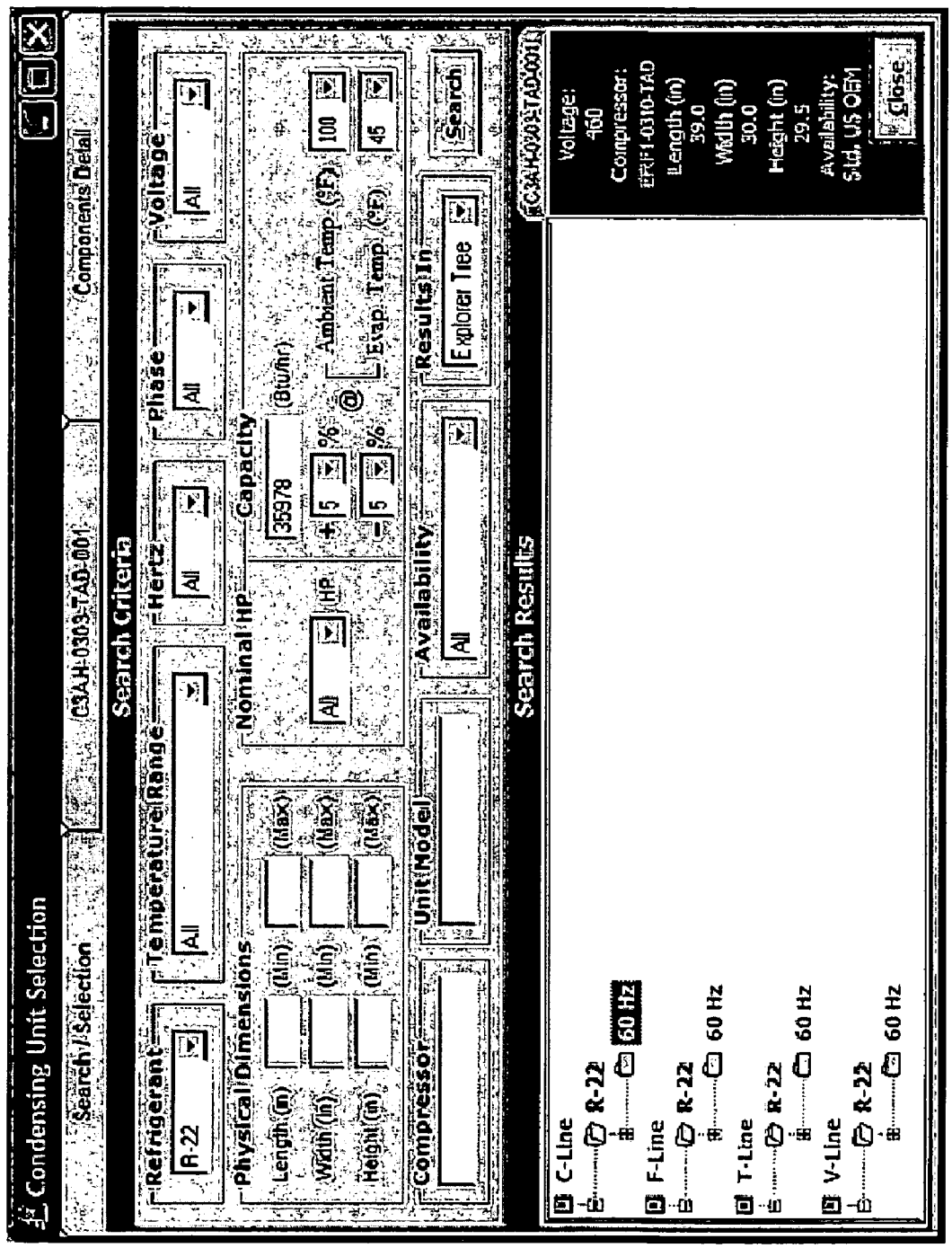
FIG. 58 is a screen-shot illustrating ACU search results based on the ACU's capacity.
Figure 59:
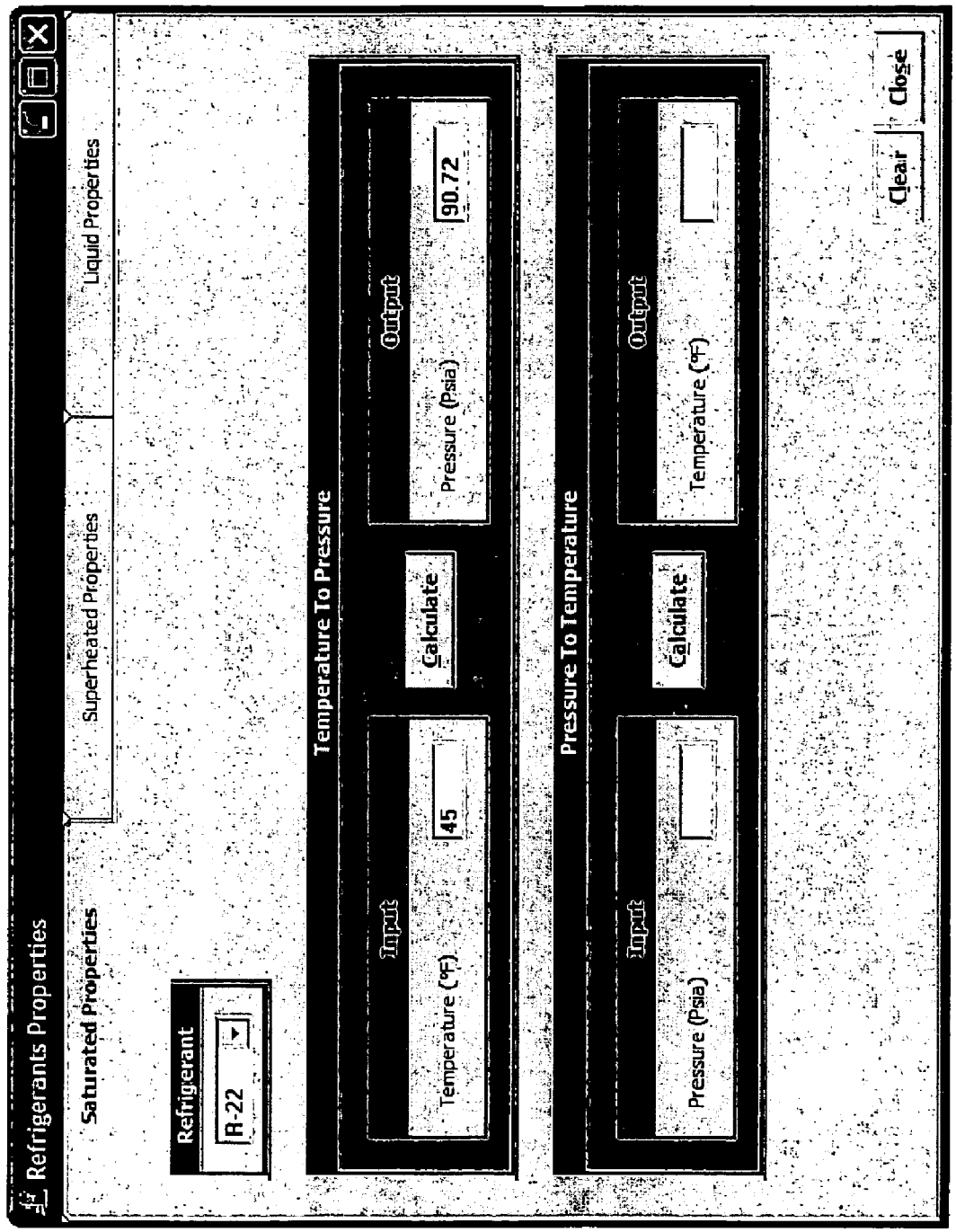
FIG. 59 is a screen-shot illustrating refrigerant saturated properties inputs.

Referring now to FIG. 58, the ACU search results may be displayed either in an explorer tree by selecting Explorer Tree in the Results In field or in a Spread Sheet format (see FIG. 50) by selecting Spread Sheet. The user selected format preference for display may remain in-force until the user changes the display format. It should be noted, however, that the search criteria for both formats are identical. The ACU model, ACU line (C, F, etc), unit's electrical characteristics, and/or capacity (Hp) may be color coded to assist user navigation.

Referring now to FIGS. 59 through 62, the system design simulator may provide the thermodynamic properties of refrigerants including saturated properties, superheated properties and liquid properties. The refrigerants may include, but are not limited to, R-12, R-22, R-502, R-134a, R-404A, R-507, R-410A and R-407C. The saturation pressure may be determined based on temperature by choosing the Saturated Tab and entering the temperature (see FIG. 59). The corresponding saturation pressure may be given by clicking on the Calculate button. The saturation temperature may similarly be determined based on pressure.

Figure 60:
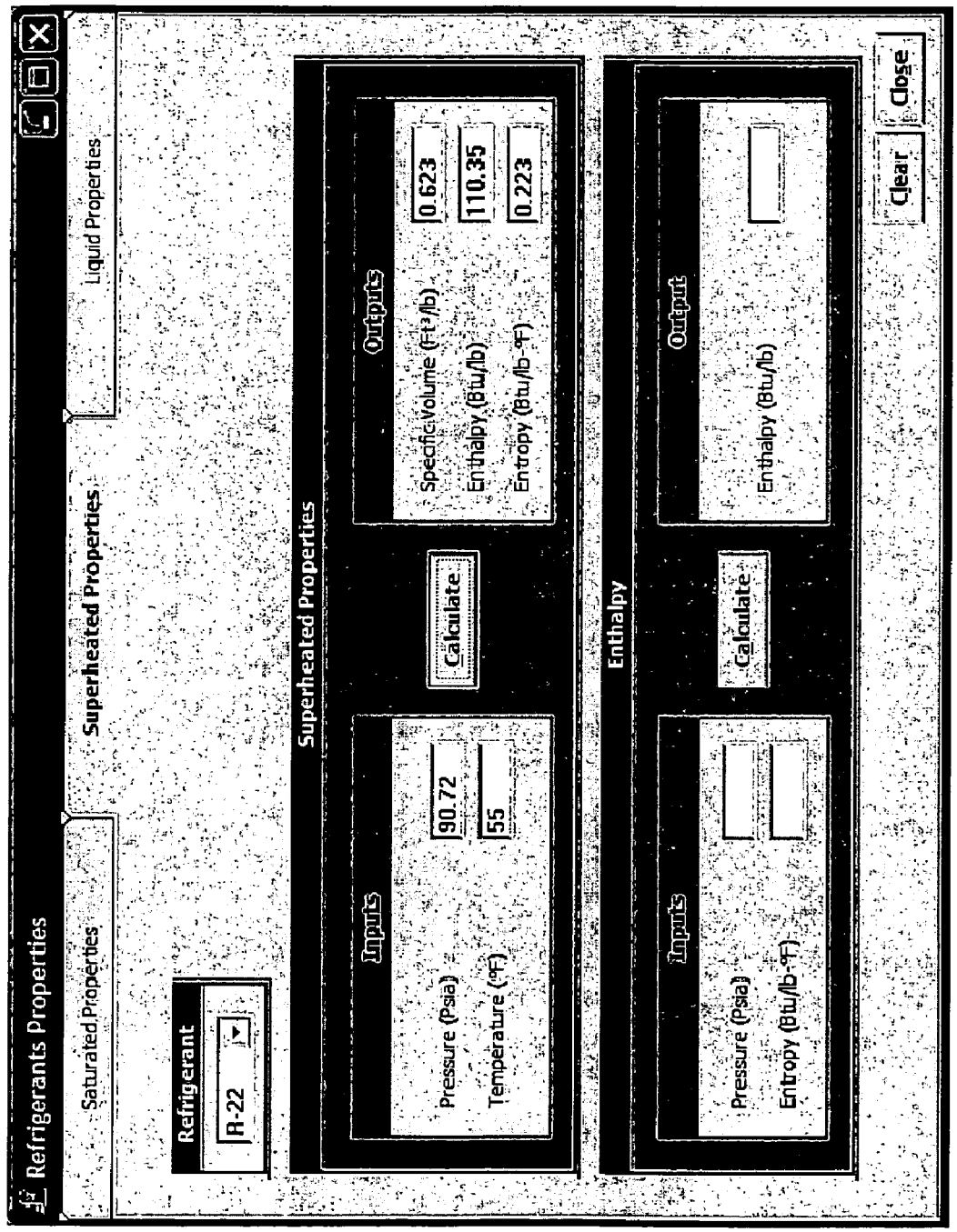
FIG. 60 is a screen-shot illustrating refrigerant superheated properties inputs.
Figure 61:
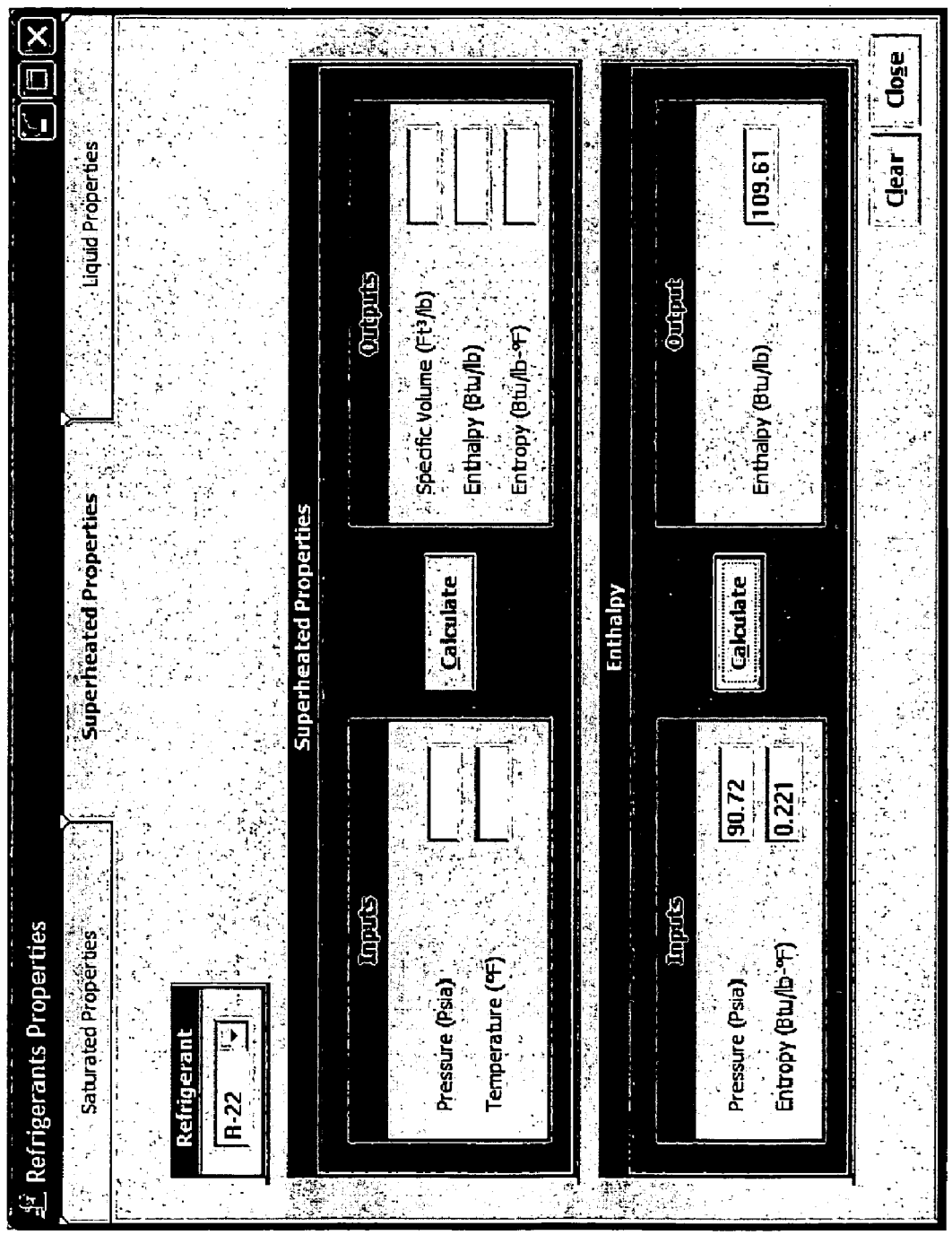
FIG. 61 is a screen-shot illustrating refrigerant superheated enthalpy inputs.
Figure 62:
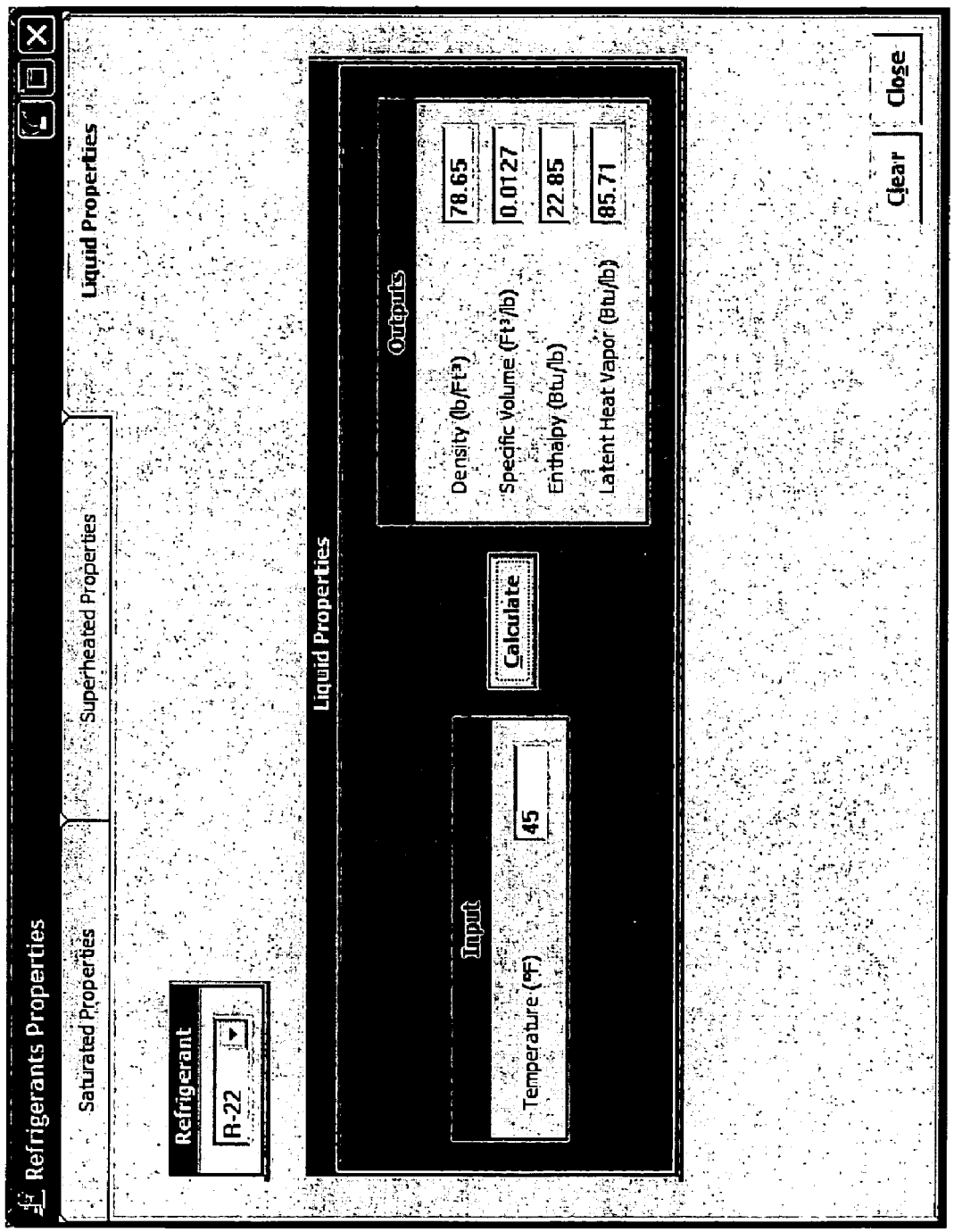
FIG. 62 is a screen-shot illustrating refrigerant liquid properties inputs.
Figure 64:
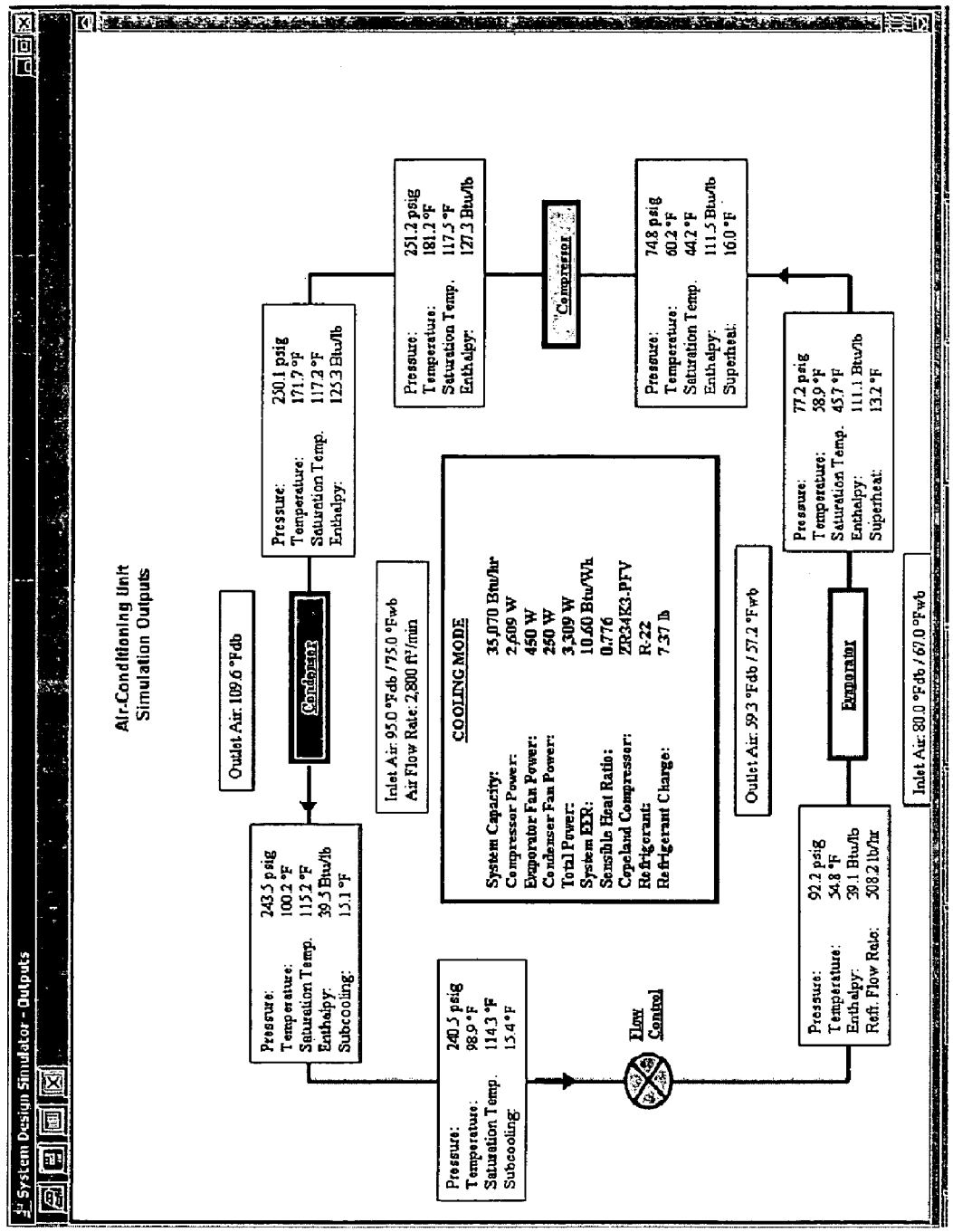
FIG. 64 is a screen-shot illustrating simulation results in graphical format.

The superheated properties may be determined by clicking on the Superheated Properties tab and inputting pressure and temperature (see FIG. 60). The properties including specific volume, enthalpy and entropy may be provided by clicking on the Calculate button. The enthalpy may be determined based on the pressure and entropy by clicking on the corresponding Calculate button (see FIG. 61). The liquid properties may be determined by clicking on the Liquid Properties tab and inputting temperature (see FIG. 62). The properties including density, specific volume, enthalpy and latent heat vapor may be provided by clicking on the Calculate button.

Referring now to FIGS. 63 through 66, after having configured the cooling system, the design simulator may be run by choosing the Run option on the menu bar and clicking Run Model. The design simulator may also be run by clicking the Run icon on the toolbar. The results may be provided in tabular and graphical formats. More particularly, a summary table may be provided, listing the key system inputs and the parameters for the individual components (see FIG. 63). Alternatively, a graphical illustration of the cooling system is shown with the corresponding parameters listed adjacent to images of the individual components (see FIG. 64). The results may be printed by choosing the File menu, Print and Outputs options from the main screen or by clicking on the Print icon. Additionally, the results may be saved to an electronic file by choosing the File menu, Save option or by clicking on the Save icon.

The overall system parameters include mode, system capacity, compressor power, evaporator fan power, condenser fan power, total power, system EER, sensible heat ratio, compressor model number, refrigerant and refrigerant charge. The condenser air flow parameters may include inlet air temperature, air flow rate and outlet air temperature. The condenser inlet refrigerant parameters may include pressure, temperature, saturation temperature and enthalpy. The condenser outlet refrigerant properties may include pressure temperature, saturation temperature and sub-cooling temperature. The flow control inlet refrigerant properties may include pressure, temperature, saturation temperature and sub-cooling temperature.

The evaporator air flow properties may include inlet air temperature, air flow rate and outlet air temperature. The evaporator inlet refrigerant parameters may include pressure, temperature, enthalpy and refrigerant flow rate. The evaporator outlet refrigerant parameters may include pressure, temperature, saturation temperature, enthalpy and superheat temperature. The compressor suction refrigerant parameters may include pressure, temperature, saturation temperature, enthalpy and superheat temperature. The compressor discharge refrigerant properties may include pressure, temperature, saturation temperature and enthalpy.

Figure 66:
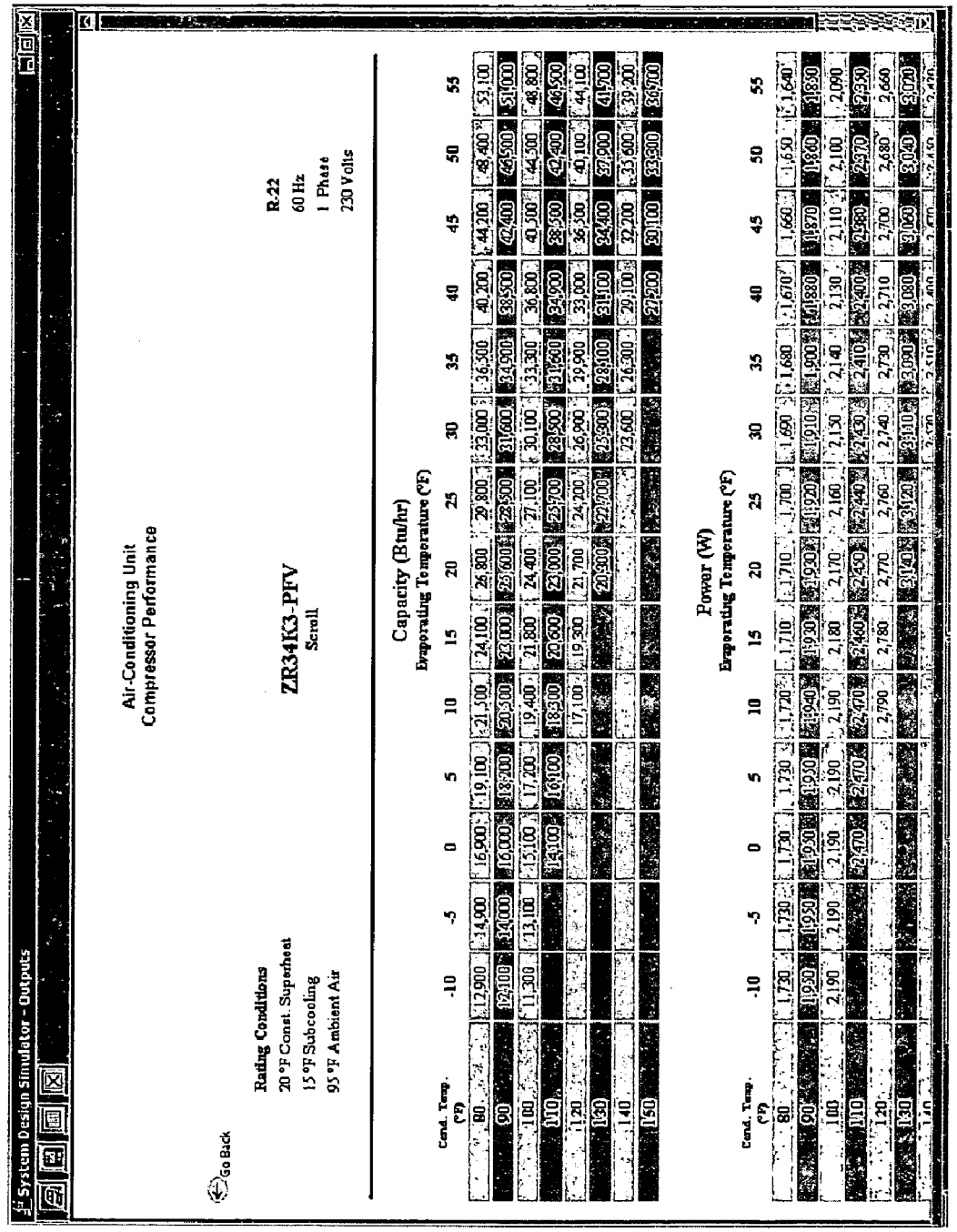
FIG. 66 is a screen-shot illustrating compressor performance data.

FIG. 65 provides evaporator and condenser coil outputs in tabular format. The outputs may include, but are not limited to, surface area of the fins, weight of the finned area, length of the tube, internal volume of the coil, weight of the tube, air-side pressure drop across the coil and heat rejection capacity. FIG. 66 provides compressor performance information in tabular format including capacity and power at various condenser and evaporator temperatures.

Figure 67:
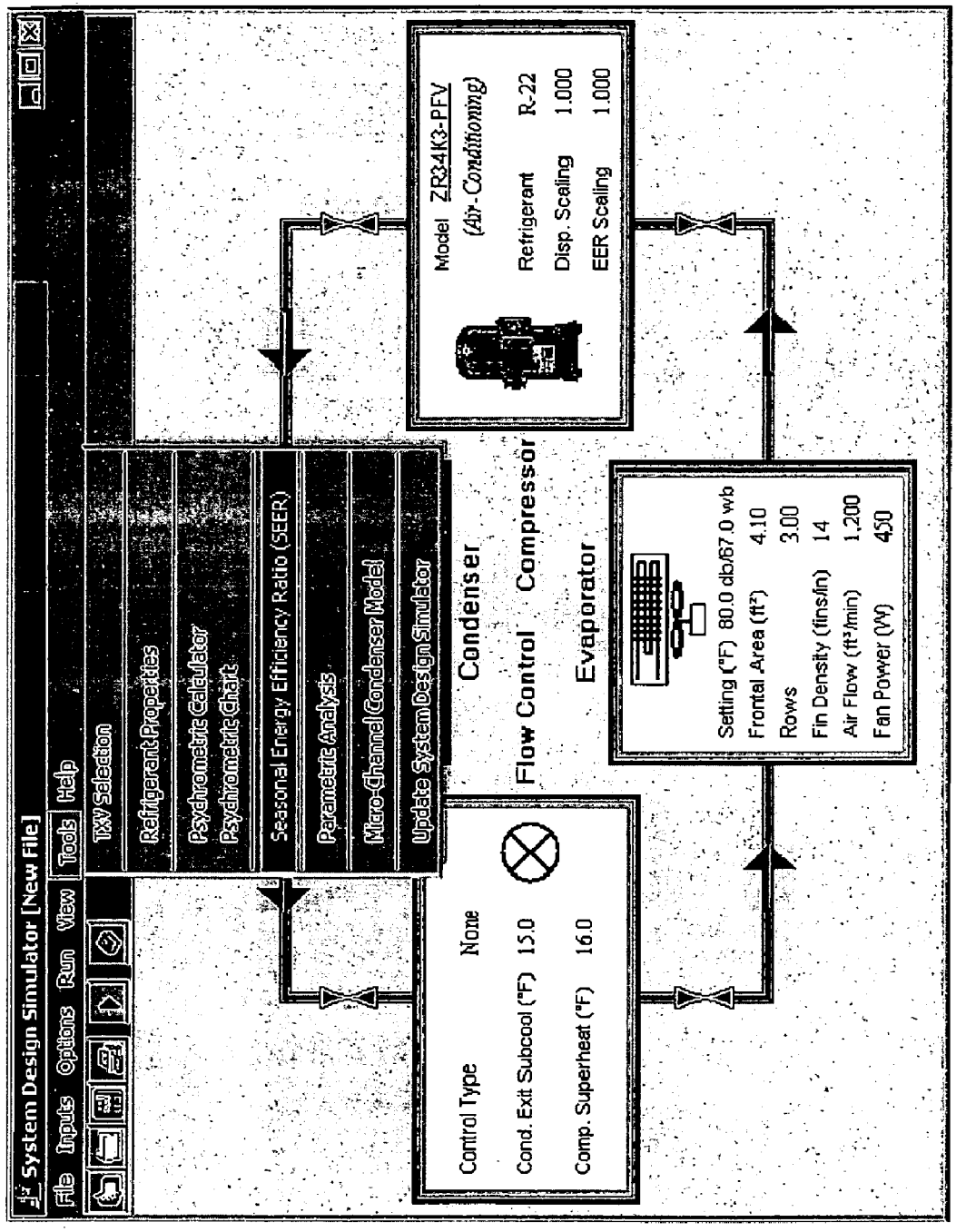
FIG. 67 is a screen-shot illustrating seasonal energy efficiency ratio (SEER) selection.
Figure 68:
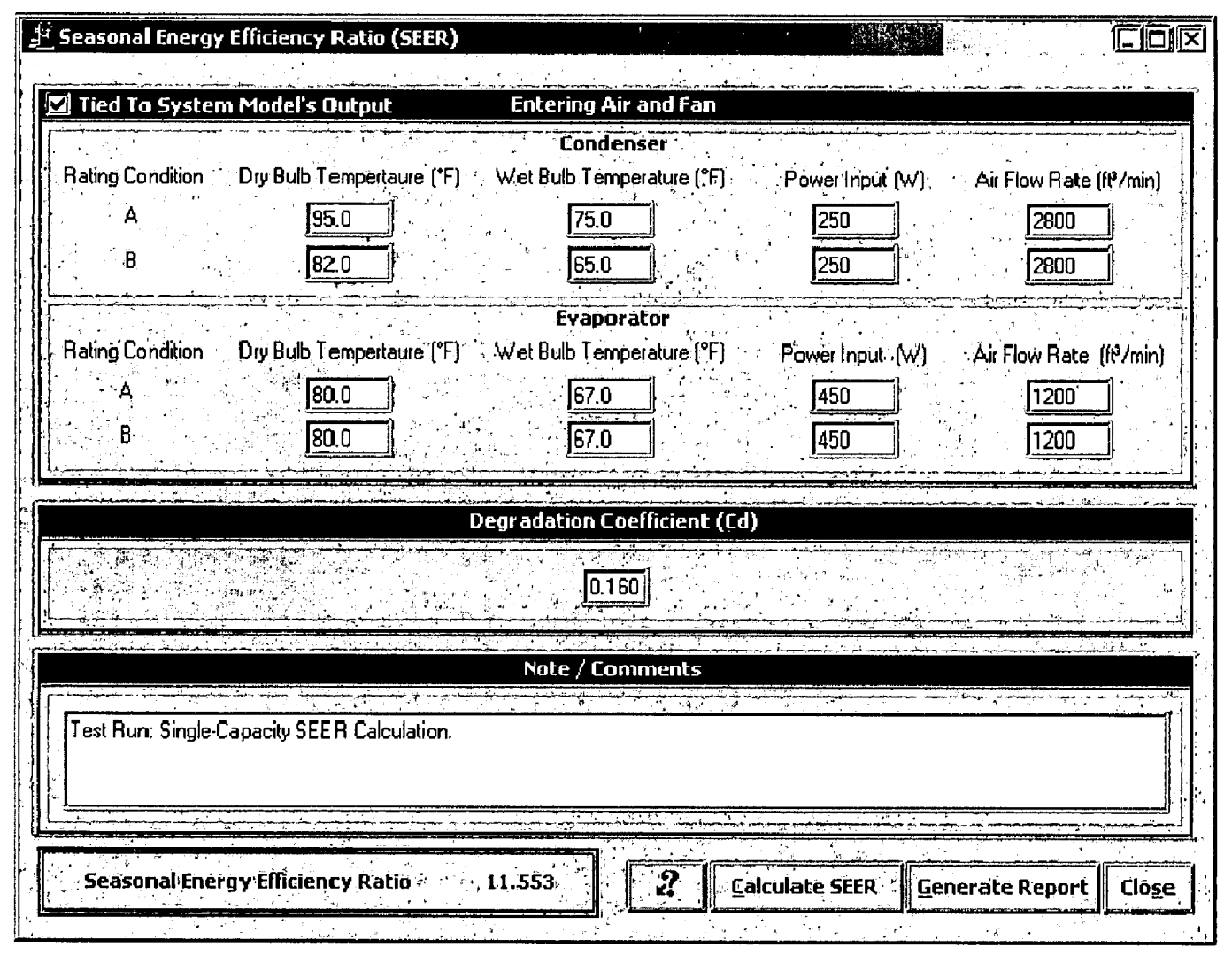
Figure 72:
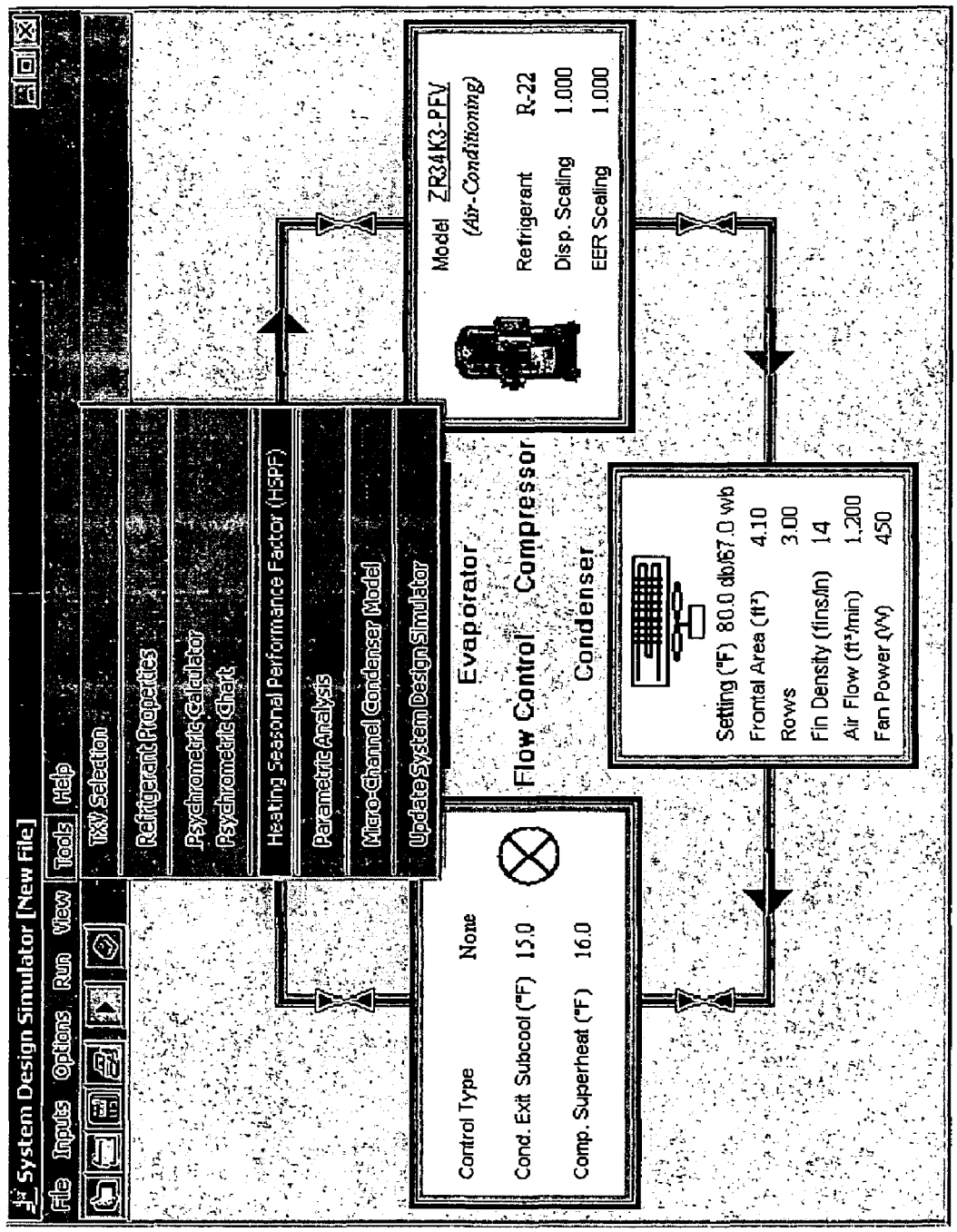
FIG. 72 is a screen-shot illustrating heating seasonal performance factor (HSPF) selection.

Referring now to FIGS. 67 through 69, the simulator may enable the user to determine a seasonal energy efficiency ratio (SEER) for a single capacity system operating in the cooling mode. The simulator may enable the user to enter the system data determined from their laboratory testing or from other procedures. Alternatively, the user may model the system performance and then use the system results to generate the SEER rating. The SEER calculation may be accessed by first selecting the system type as single capacity and choosing Cooling in the System Type and Mode Selection screen. The user may choose the Seasonal Energy Efficiency Ratio (SEER) selection from the Tools menu (see FIG. 67). The SEER calculation may only be available for Air-Conditioners and Heat Pumps.

FIG. 68 shows the inputs that may be required for the SEER calculation. Note that SEER calculation may require only the system performance for the 82° F. outdoor air condition (rating Condition B). Data for 95° F. outdoor air condition (rating condition A) is included as an example. As mentioned earlier, the user may enter their own data to calculate SEER. In such a case, the checkbox Tied To System Model's Output is unchecked. SEER computation may be performed by choosing the button Calculate SEER. The calculated SEER is shown in the lower left (e.g., 11.553). A report may be accessed by choosing the button Generate Reports (see FIG. 69).

Figure 70:
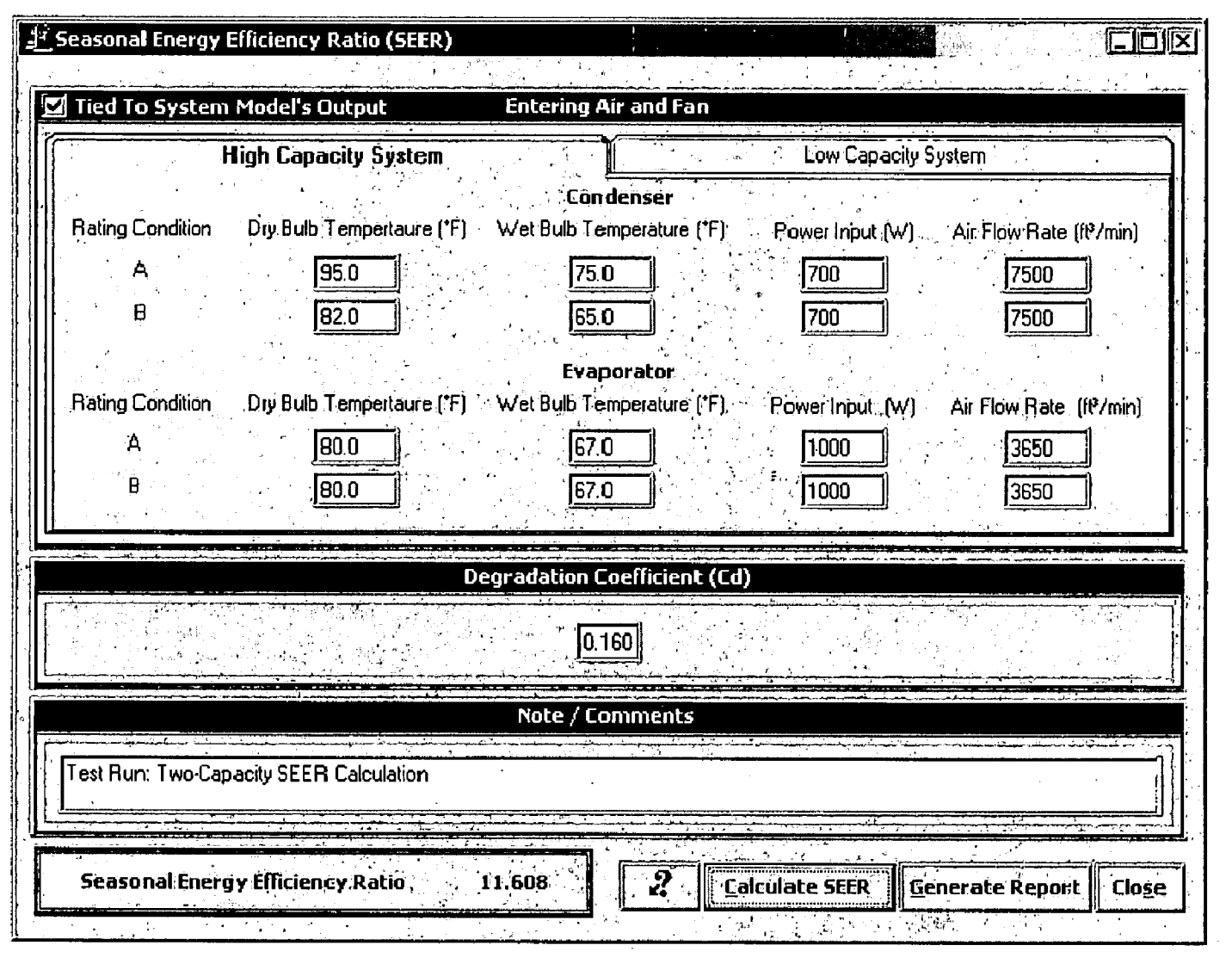

FIGS. 70 and 71 show the SEER input screen and corresponding report for a dual capacity system. The procedure for computing SEER of a dual capacity system operating in the cooling mode may be similar to the single capacity SEER described above, however, the dual capacity SEER requires more inputs. The SEER capability may be accessed by selecting the system type as dual capacity and choosing Cooling in the System Type and Mode Selection screen. The user may choose the Seasonal Energy Efficiency Ratio (SEER) from the Tools menu. FIG. 70 shows the user inputs required for the dual capacity SEER calculation. As is the case for the single capacity system, the user may enter their own data to calculate SEER. The dual capacity SEER report may be accessed by choosing the button Generate Reports (see FIG. 71).

Referring now to FIGS. 72 through 76, the simulator may enable the user to calculate a heating seasonal performance factor (HSPF) for both single and dual capacity systems. Similar to the procedure for the single capacity SEER calculation, the simulator may provide the user with a user friendly procedure for calculating the HSPF. The user may enter the data determined from their laboratory testing or from other procedures. Alternatively, the user may simulate the system performance and use the results to compute the HSPF rating automatically. This capability may be accessed by selecting the system type as single capacity and choosing Heating in the System Type and Mode Selection screen. The user may choose the Heating Seasonal Performance Factor (HSPF) selection from the Tools menu (see FIG. 72). HSPF Calculation is available only for Heat Pump operating in the heating mode.

Figure 73:
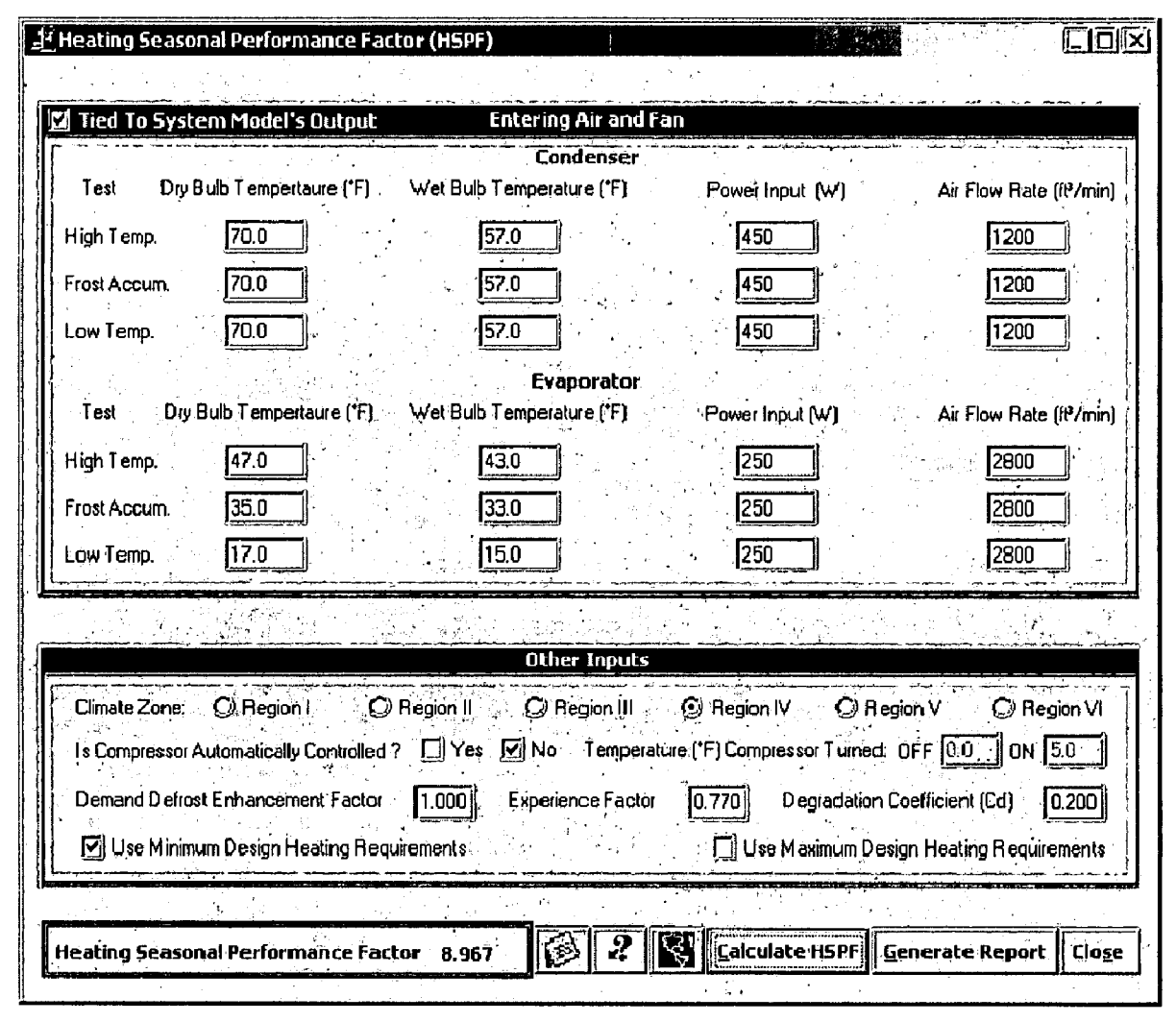
Figure 74:
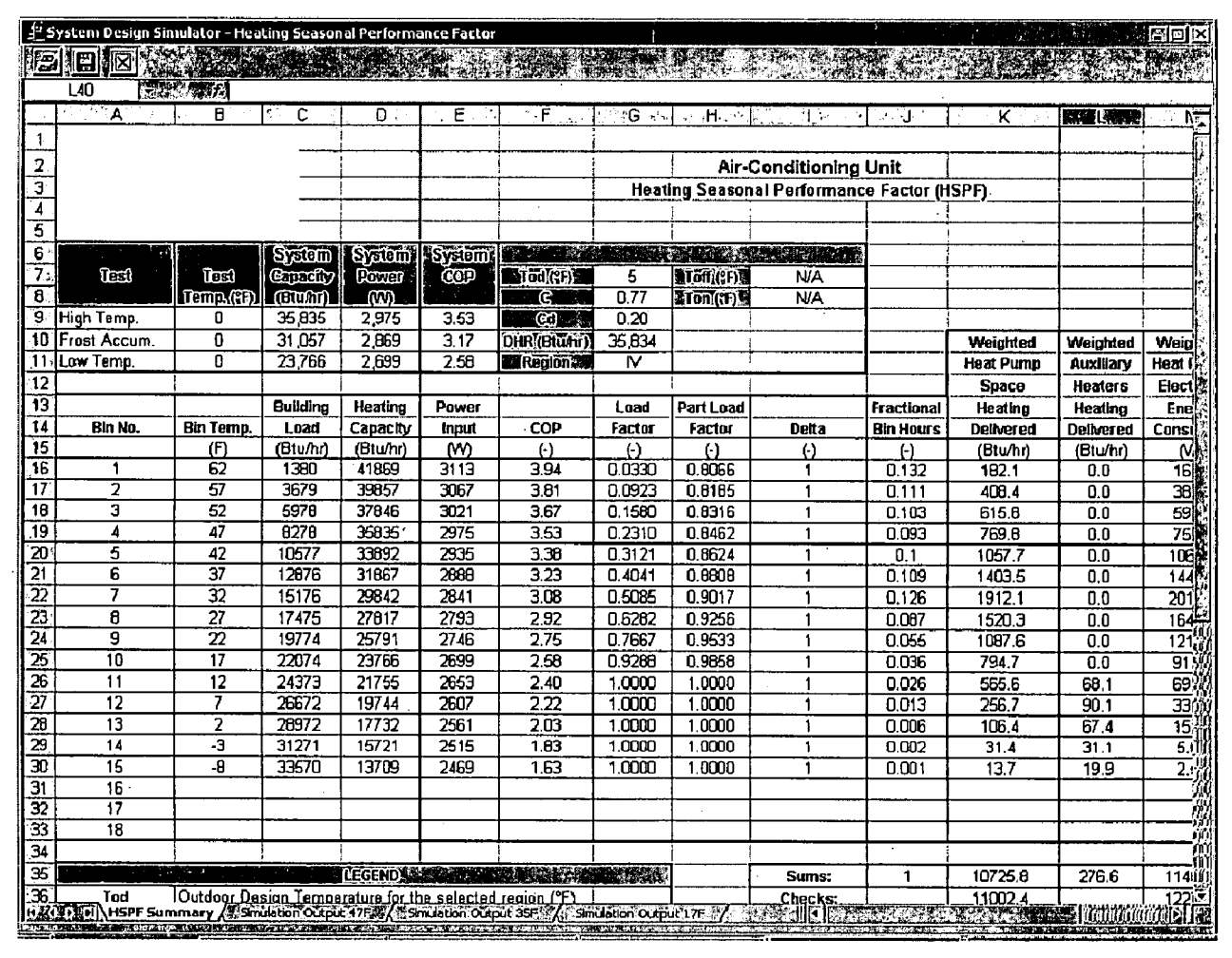
Figure 75:
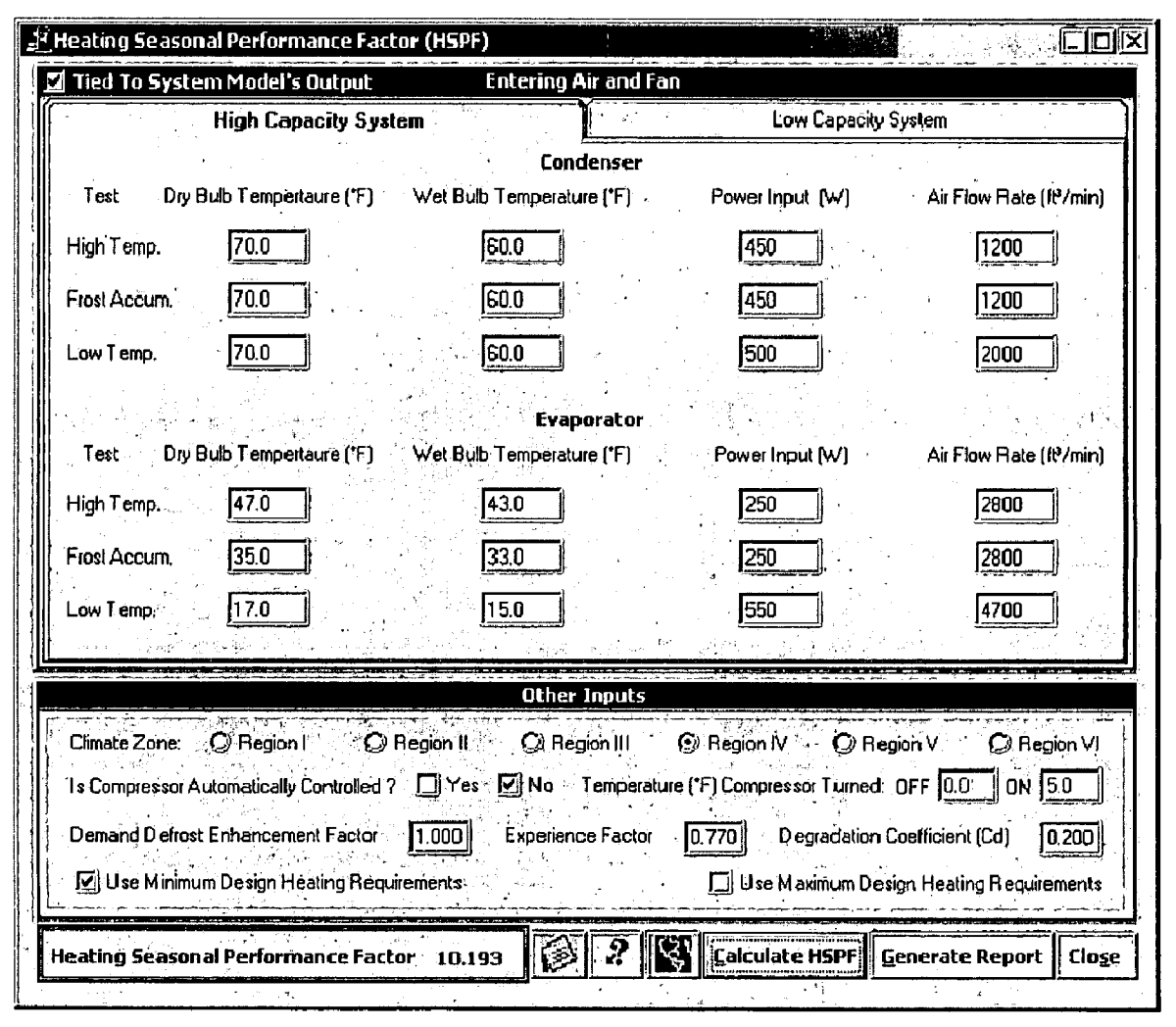
Figure 76:
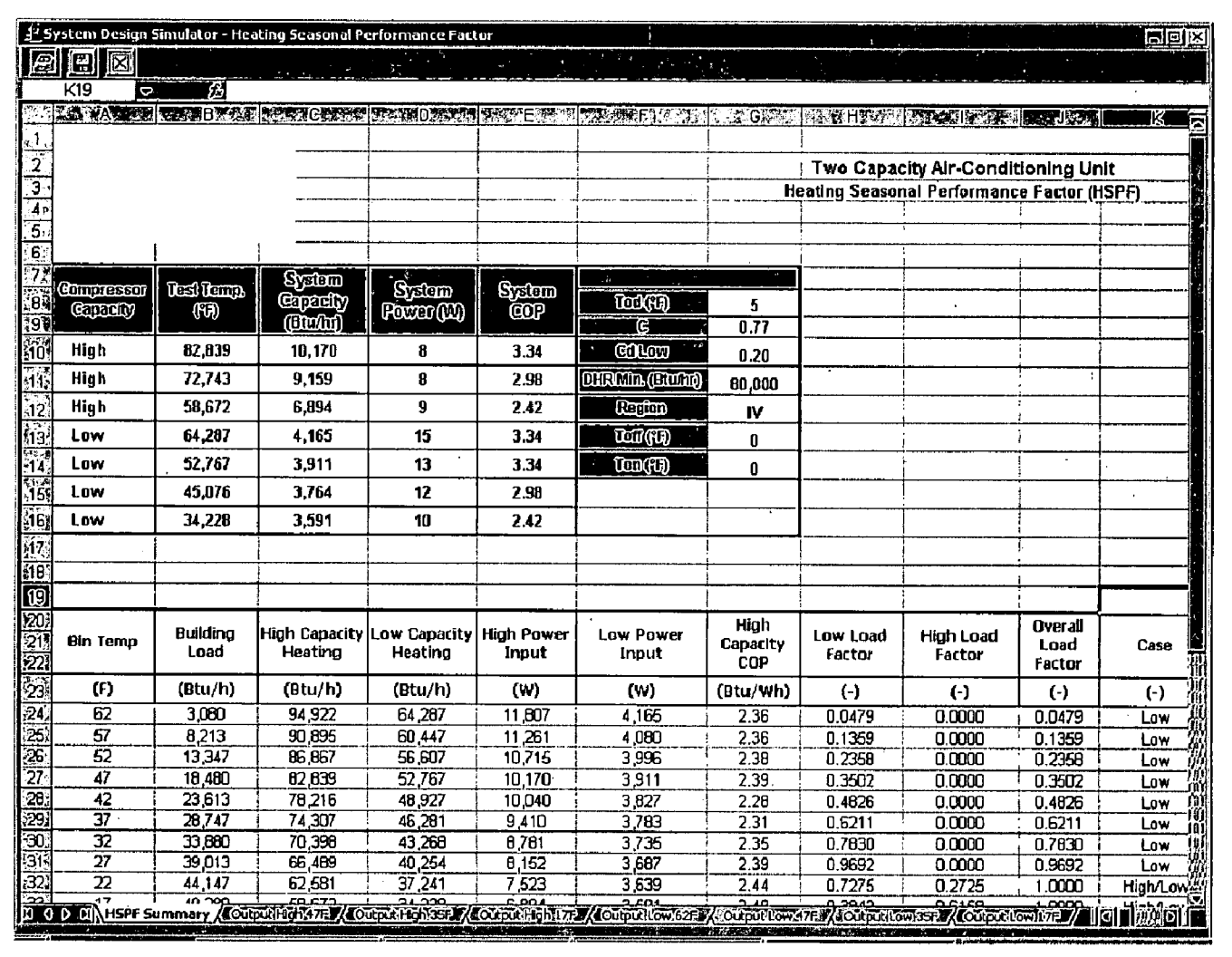

FIG. 73 illustrates the inputs that may be required for the HSPF calculation. The HSPF calculation may require system performance data for several outdoor ambient air conditions (e.g., 47° F., 35° F. and 17° F.). Similar to SEER, the user may enter their own data to calculate HSPF. In such a case, the checkbox Tied To System Model's Output is unchecked. The HSPF computation may be performed by choosing the button Calculate HSPF and the result is provided in the lower left corner (e.g., 8.967). The user may view the Winter Heating Load Hours for various US locations. FIG. 74 illustrates an exemplary HSPF report. The procedure for computing HSPF of a dual capacity System is similar to the single capacity HSPF described above, however, the dual capacity HSPF may require additional inputs (see FIGS. 75 and 76).

Figure 77:
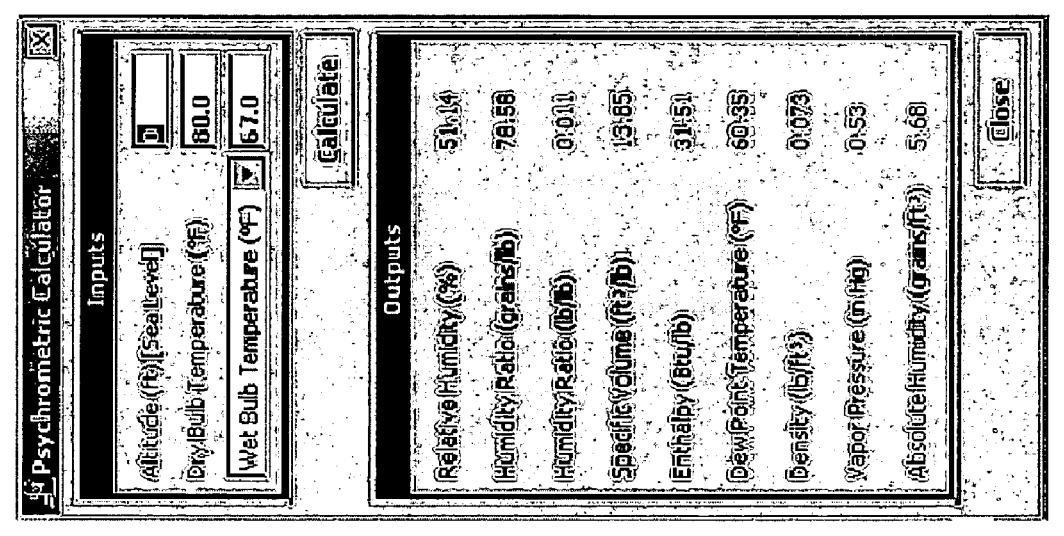
Figure 78:
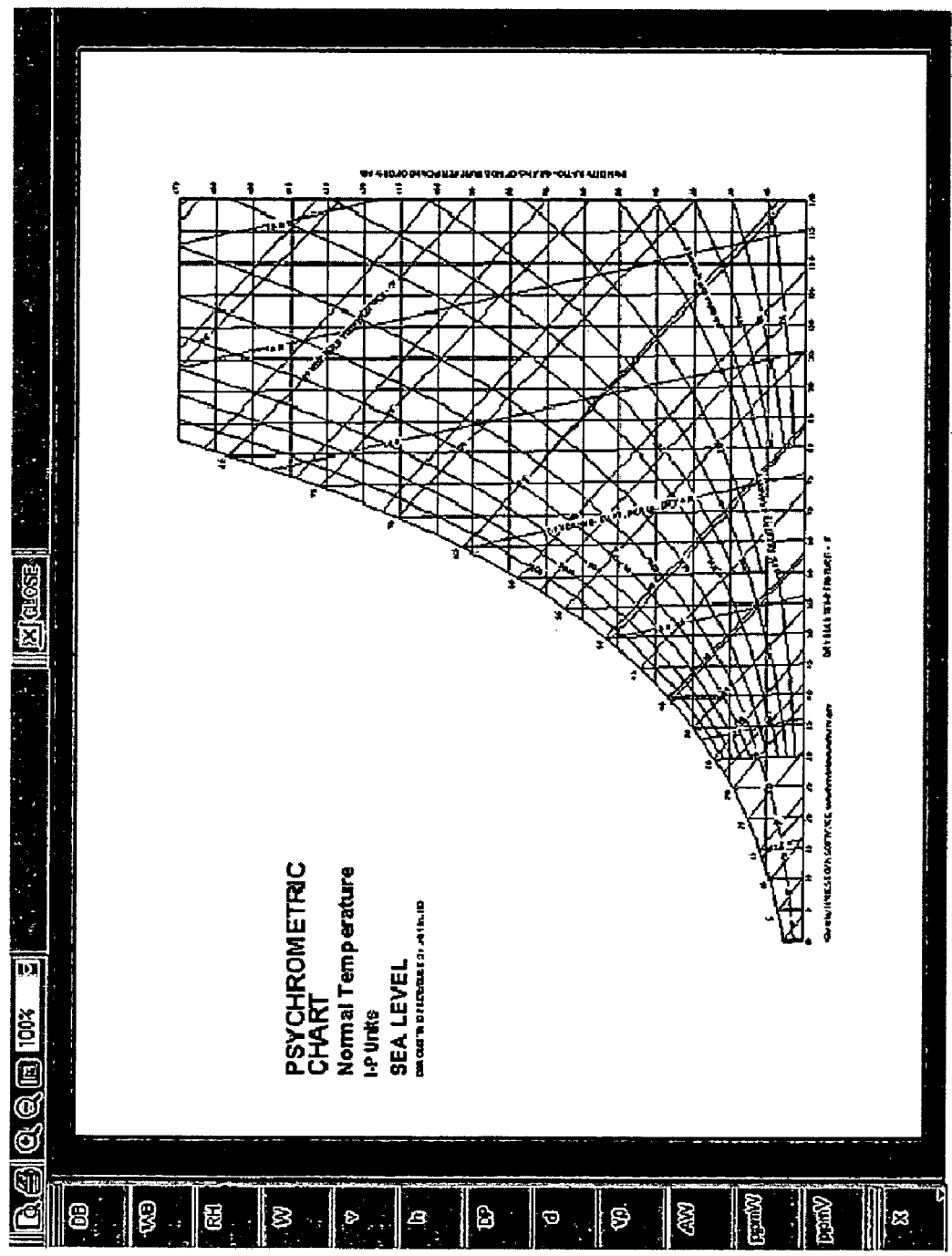
FIG. 78 is a screen shot illustrating a psychrometric chart graphically displaying moist air properties.

Referring now to FIG. 77, the cooling system design simulator may provide a psychrometric calculator to calculate moist air properties. The user may click on the Psychrometric Calculator option under Tools in the main menu. The inputs to the psychrometric calculator may include altitude above sea level (ft), dry bulb temperature (° F.) and one of a plurality of air property inputs. The plurality of air property inputs include wet bulb temperature (° F.), relative humidity (%), humidity ratio (grains/lb), specific volume (ft$^3$/lb), enthalpy (Btu/lb) and dew point temperature (° F.). The psychrometric calculator may calculate the remaining air properties and may calculate further air properties including density (lbs/ft$^3$), vapor pressure (in Hg) and absolute humidity (grains/ft$^3$). The air properties may be automatically transferred Referring now to FIG. 78, the moist air properties may also be determined using a psychrometric chart provided by the cooling system design simulator. The user clicks on the Psychrometric Chart option under Tools in the main menu. The inputs include minimum dry bulb temperature (° F.) and maximum dry bulb temperature (° F.). The cooling system design simulator generates the psychrometric chart based on the inputs. On the left hand side of the chart, a column may provide values for dry bulb temperature (DB), wet bulb temperature (WB), relative humidity (RH), humidity ratio (W), specific volume (v), enthalpy. (eh), dew point temperature (DP), density (d), vapor pressure (vp), absolute humidity (AW), parts per million by weight (ppmW) and parts per million by volume (ppmV). More specifically, as the user drags the pointer across the chart, the air properties listed in the left hand column may change based on the coordinates of the pointer on the chart. Therefore, the user may select a desired chart coordinate by moving the pointer to that coordinate on the chart and reading the air property values from the left hand column. The user may zoom in by double-clicking on the chart.

Figure 79:
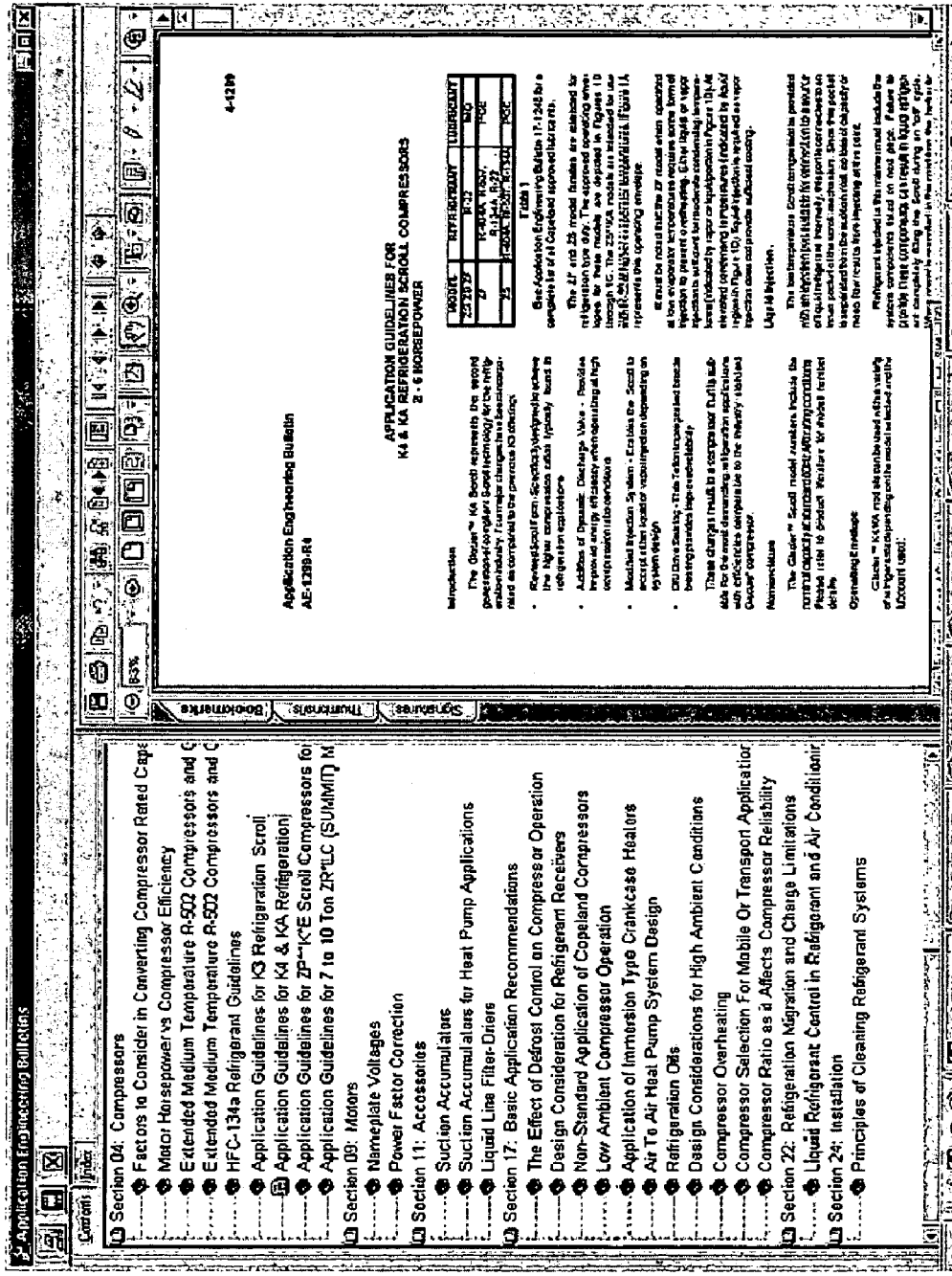
FIG. 79 is a screen-shot illustrating manufacturer engineering bulletins provided by the cooling system design simulator.
Figure 80:
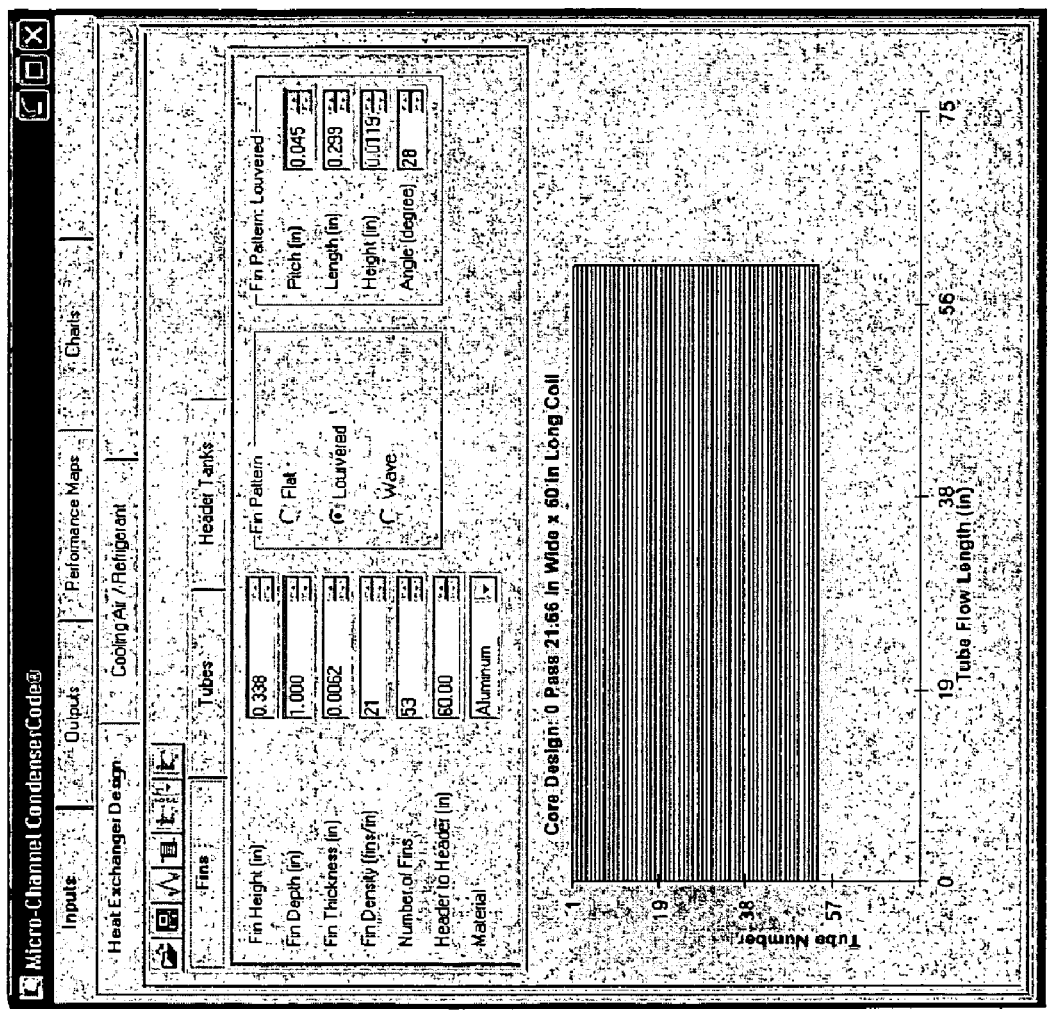
FIG. 80 is a screen-shot illustrating heat exchanger fin inputs for a condenser model.
Figure 81:
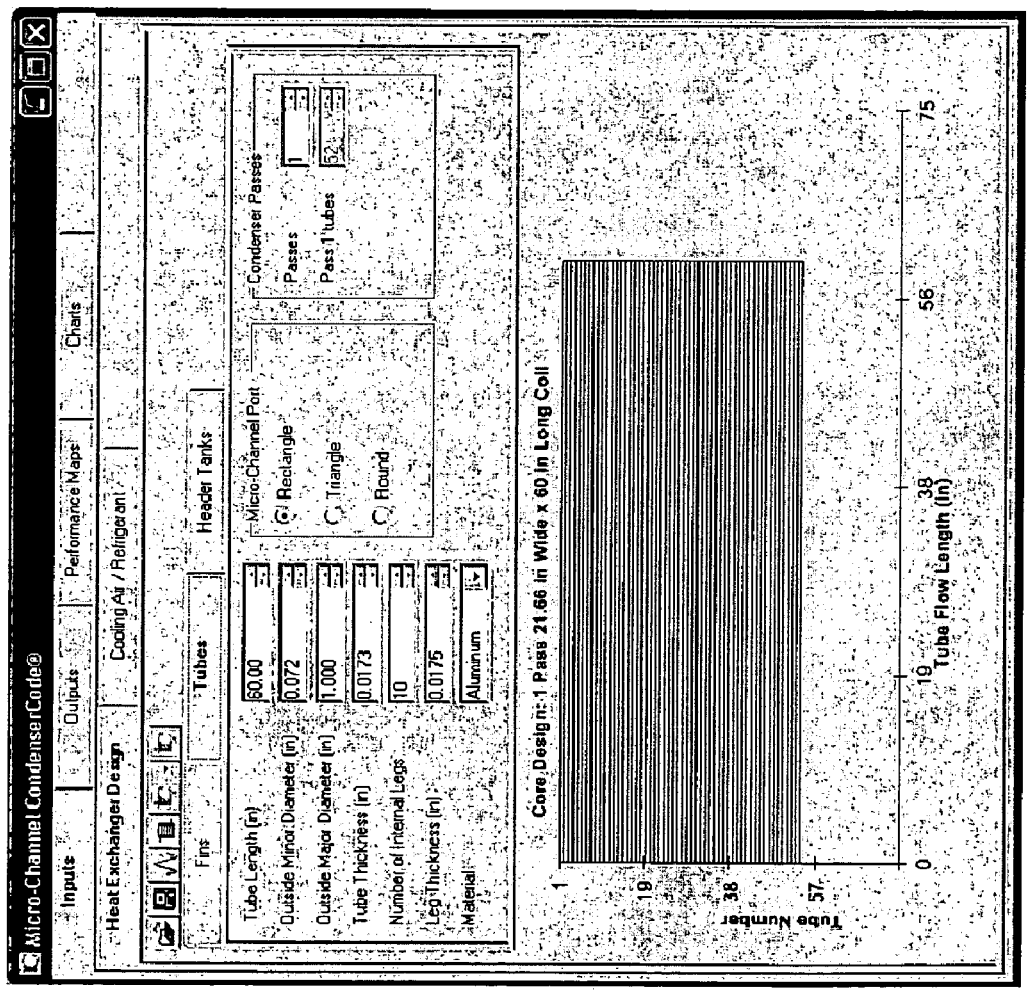
FIG. 81 is a screen-shot illustrating heat exchanger tube inputs for the condenser model.
Figure 82:
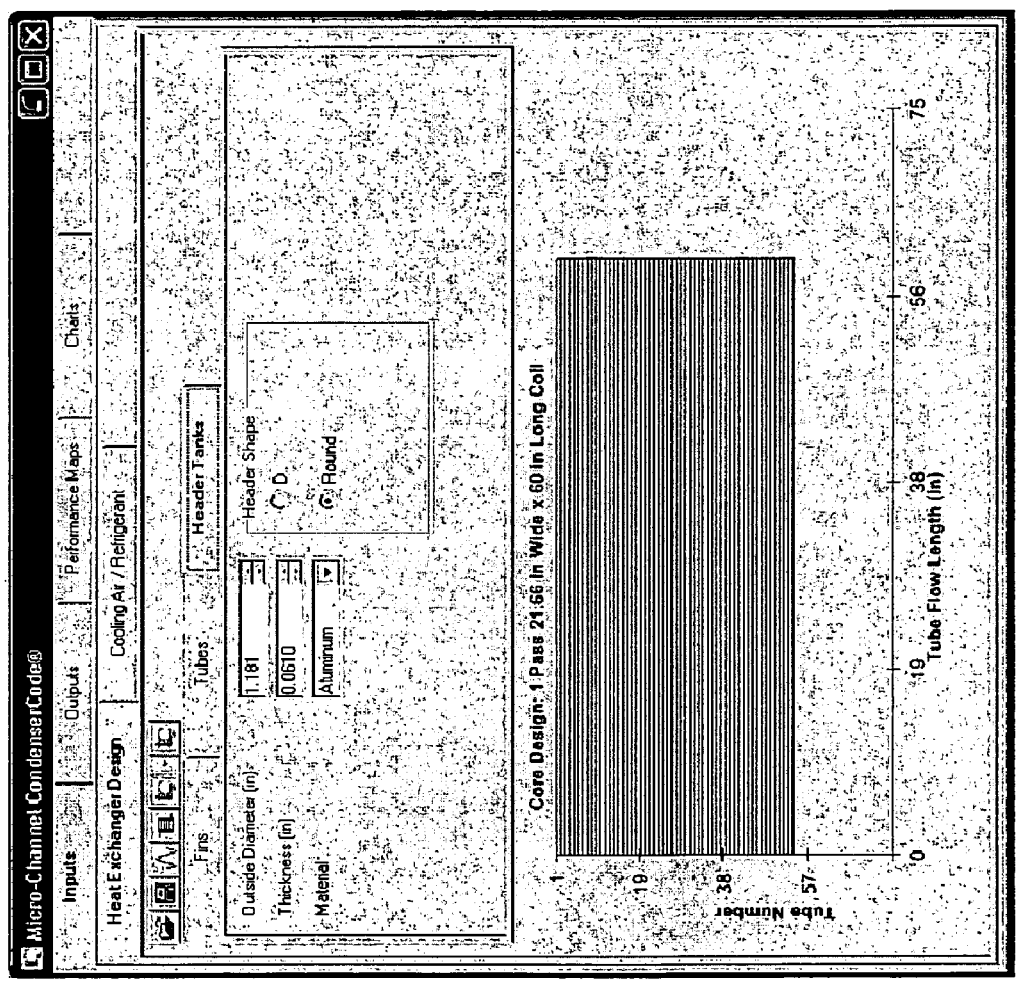
FIG. 82 is a screen-shot illustrating heat exchanger header tank inputs for the condenser model.

Referring now to FIG. 79, the cooling system design simulator may further provide manufacturer engineering bulletins that are periodically updated. The engineering bulletins may be selected by clicking the AE Bulletins option under Help in the main menu. The user may select from various contents including, but not limited to, compressors, motors, accessories, recommendations, installation and the like. A corresponding bulletin may be displayed on the left half of the screen by clicking on the desired topic. In this manner, the user may continuously be updated on engineering considerations when designing the cooling system. These bulletins may provide helpful information to assist engineers and installers in selection and installation of cooling system components.

Referring now to FIGS. 80 through 86, the simulator may include a stand alone condenser model that models the performance of ACU's based on micro-channel coil technology. Micro-channel heat exchanger coil technology has become more common in the industry. Originally introduced in the automotive industry, the micro-channel coil is composed of three key elements: flat multi-void micro-channel tube, the fin stock sandwiched between alternating layers of micro channel tube and two manifolds. The slotted manifolds may seat each tube in a parallel flow orientation. A one-pass-oil may have gas entering through one manifold and liquid exiting out of the other.

Micro-channel heat exchangers have proven to be extremely reliable. Furthermore, this coil design typically enables equivalent system performance in a smaller condensing unit chassis (i.e., twenty to twenty-five percent smaller coil sizes resulting in units with smaller foot prints). Another benefit is that air-conditioning systems with micro-channel heat exchangers may typically require twenty-five to forty-five percent less refrigerant charge per system than with units equipped with standard round tube/flat fin technology.

The simulator's condenser model may model ACU performance but may not model a complete refrigeration cycle system using the heat exchangers (i.e., evaporator, condensers) based on heat exchanger technology. The condenser model may compute the condenser performance dynamically as the user configures the condenser geometry, entering air flow rate and inlet air condition and refrigerant selection.

The user may define the condenser geometry with inputs for: (i) fin pattern (see FIG. 80), (ii) tubing (see FIG. 81) and (iii) header (see FIG. 82). In all cases, the user may be provided with default inputs which can be changed by the user to meet their design needs. The fin inputs may include, but are not limited to, fin height, fin depth, fin thickness, fin density, number of fins, header to header distance, material and fin pattern (e.g., flat, louvered, wave) and corresponding fin pattern geometry inputs. The tubing inputs may include, but are not limited to, tube length, outside minor diameter, outside major diameter, tube thickness, number of internal legs, leg thickness, material, micro-channels port (e.g., rectangle, triangle, round) and condenser passes. The header tank inputs may include, but are not limited to, outside diameter, thickness, material and header shape (e.g., D, round).

Figure 83:
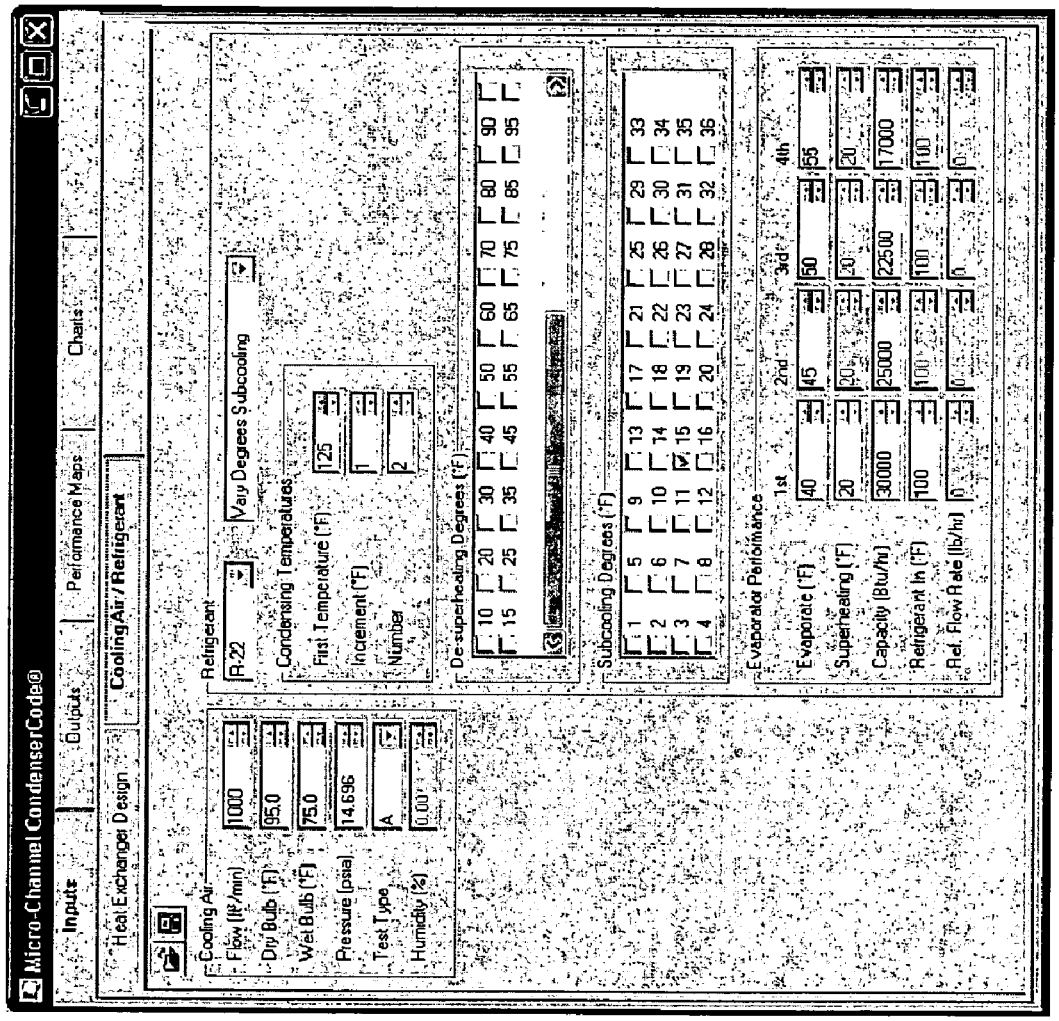
FIG. 83 is a screen-shot illustrating cooling air/refrigerant inputs for the condenser model.
Figure 85:
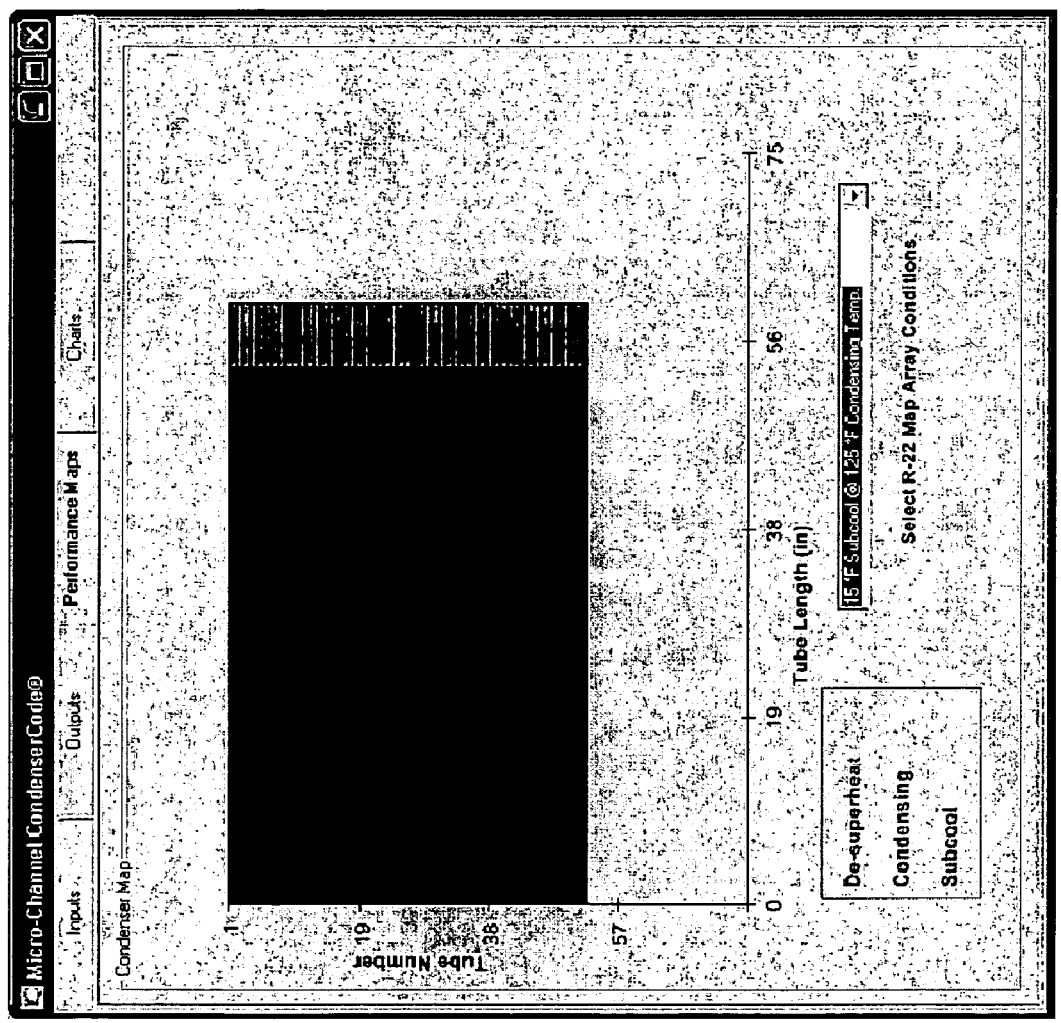
FIG. 85 is a screen-shot illustrating condenser performance maps of the condenser model.

Condenser air flow rate, inlet air condition and refrigerant selection may be accessed through the Cooling Air/Refrigerant tab (see FIG. 83). The cooling air inputs may include, but are not limited to, flow rate, dry bulb temperature, wet bulb temperature, pressure, test type and humidity. The refrigerant inputs may include, but are not limited to, condensing temperatures, de-superheating degrees, sub-cooling degrees and evaporator performance for multiple evaporators. The evaporator performance inputs may include, but are not limited to, evaporate temperature, super-heating, capacity, refrigerant in temperature and refrigerant flow rate.

The condenser model dynamically computes the heat exchanger performance as the user changes the inputs. The performance may be displayed in the three tabs: (i) Outputs, (ii) Performance Maps and (iii) Charts. The Outputs tab may display the performance in spreadsheet format (see FIG. 84). This tab may also enable the user to save the heat exchanger geometry and calculated performance. The Performance Maps tab may show the heat exchanger segmentation relative to the: (i) de-superheating, (ii) two-phase and (iii) sub-cooling functions (see FIG. 85). The Charts tab may show the condenser performance in graphical format (see FIG. 86). A plurality of parameters (e.g., fifteen) may be available for the user's design analysis work. Exemplary parameters may include, but are not limited to, refrigerant mass flow rate, capacity, capacity rate, inlet refrigerant temperature, condensing temperature and outlet refrigerant temperature.

The cooling system design simulator may simulate the performance of the individual components of a user-defined cooling system and the cooling system as a whole. The design simulator may perform steady-state design and analysis of vapor compression air-to-air-systems operating in either heating and cooling modes. As a hardware-based model, a user may specify the individual component parameters and define the geometry of tubing connecting the system components. The design simulator may preferably be provided as a software-based computer program and include other complimentary functions. These may include, but are not limited to, look-up tables for refrigerant and psychrometric properties of air.

The description is merely exemplary in nature and, thus, variations are intended to be within the scope of the teachings. Such variations are not to be regarded as a departure from the spirit and scope of the teachings.

What is claimed is:

1. A method of computer-based simulation of a cooling system, the method comprising:
receiving configuration data for a heat exchanger of said cooling system;
customizing said configuration data for said heat exchanger;
simulating performance of said cooling system by processing said customized configuration data through a model of said cooling system;
receiving ambient temperature data corresponding to an ambient temperature for said simulating;
generating cooling system performance data, based on said simulating, for evaluating operation of said cooling system, said generating including generating at least one of a power input value and an air flow rate value for a heat exchanger of said cooling system based on said ambient temperature;
rating said cooling system based on said generated cooling system performance data including at least one of said power input value and said air flow rate value.

2. The method of claim 1 wherein said rating said cooling system includes calculating a seasonal energy efficiency ratio for said cooling system based on said generated cooling system performance data.

3. The method of claim 1 wherein said receiving said configuration data for said heat exchanger includes receiving configuration data for an evaporator heat exchanger of said cooling system.

4. The method of claim 1 wherein said receiving said configuration data for said heat exchanger includes receiving inputted configuration data for a condenser heat exchanger of said cooling system.

5. The method of claim 1 wherein said customizing said configuration data for said heat exchanger includes receiving heat exchanger tubing geometry data including at least one of: tube length data, number of tubing rows data, number of tubes per row data, outside tubing diameter data, tubing wall thickness data, tube type data, tube material data, horizontal tube spacing data, vertical tube spacing data, number of equivalent parallel circuits data, number of internal legs data, leg thickness data and micro-channel port data.

6. The method of claim 1 wherein said customizing said configuration data for said heat exchanger includes receiving heat exchanger fin data including at least one of: fin length data, fin depth data, fin height data, fin density data, fin thickness data, fin pattern data, fin material data and number of fins data.

7. The method of claim 1 wherein said customizing said configuration data for said heat exchanger includes receiving heat exchanger coil part number data.

8. The method of claim 1 wherein said customizing said configuration data for said heat exchanger includes receiving header-to-header distance data.

9. The method of claim 1 wherein said customizing said configuration data for said heat exchanger includes receiving air flow data for said heat exchanger.

10. The method of claim 9 wherein said receiving said air flow data includes receiving at least one of: air flow rate data, dry bulb air temperature data, wet bulb air temperature data, air pressure data, test type data and humidity data.

11. The method of claim 1 wherein said customizing said configuration data includes receiving refrigerant data for said heat exchanger including at least one of: refrigerant type data, refrigerant temperature data and refrigerant flow rate data.

12. The method of claim 1 wherein said customizing said configuration data includes receiving heat exchanger capacity data.

13. The method of claim 1 further comprising displaying said simulated cooling system performance data.

14. A method of computer-based simulation of a heat exchanger system, the method comprising:
receiving heat exchanger system configuration data;
simulating heat exchanger system performance by processing said heat exchanger system configuration data through a model of said system;
receiving ambient temperature data corresponding to an ambient temperature for said simulating;
generating simulated heat exchanger system performance data based on said simulating, including generating at least one of a power input value and an air flow rate value for a heat exchanger of said system based on said ambient temperature; and
rating said heat exchanger system based on said generated simulated heat exchanger system performance data including at least one of said power input value and said air flow rate value.

15. The method of claim 14 wherein said rating said heat exchanger system includes calculating a seasonal energy efficiency ratio for said heat exchanger system based on said generated simulated heat exchanger system performance data.

16. The method of claim 15 wherein said receiving said heat exchanger system configuration data includes receiving configuration data for a single capacity cooling system and wherein said calculating said seasonal energy efficiency ratio for said heat exchanger system includes calculating a single capacity seasonal energy efficiency ratio.

17. The method of claim 15 wherein said receiving said heat exchanger system configuration data includes receiving configuration data for a dual capacity cooling system and wherein said calculating said seasonal energy efficiency ratio for said heat exchanger system includes calculating a dual capacity seasonal energy efficiency ratio.

18. The method of claim 14 wherein said receiving said heat exchanger system configuration data includes receiving configuration data for a heat pump system and wherein said rating said heat exchanger system includes calculating a heating seasonal performance factor for said heat pump system.

19. The method of claim 18 wherein said receiving said configuration data for said heat pump system includes receiving configuration data for a single capacity heat pump system and wherein said calculating said heating seasonal performance factor includes calculating a single capacity heating seasonal performance factor.

20. The method of claim 18 wherein said receiving said configuration data for said heat pump system includes receiving configuration data for a dual capacity heat pump system and wherein said calculating said heating seasonal performance factor includes calculating a dual capacity heating seasonal performance factor.

21. A method of computer-based simulation of a cooling system, the method comprising:
receiving inputted parametric data for said cooling system corresponding to predetermined simulated operating conditions for said cooling system;
simulating cooling system performance by processing said parametric data through a model of said cooling system;
receiving ambient temperature data corresponding to an ambient temperature for said simulating;
generating simulated cooling system performance data, based on said simulating, for evaluating operation of said cooling system, said generating including generating at least one of a power input value and an air flow rate value for a heat exchanger of said cooling system based on said ambient temperature;
rating said cooling system based on said simulated cooling system performance data including at least one of said power input value and said air flow rate value.

22. The method of claim 21 wherein said rating said cooling system includes calculating a seasonal energy efficiency ratio for said cooling system based on said simulated cooling system performance data.

23. The method of claim 21 wherein said receiving inputted parametric data includes receiving a parametric range corresponding to said simulated operating conditions and wherein said simulating cooling system performance by processing said parametric data through said model of said cooling system includes performing a plurality of cooling system simulations corresponding to said range.

24. The method of claim 23 wherein said receiving said parametric range includes receiving an initial parametric value, a final parametric value and a number of increments value.

25. The method of claim 24 wherein said performing said plurality of cooling system simulations includes performing a cooling system simulation for each of said initial parametric value, said final parametric value and at least one intermediate parametric value between said initial parametric value and said final parametric value based on said number of increments value.

26. The method of claim 21 wherein said receiving said inputted parametric data includes receiving parametric values corresponding to at least one of: compressor inlet superheat data, evaporator dry bulb temperature data, evaporator wet bulb temperature data, evaporator air flow rate data, evaporator number of tube rows data, evaporator number of tubes per row data, evaporator finned surface area data and evaporator fin density data.

27. The method of claim 21 wherein said receiving said inputted parametric data includes receiving parametric values corresponding to at least one of: condenser exit sub-cooling data, condenser dry bulb temperature data, condenser wet bulb temperature data, condenser air flow rate data, condenser number of tube rows data, condenser number of tubes per row data, condenser finned surface area data and condenser fin density data.

* * * * *

UNITED STATES PATENT AND TRADEMARK OFFICE
CERTIFICATE OF CORRECTION

| | |
|---|---|
| PATENT NO. | : 7,908,126 B2 |
| APPLICATION NO. | : 11/414745 |
| DATED | : March 15, 2011 |
| INVENTOR(S) | : Vijay Bahel et al. |

Page 1 of 1

It is certified that error appears in the above-identified patent and that said Letters Patent is hereby corrected as shown below:

| | |
|---|---|
| Col. 2, Line 59 | "screen-Shot" should be --screen-shot-- |
| Col. 3, Line 41 | After "calculator", insert --;-- |
| Col. 5, Lines 33-34 | "complimentary" should be --complementary-- |
| Col. 6, Line 30 | "conditions;" should be --conditions,-- |
| Col. 13, Line 36 | After "transferred", insert --.-- |
| Col. 13, Line 47 | "enthalpy. (eh)," should be --enthalpy (h),-- |
| Col. 14, Line 14 | "one-pass-oil" should be --one-pass coil-- |
| Col. 15, Lines 17-18 | "complimentary" should be --complementary-- |

Signed and Sealed this
Twenty-seventh Day of December, 2011

David J. Kappos
*Director of the United States Patent and Trademark Office*